US008868515B2

(12) United States Patent
Lee

(10) Patent No.: US 8,868,515 B2
(45) Date of Patent: Oct. 21, 2014

(54) DISTRIBUTION OF MAINFRAME DATA IN THE PC ENVIRONMENT

(76) Inventor: Hyung Sup Lee, Manhasset Hills, NY (US)

(*) Notice: Subject to any disclaimer, the term of this patent is extended or adjusted under 35 U.S.C. 154(b) by 199 days.

(21) Appl. No.: 12/069,571

(22) Filed: Feb. 11, 2008

(65) Prior Publication Data
US 2009/0157758 A1 Jun. 18, 2009

Related U.S. Application Data

(60) Division of application No. 10/935,464, filed on Sep. 7, 2004, which is a continuation of application No. 09/726,462, filed on Nov. 29, 2000, now Pat. No. 6,886,160.

(51) Int. Cl.
*G06F 17/00* (2006.01)
*H04L 29/08* (2006.01)
*G06F 17/30* (2006.01)

(52) U.S. Cl.
CPC .......... *H04L 67/06* (2013.01); *G06F 17/30575* (2013.01)
USPC ........... 707/687; 707/684; 707/612; 717/173; 717/177; 717/178

(58) Field of Classification Search
CPC ....... G06F 19/26; G06F 19/28; G06F 3/0484; G06F 17/30575; G06F 17/30557; G06F 17/30545; G06F 3/0383; H04L 29/06; H04L 29/08072; H04L 67/06
USPC ................. 707/611, 612, 623, 636, 687, 684, 707/E17.006, E17.036, 70; 717/100, 717/168–175, 137, 177, 178
See application file for complete search history.

(56) References Cited

U.S. PATENT DOCUMENTS

| 3,820,079 | A | * | 6/1974 | Bergh et al. | 711/157 |
| 4,807,224 | A | | 2/1989 | Naron et al. | |
| 4,855,900 | A | | 8/1989 | Simpson et al. | |
| 4,893,307 | A | | 1/1990 | McKay et al. | |
| 4,939,670 | A | * | 7/1990 | Freiman et al. | 715/209 |
| 4,999,766 | A | * | 3/1991 | Peters et al. | 707/E17.032 |

(Continued)

OTHER PUBLICATIONS

IBM, International Technical Support Organization, Boeblingen Center (SG24-4545-00)—"VisualGen: The future for your VSE Applications and how you get there from CSP" Dec. 1995 (pp. 1-195).*

(Continued)

*Primary Examiner* — Anh Ly
(74) *Attorney, Agent, or Firm* — Ladas & Parry LLP

(57) ABSTRACT

A method of distributing mainframe software and data using PC-based data media is disclosed, comprising a mainframe program for converting a mainframe sequential dataset or all or part of a mainframe library of texts or load modules to a sequential dataset of fixed length records and for reverting these converted records to its original form in the same or another mainframe data center, and procedures for downloading the converted mainframe data to a PC and uploading the PC file to a mainframe. The converted mainframe data downloaded to a PC can be delivered to another mainframe data center using floppy diskettes, recordable CD-ROM, Internet Website, TCP/IP FTP, or email attachment, as an alternative to magnetic tapes. The PC hard disk is used as a backup storage of the mainframe libraries, and a mainframe text library downloaded to a PC can be edited on a local or remote stand-alone PC.

14 Claims, 13 Drawing Sheets

Transporting a load module when the receiver doesn't have the program PCFORM

(56) References Cited

U.S. PATENT DOCUMENTS

| | | | |
|---|---|---|---|
| 5,016,277 A * | 5/1991 | Hamilton | 713/150 |
| 5,109,515 A * | 4/1992 | Laggis et al. | 709/229 |
| 5,128,996 A * | 7/1992 | Rosenow et al. | 713/192 |
| 5,175,766 A * | 12/1992 | Hamilton | 705/71 |
| 5,261,080 A * | 11/1993 | Khoyi et al. | 707/E17.006 |
| 5,307,262 A * | 4/1994 | Ertel | 705/2 |
| 5,329,619 A * | 7/1994 | Page et al. | 707/999.104 |
| 5,369,778 A * | 11/1994 | San Soucie et al. | 707/999.103 |
| 5,390,314 A * | 2/1995 | Swanson | 717/138 |
| 5,438,509 A | 8/1995 | Heffron | |
| 5,455,926 A * | 10/1995 | Keele et al. | 711/4 |
| 5,530,848 A | 6/1996 | Gilbert et al. | |
| 5,559,933 A * | 9/1996 | Boswell | 358/1.15 |
| 5,611,066 A * | 3/1997 | Keele et al. | 711/100 |
| 5,634,124 A * | 5/1997 | Khoyi et al. | 707/999.103 |
| 5,678,044 A * | 10/1997 | Pastilha et al. | 717/110 |
| 5,732,275 A | 3/1998 | Kullick et al. | |
| 5,745,748 A * | 4/1998 | Ahmad et al. | 709/217 |
| 5,812,768 A * | 9/1998 | Page et al. | 709/228 |
| 5,813,009 A * | 9/1998 | Johnson et al. | 707/695 |
| 5,937,197 A | 8/1999 | Jury | |
| 5,983,240 A * | 11/1999 | Shoroff et al. | 707/687 |
| 5,987,251 A * | 11/1999 | Crockett et al. | 717/115 |
| 5,999,740 A | 12/1999 | Rowley | |
| 6,023,710 A | 2/2000 | Steiner et al. | |
| 6,074,435 A | 6/2000 | Röjestål | |
| 6,088,829 A * | 7/2000 | Umemura et al. | 714/798 |
| 6,115,710 A | 9/2000 | White | |
| 6,178,430 B1 * | 1/2001 | Cohen et al. | 715/273 |
| 6,205,579 B1 | 3/2001 | Southgate | |
| 6,233,252 B1 * | 5/2001 | Barker et al. | 370/473 |
| 6,321,276 B1 * | 11/2001 | Forin | 710/3 |
| 6,332,163 B1 | 12/2001 | Bowman-Amuah | |
| 6,380,928 B1 * | 4/2002 | Todd | 345/169 |
| 6,385,654 B1 | 5/2002 | Tanaka | |
| 6,405,294 B1 * | 6/2002 | Hayter | 711/162 |
| 6,457,109 B1 | 9/2002 | Mililloi et al. | |
| 6,480,834 B1 | 11/2002 | Engle et al. | |
| 6,493,871 B1 | 12/2002 | McGuire et al. | |
| 6,502,106 B1 | 12/2002 | Gampper et al. | |
| 6,513,048 B1 | 1/2003 | Engle et al. | |
| 6,529,976 B1 | 3/2003 | Fukuzawa et al. | |
| 6,532,463 B1 | 3/2003 | Robbins et al. | |
| 6,536,039 B2 | 3/2003 | Sanford | |
| 6,546,474 B1 | 4/2003 | Weigelt | |
| 6,571,282 B1 | 5/2003 | Bowman-Amuah | |
| 6,594,701 B1 * | 7/2003 | Forin | 709/232 |
| 6,601,212 B1 | 7/2003 | Guha et al. | |
| 6,609,246 B1 * | 8/2003 | Guhr et al. | 717/103 |
| 6,615,404 B1 | 9/2003 | Garfunkel et al. | |
| 6,658,461 B1 | 12/2003 | Mazo | |
| 6,691,125 B1 | 2/2004 | Engle et al. | |
| 6,718,372 B1 | 4/2004 | Bober | |
| 6,757,699 B2 | 6/2004 | Lowry | |
| 6,782,400 B2 | 8/2004 | Geuss et al. | |
| 6,842,793 B2 | 1/2005 | Ohashi et al. | |
| 6,850,962 B1 | 2/2005 | Povolny et al. | |
| 6,850,987 B1 | 2/2005 | McCanne et al. | |
| 6,854,006 B1 | 2/2005 | Giroir et al. | |
| 6,854,112 B2 | 2/2005 | Crespo et al. | |
| 6,857,074 B2 | 2/2005 | Bobo, II | |
| 6,859,899 B2 | 2/2005 | Shalvi et al. | |
| 6,865,737 B1 | 3/2005 | Lucas et al. | |
| 6,868,487 B2 | 3/2005 | Beeston et al. | |
| 6,871,271 B2 | 3/2005 | Ohran et al. | |
| 6,873,991 B2 | 3/2005 | Carroll et al. | |
| 6,879,988 B2 | 4/2005 | Basin et al. | |
| 6,886,160 B1 * | 4/2005 | Lee | 717/173 |
| 6,889,376 B1 | 5/2005 | Barritz et al. | |
| 6,912,629 B1 | 6/2005 | West et al. | |
| 6,996,576 B2 | 2/2006 | Vos et al. | |
| 7,028,093 B2 | 4/2006 | Jaenecke et al. | |
| 7,133,894 B2 | 11/2006 | Banerjee et al. | |
| 7,136,358 B2 * | 11/2006 | Kunito et al. | 370/238 |
| 7,171,606 B2 | 1/2007 | Blackburn et al. | |
| 7,191,197 B2 | 3/2007 | Mashima | |
| 7,225,249 B1 * | 5/2007 | Barry et al. | 709/227 |
| 7,272,815 B1 * | 9/2007 | Eldridge et al. | 717/101 |
| 7,685,313 B1 * | 3/2010 | Kanevsky et al. | 709/246 |
| 8,060,862 B2 * | 11/2011 | Eldridge et al. | 717/121 |
| 2002/0021669 A1 * | 2/2002 | Kunito et al. | 370/235 |
| 2002/0184224 A1 * | 12/2002 | Haff et al. | 707/10 |
| 2003/0110265 A1 * | 6/2003 | Lutian et al. | 709/227 |
| 2005/0038830 A1 * | 2/2005 | Lee | 707/200 |
| 2006/0059253 A1 * | 3/2006 | Goodman et al. | 709/223 |
| 2009/0157758 A1 * | 6/2009 | Lee | 707/200 |

OTHER PUBLICATIONS

Kravitz et al. "Workstations and mainframe computers working together"—IBM System Journal, vol. 25, No. 1, 1986 (pp. 116-128).*
Lam, S.S—"Protocol conversion"—Software Engineering, IEEE Transactions on (vol. 14 , Issue: 3) Mar. 1988 pp. 353-362.*
Parr, F.N.; Auerbach, J. ; Goldstein, B—"Distributed Processing Involving Personal Computers and Mainframe Hosts"—Selected Areas in Communications, IEEE Journal on (vol. 3 , Issue: 3) May 1985 pp. 479-489.*
Riely et al., "An Instance of the Application Download Pattern: the SPAIDS Software Loader Verifer Domain Analysis and Implementation" ACM, (1997), pp. 273-278.
Borker et al. "Automatic Segmentation of Text Into Structured Records" ACM SIGMOD, (2001), pp. 175-186.
Yaung, et al. "Linkage Metrics for Process Reengineering" CM Proc. of 1993 conf. of Ctr of Advance Studies on Collaboration Resh in SWE, (Oct. 1993), vol. 1.
Kaucharoen et al. "Software Streaming via Block Streaming" IEEE DATE, (2003) pp. 1-6.
Ma, et al. "Coupling Prefix Caching and Collective Downloads for Remote Dataset Access" ACM ICS, (2006), pp. 229-238.
Mahanti, et al. "Scakable on Demand Media Streaming with Packet Loss Recovery" IEEE 11, (2003), pp. 195-209.
Gedik, et al., "Quality Aware Distributed Data Delivery for Continuos Query Services" ACM SIGMOD, (2006), pp. 419-430.
*JAR File Specification*, 2003, [online], [retrieved on or about May 13, 2008] Retrieved from the Internet URL: http://www.java.sun.com.
*Data Security Software—PKWARE, Inc.*, [online], [retrieved on Jun. 9, 2008] Retrieved from the Internet URL: http://www.pkware.com.
*Products—File Encry Software—File Compression Software—PKWARE, Inc.*, [online], [retrieved on Jun. 9, 2008] Retrieved from the Internet URL: http://www.pkware.com/software.
*Windows Zip Files—PKWARE, Inc.*, [online], [retrieved on Jun. 9, 2008] Retrieved from the Internet URL: http://www.pkware.com/software-pkzip/windows-zip-files.
*B2B Encryption—B2B Security—PKWARE, Inc.*, [online], [retrieved on Jun. 9, 2008] Retrieved from the Internet URL: http://www.pkware.com/software-b2b-security.
*Applied Software mainframe encyption and utilities* 2006, [online], [retrieved on Jun. 9, 2008] Retrieved from the Internet URL: http://www.asisoft.com/products.html.
*Applied Software—mainframe utilities, mainframe file transfer and mainframe encryption products* 2006, [online], [retrieved on Jun. 9, 2008] Retrieved from the Internet URL: http://www.asisoft.com/products.html.
*Applied Software, Inc.* 2006, [online], [retrieved on Jun. 9, 2008] Retrieved from the Internet URL: http://www.asisoft.com/products_SSR.html.
O'Brien, Marsha, et al., *SCLM for z/OS*, [online], [retrieved on Jun. 9, 2008] Retrieved from the Internet URL: http://www-306.ibm.com/software.awdtools.selmsuite.sclm/library/tr292194.html.
O'Brien, Marsha, et al., *SCLM for z/OS*, [online], [retrieved on Jun. 9, 2008 ] Retrieved from the Internet URL: http://www-306.ibm.com/software.awdtools.sclm/library/features.
*Welcome to fssftp.com Sponsored Results for FTP*, 2008, [online], [retrieved on Jun. 9, 2008] Retrieved from the Internte URL: http://fssftp.com/search.php?d=fssftp.com&cachekey=1213040112&rc=true&term=Ftp&append.

(56) References Cited

OTHER PUBLICATIONS

*Welcome to* fssftp.com *Sponsord Results for FTP*, 2008, [online], [retrieved on Jun. 9, 2008] Retrieved from the Internte URL: http://fssftp.com/search.php?d=fssftp.com&cachekey=1213040112&rc=true&term=Tile+sharing&append=.

*Welcome to* fssftp.com *Sponsord Results for FTP*, 2008, [online], [retrieved on Jun. 9, 2008] Retrieved from the Internte URL: http://fssftp.com/search.php?d=fssftp.com&cachekey=1213040112&rc=true&term=Tile+sharing&append+.

Data21, *Mainframe Software for zSeries, z/OS, OS/390, MVS, VSE and CICS*, 2008, [online], [retrieved on Jun. 9, 2008] Retrieved from the Internet URL: http://data21.com/default.asp.

Data21, *Remote Print Facility for VSE/CICS*, 2008, [online], [retrieved on Jun. 9, 2008] Retrieved from the Internet URL: http://data21.com/productrs/rfp/default.asp.

Data21, *TCP/IP—TOOLS for VSE*, 2008, [online], [retrieved on Jun. 9, 2008] Retrieved from the Internet URL: http://data21.com/products/tcpiptools/default.asp.

Gilmore, John, et al., *tar texi manual* 20001029.txt, 2000, [online], [retrieved on or about Apr. 24, 2008] Retrieved from the Internet URL: http://www.cvs.savannah.gnu.org/viewvc/tar.doc.tar.texi?root=tar&view=log.

Gilmore, John, et al., *GNU tar: an archiver tool*, 2008, [online], [retrieved on or about Apr. 24, 2008] Retrieved from the Internet URL: http://www.cvs.savannah.gnu.org/viewvc/tar.doc.tar.texi?root=tar&view =log.

IBM, VisualGen "The Future of Your VSE Applications and How You Get There from CSP", 1995, Internal Technical Support Organization, Boeblingen Germany, pp. 1-195.

BULL CEDOC, "JCL Pocket Guide", Jul. 1996, BULL CEDOC, France, pp. i-iii, 1-74, A: 1-10, B: 1-2, C: 1-2, D: 1-4, E: 1-12, F: 1.

* cited by examiner

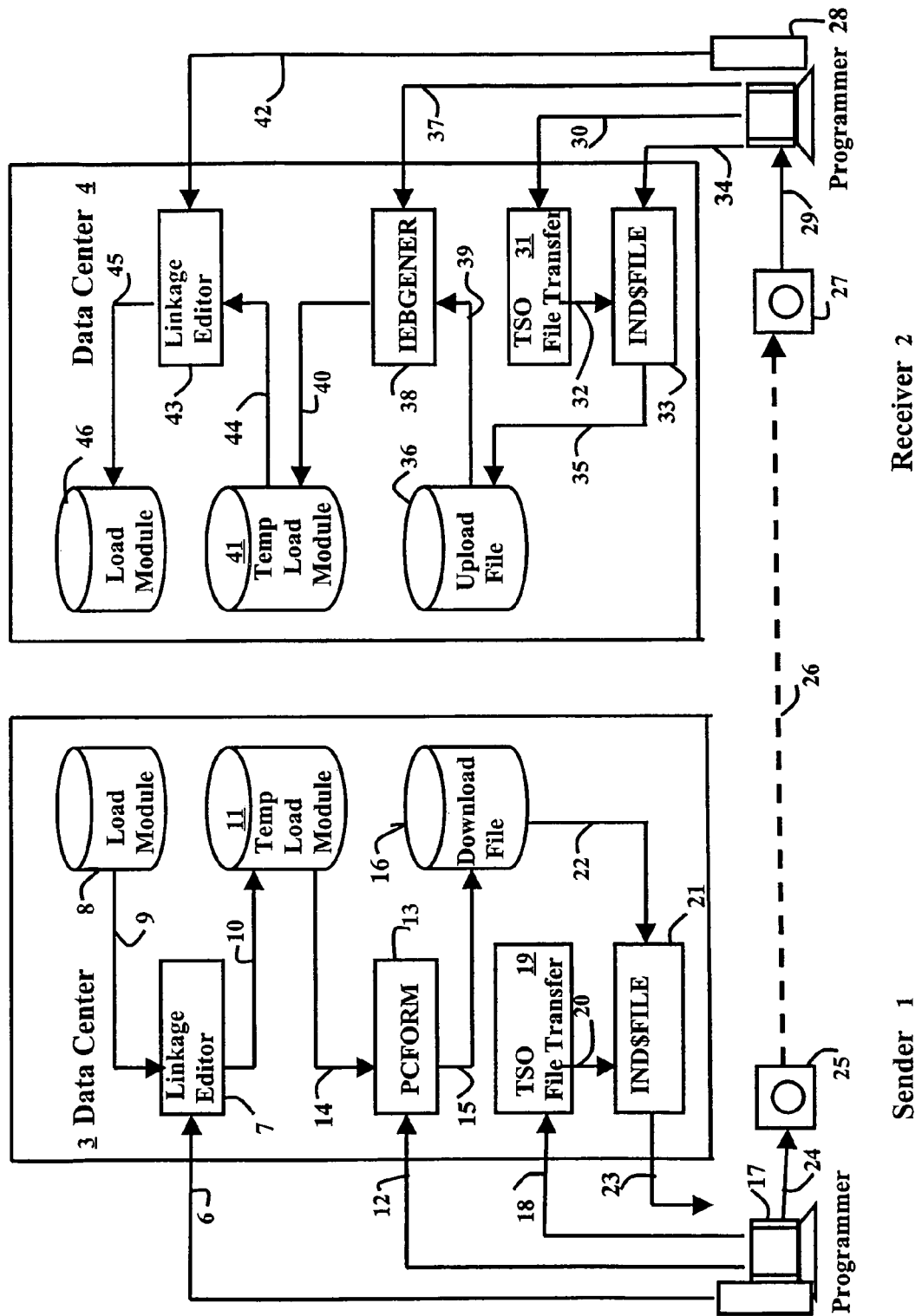
Fig. 1 Transporting a load module when the receiver doesn't have the program PCFORM

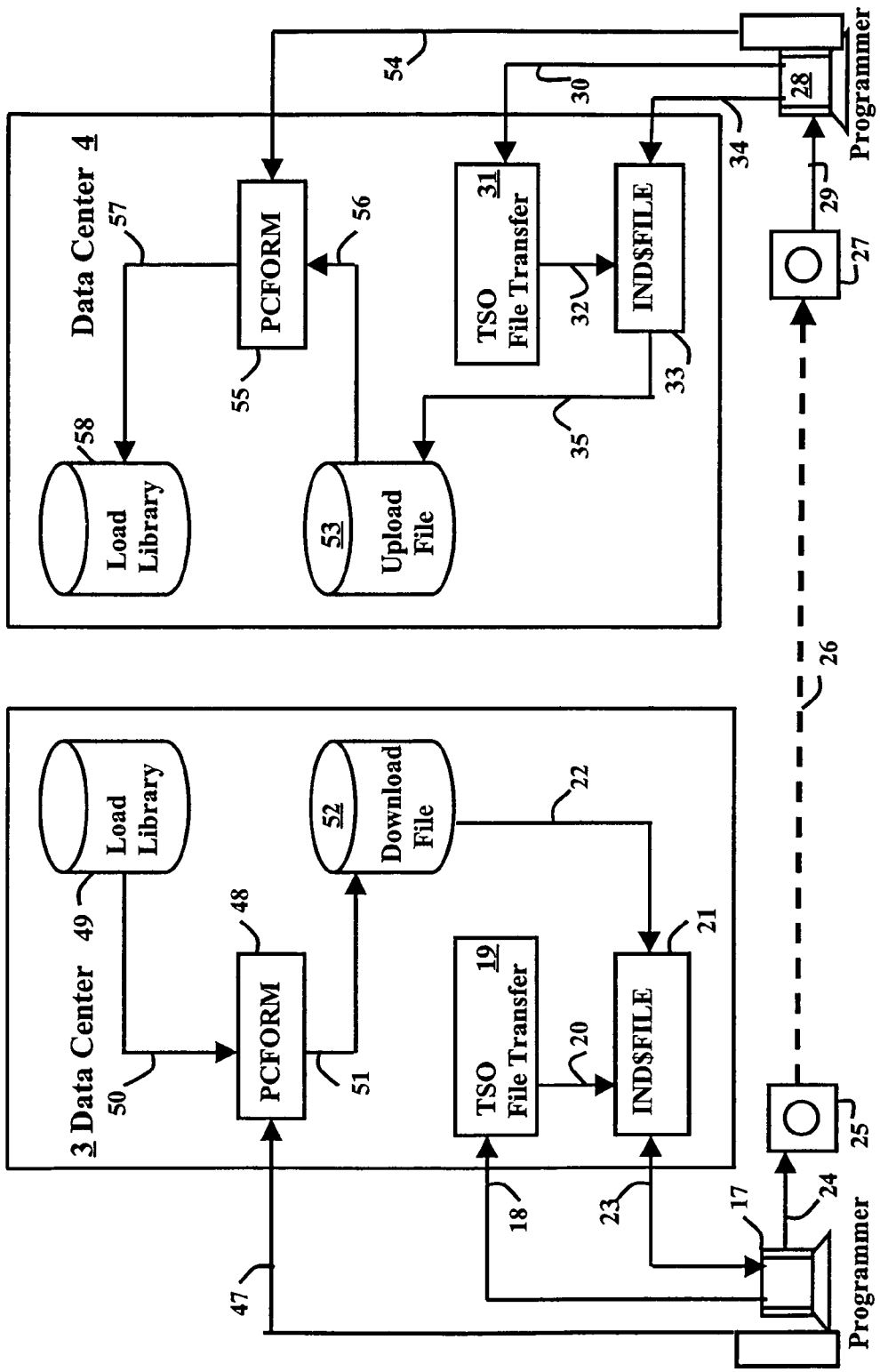
Fig. 2 Transporting a load library when the receiver has the program PCFORM

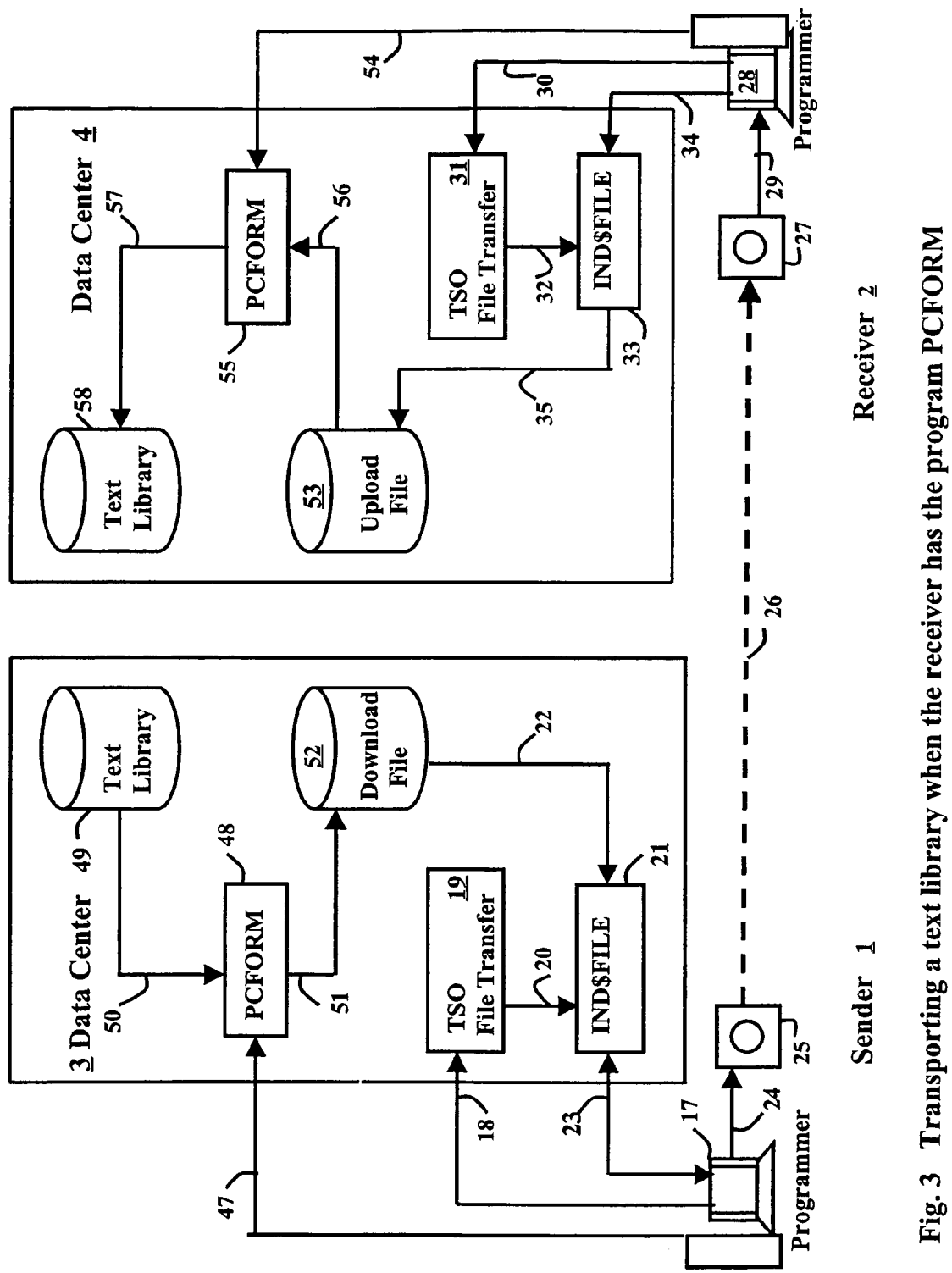
Fig. 3 Transporting a text library when the receiver has the program PCFORM

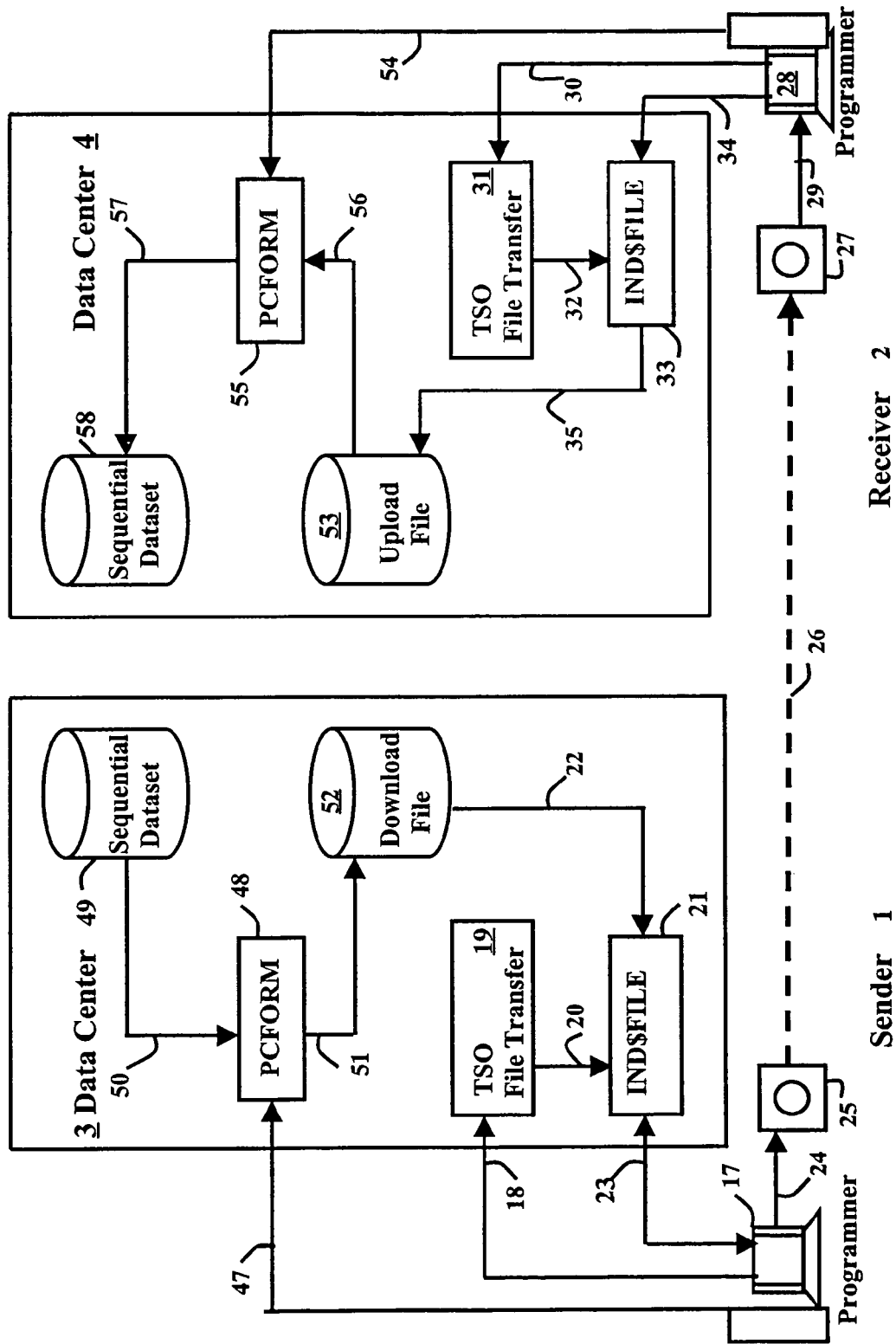
Fig. 4  Transporting a sequential dataset of fixed, undefined or variable record format when the receiver has the program PCFORM

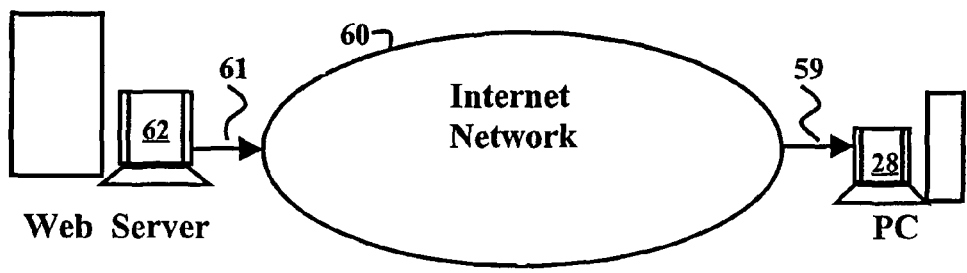
Fig. 5. World Wide Web and the Internet Download
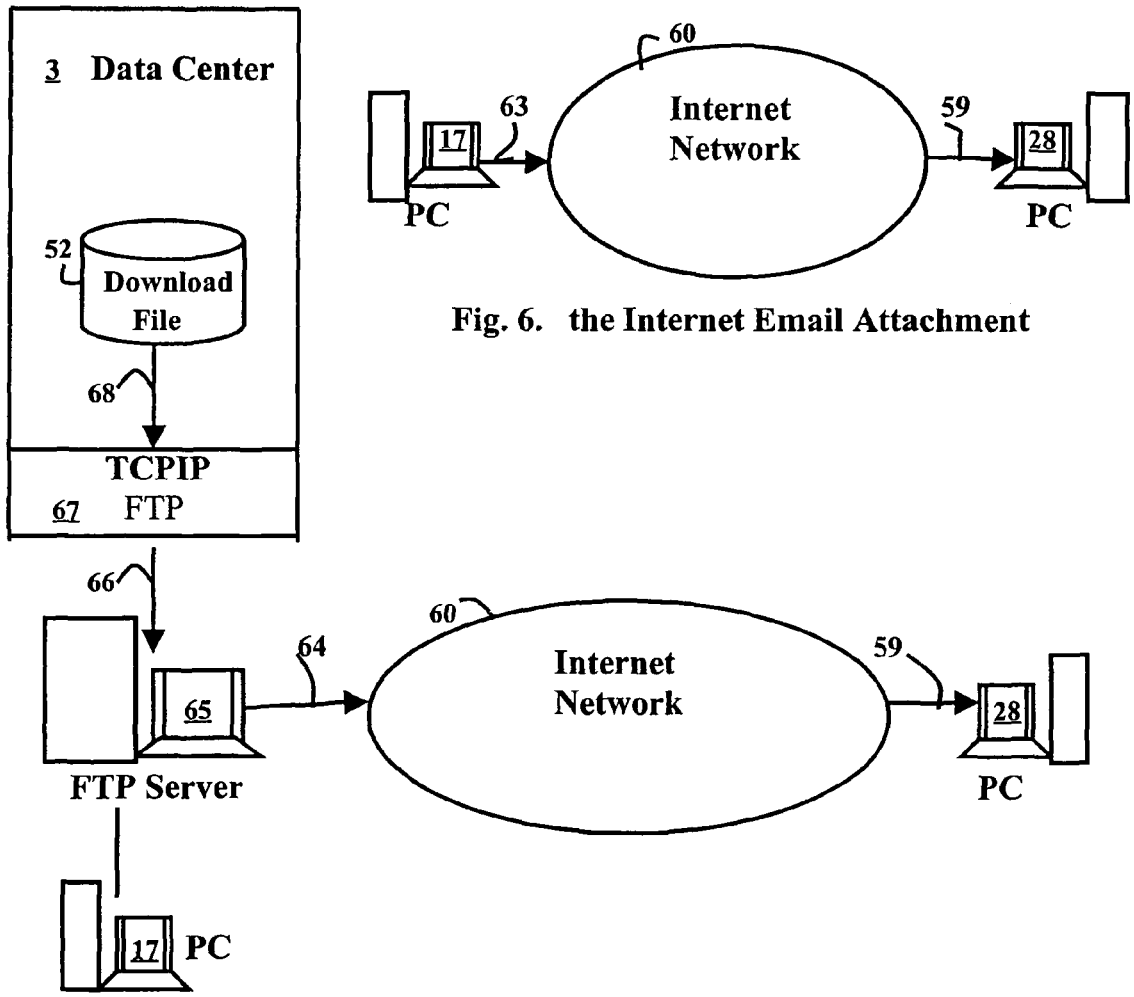
Fig. 6. the Internet Email Attachment
Fig. 7. FTP Download

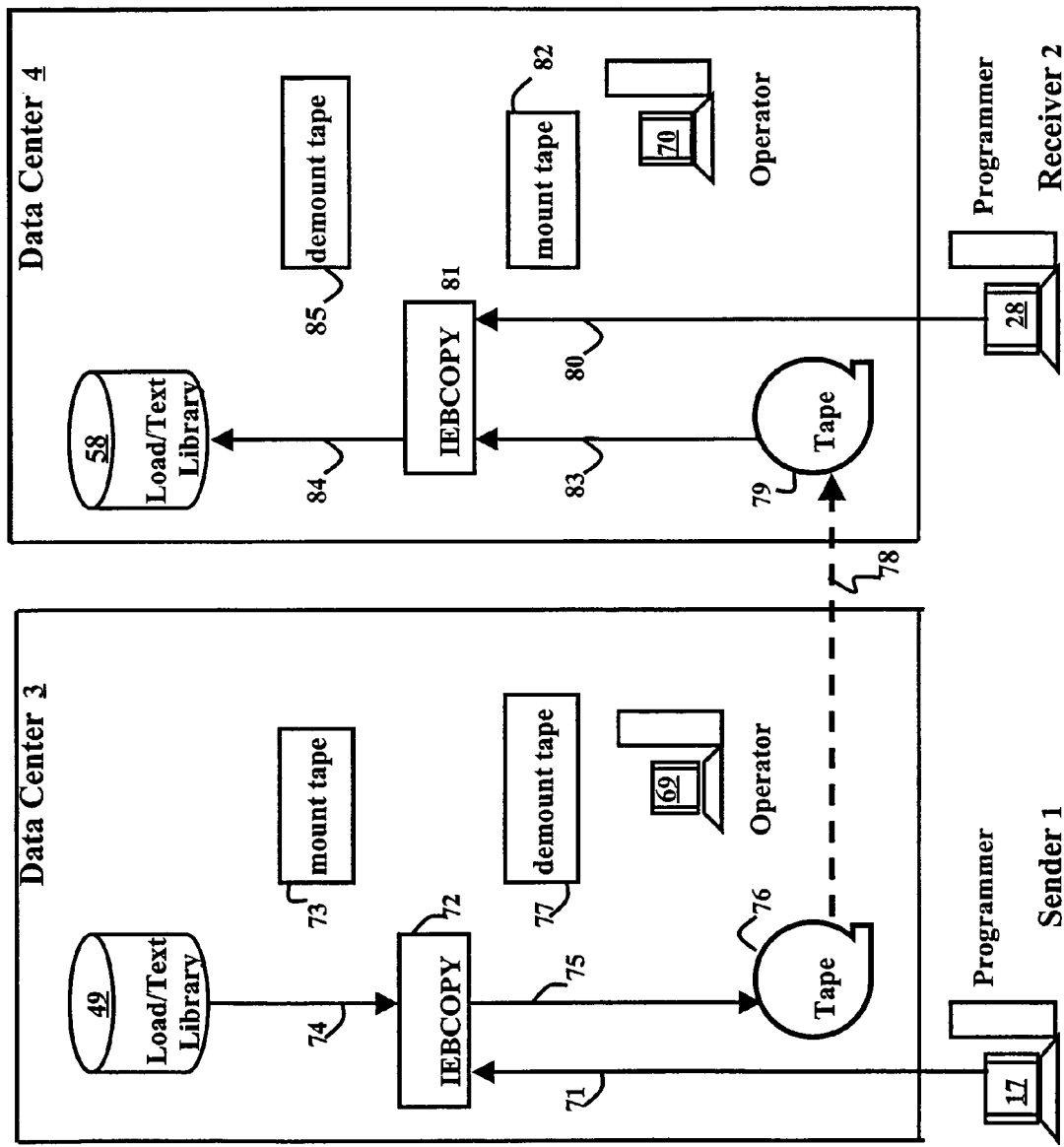
Fig. 8 The Conventional Tape Delivery of a Load/Text Library

Fig. 9. The Conversion Program PCFORM
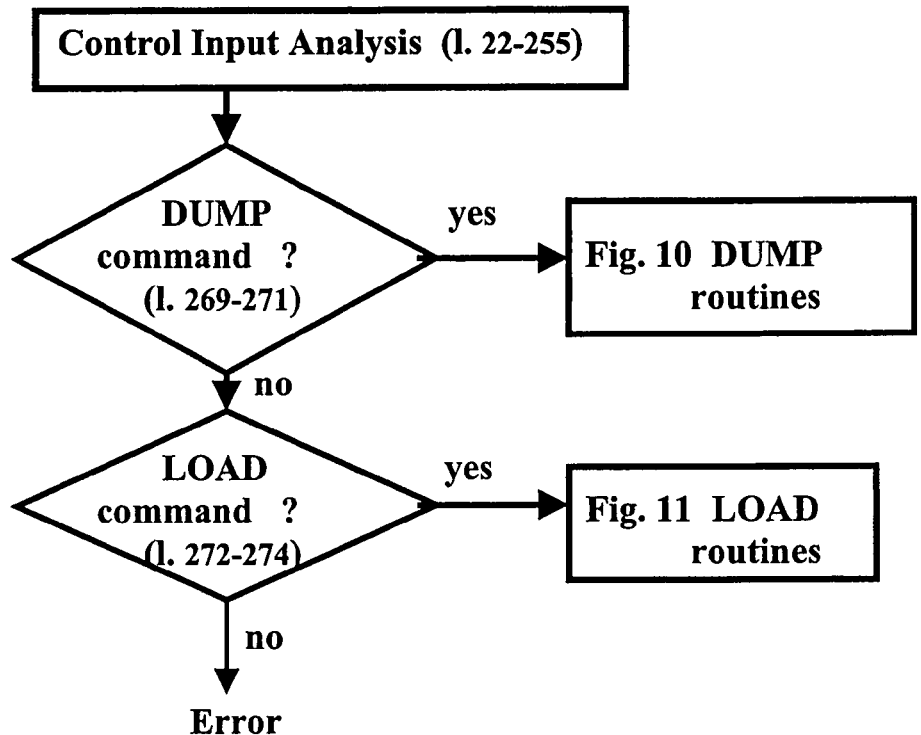
Fig. 10 DUMP Routines
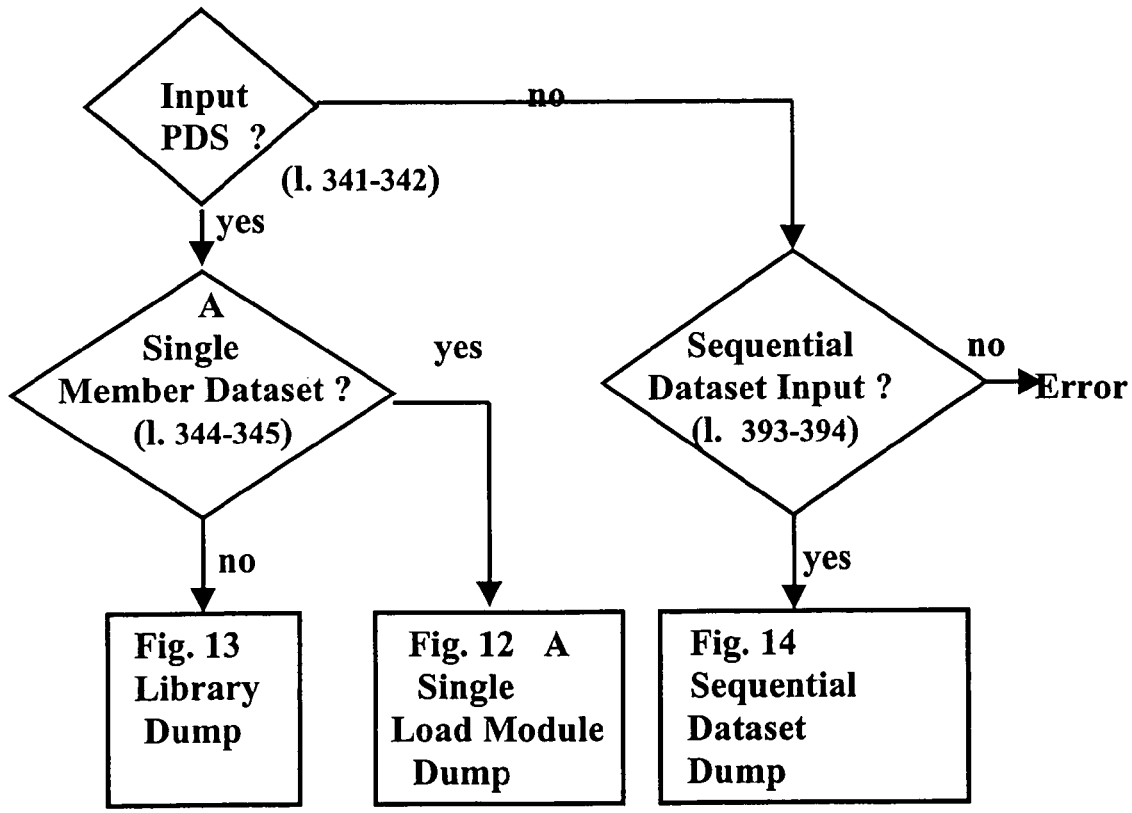

Fig. 11 LOAD Routines
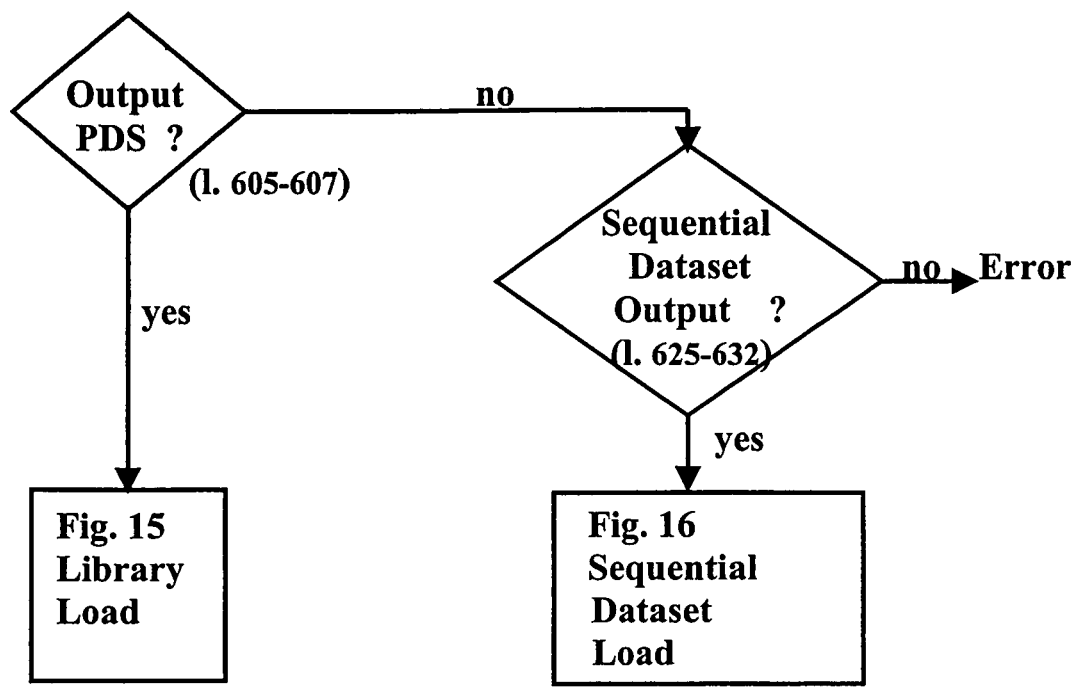
Fig. 12. A Single Load Module Dump Routine
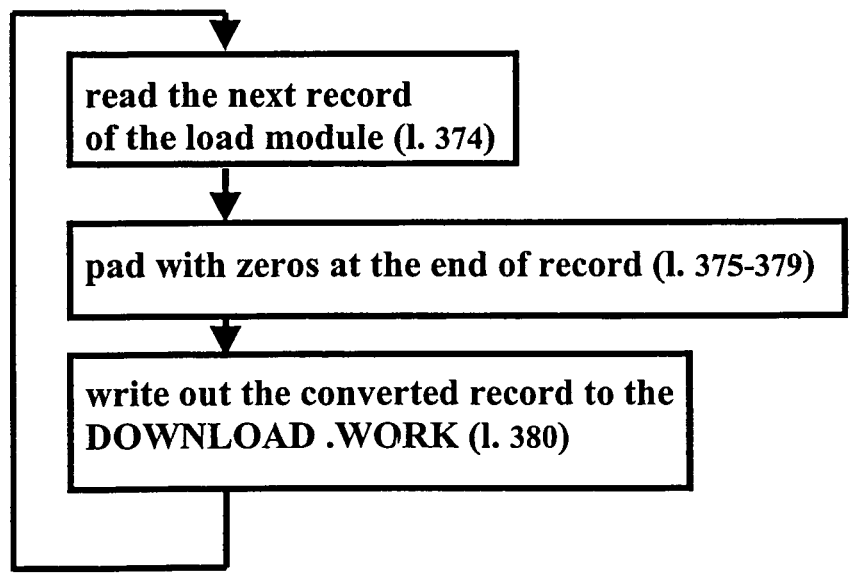

Fig. 13. Library DUMP Routine
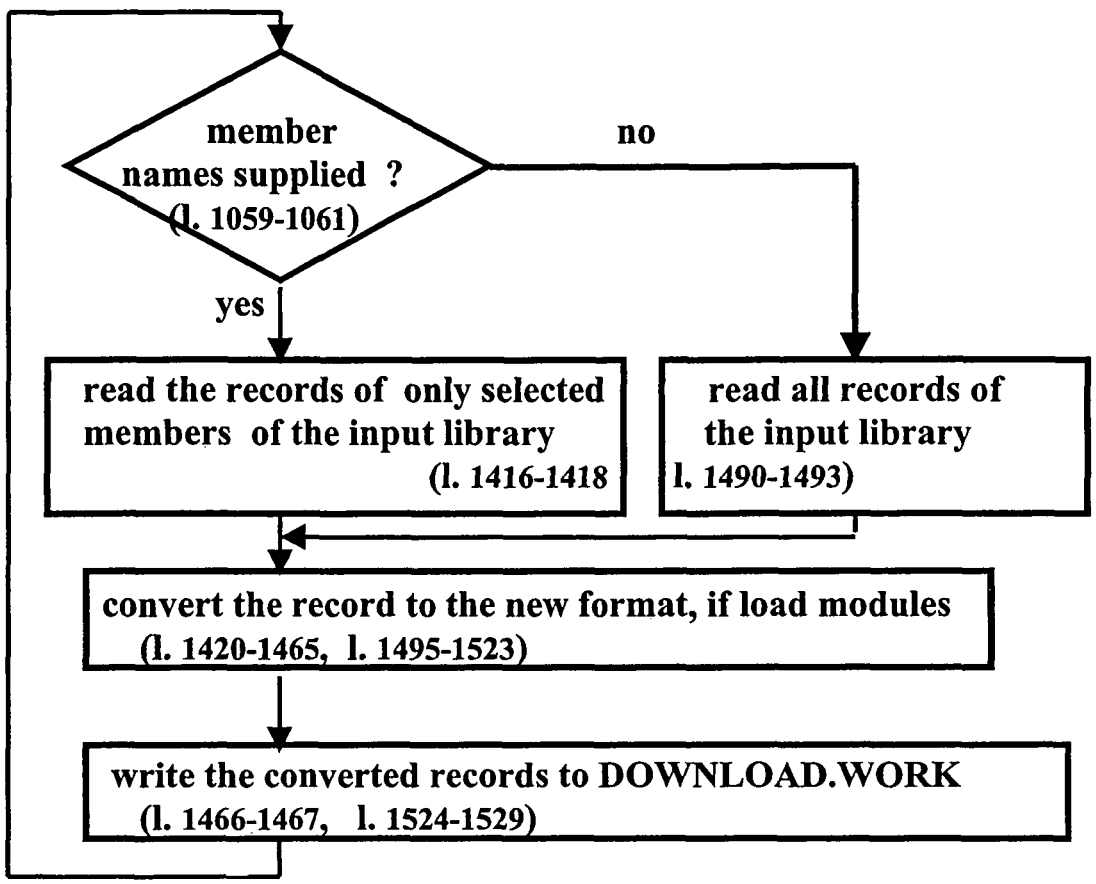
Fig. 14. Sequential Dataset Dump Routine
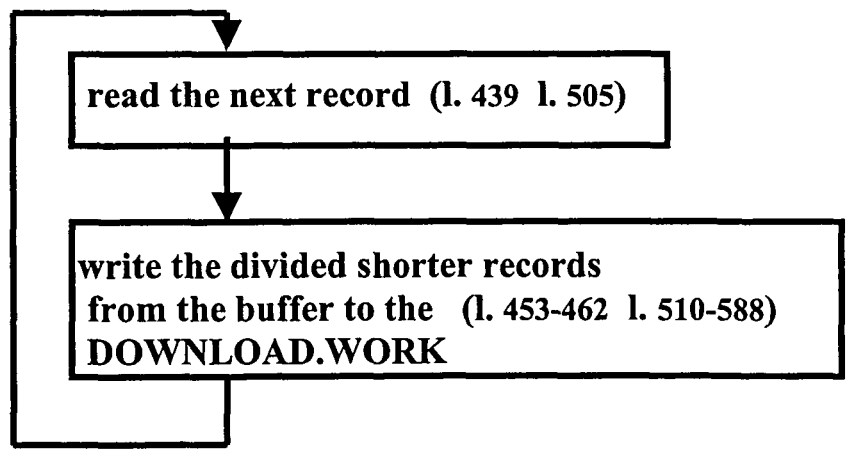

Fig. 15. Library LOAD Routine
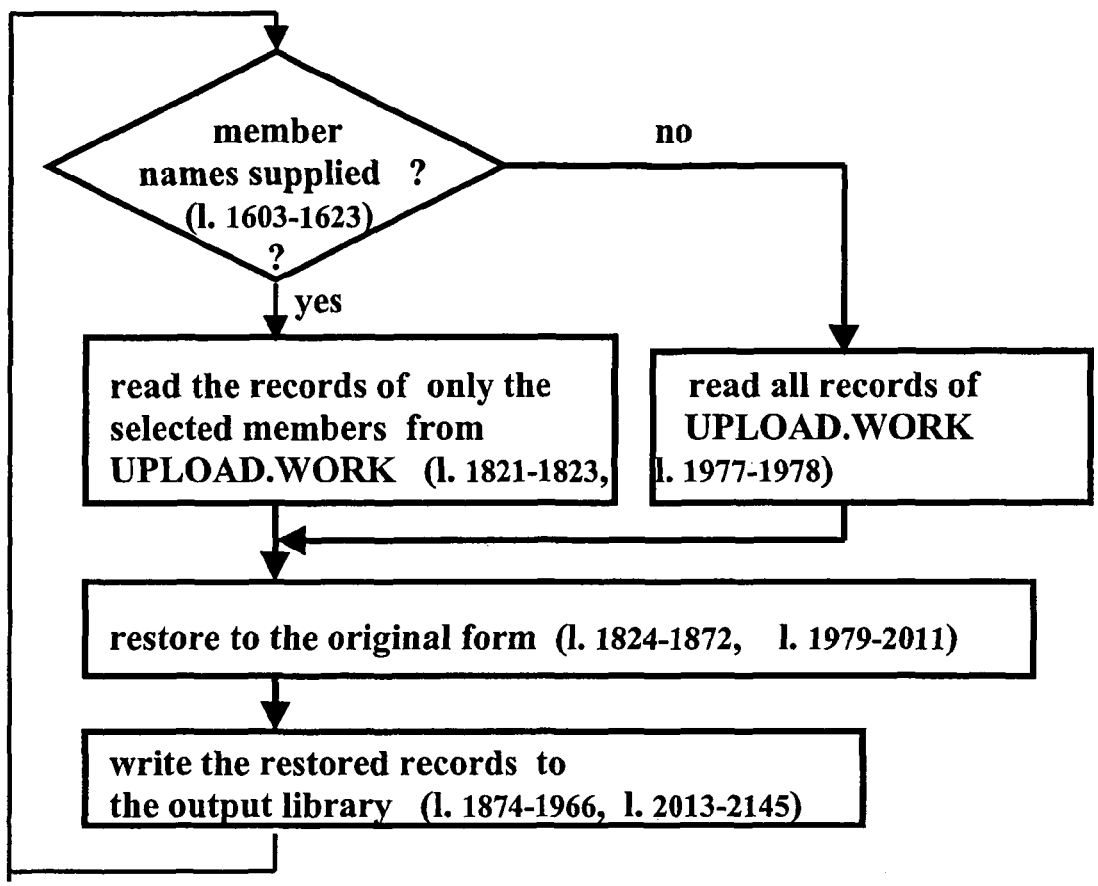
Fig. 16. Sequential Dataset LOAD Routine
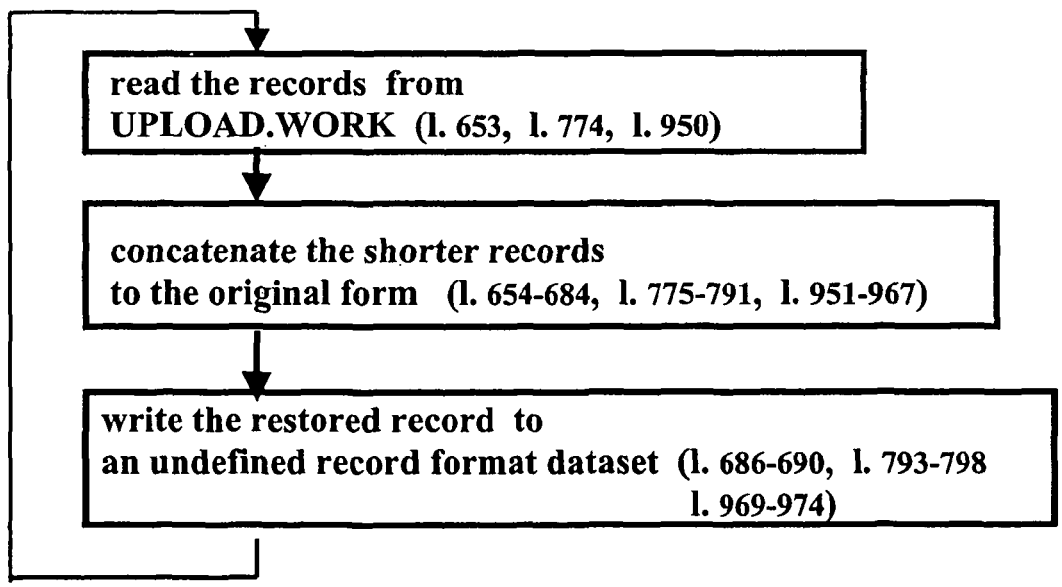

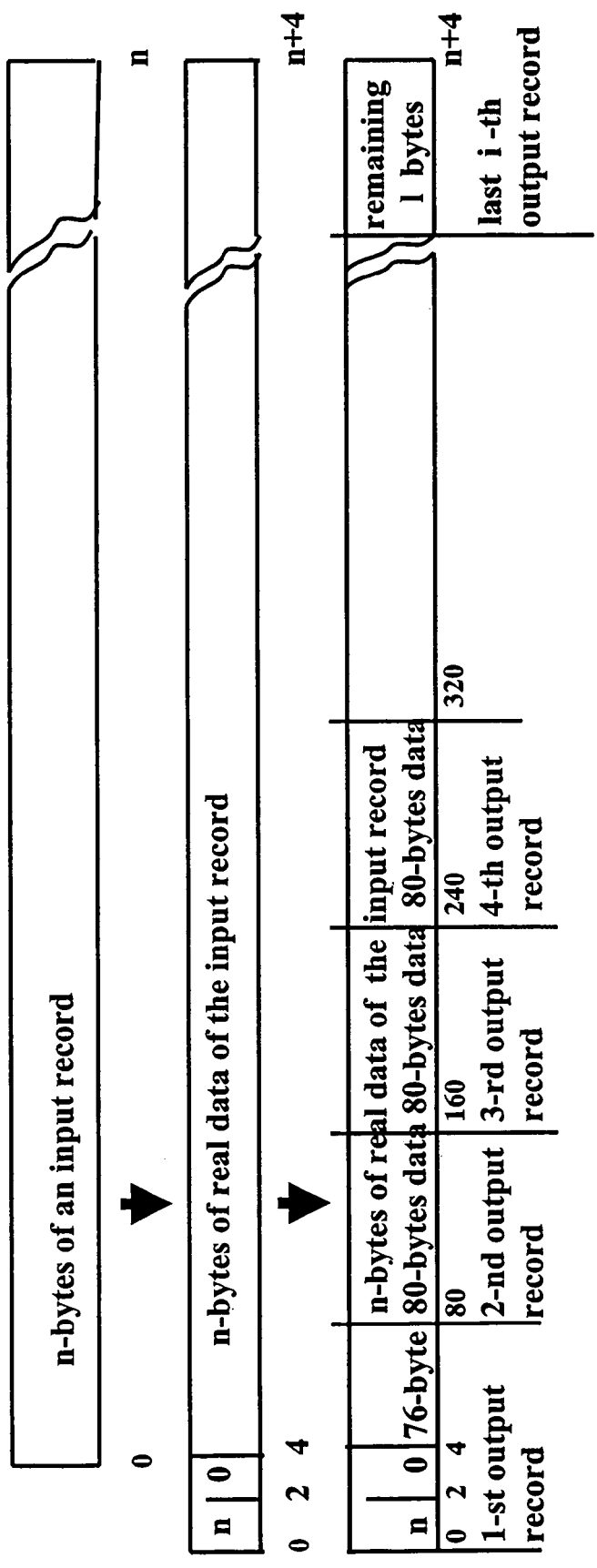

Fig. 17 A Conversion Method of A 4-bytes Header and Division

* The length of the input record is assumed as n bytes long.

The logical record length of the output (Download & Upload) sequential dataset is assumed as 80-bytes.

A 4-bytes header with 2-bytes of real data length, e.g., n, and 2 null bytes.

$i = [ ( n + 4 + 79 ) / 80 ]$  where i-th record is the last output record of an input record and
[...] is an integer value $l = ( n + 4 ) - ( ( i - 1 ) * 80 )$  bytes length of the last output record

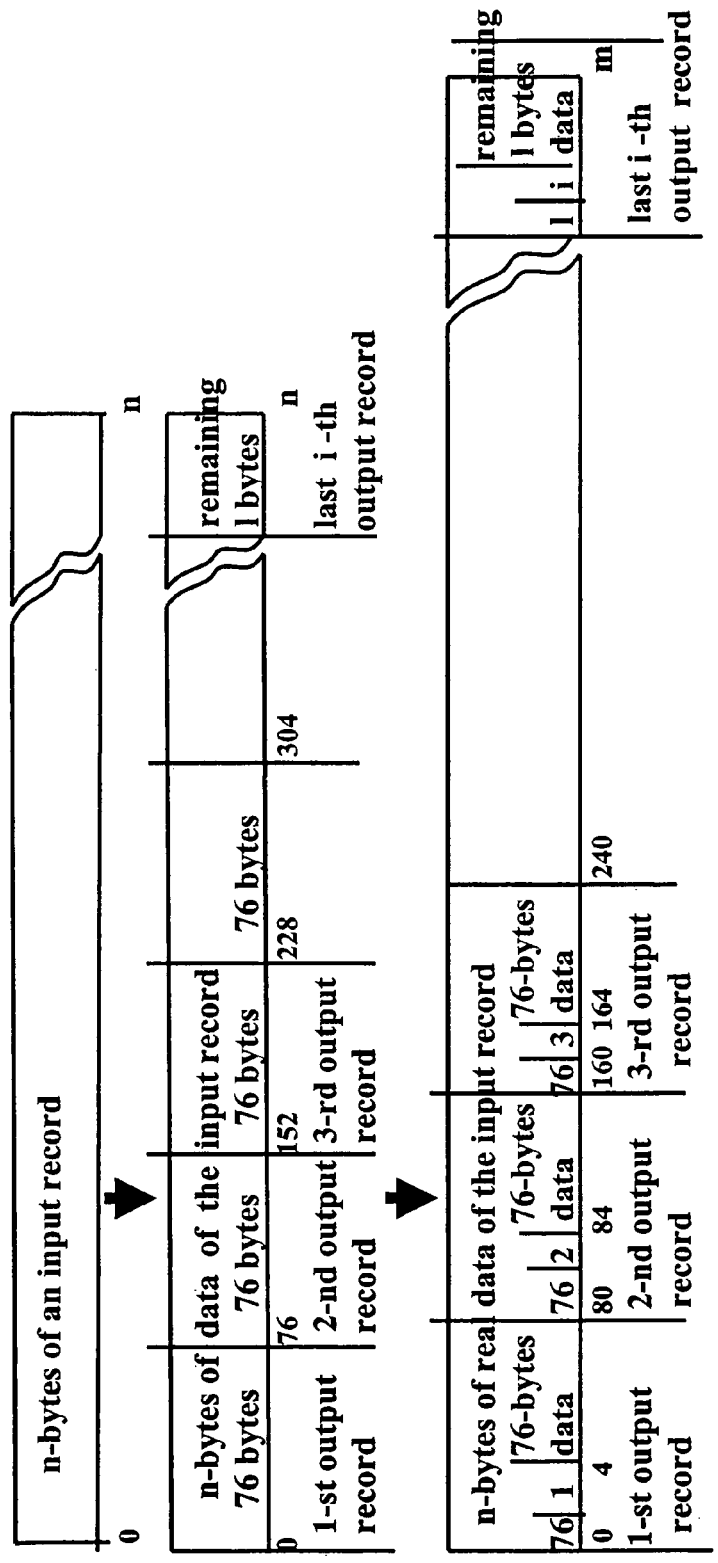

Fig. 18  A Conversion Method of Division into Shorter Records and A 4-bytes Header for Each Divided Shorter Record

* The input record is assumed as n bytes long.
The logical record length of the output (Download & Upload) dataset is assumed as 80-bytes long.
A 4-bytes header, for each divided shorter record, with
  2-bytes of real data length, e.g., 76 and
  2-bytes of sequence number of divided records
$i = [(n+75)/76]$     where i-th record is the last output record and [...] is an integer value
$l = n - ((i-1)*76)$   bytes of real data in the last output record
$m = (i-1)*80 + (l+4)$

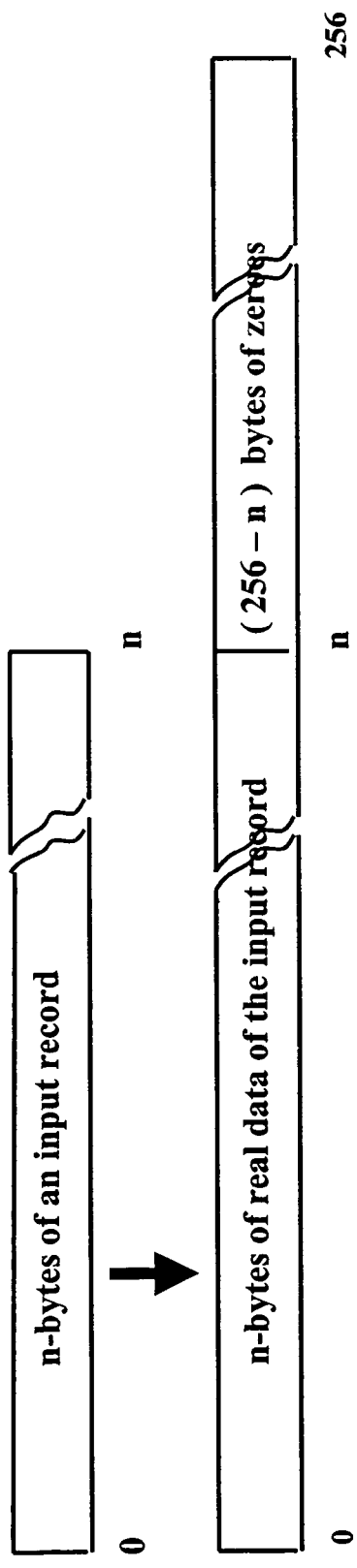

Fig. 19  Zero Padding of a record of a single load module

\* The logical record length of the output (Download & Upload) sequential dataset is the same as the block size (maxmum record length) of the input load module library where the target single load module is located. It is assumed as 256-bytes.

The length of the input record is assumed as n bytes long where the maximum value of n is the block size of the library and it is assumed as 256 and the minimum value of n is 1.

DISTRIBUTION OF MAINFRAME DATA IN THE PC ENVIRONMENT

This is a divisional of copending application Ser. No. 10/935,464 filed on Sep. 7, 2004 which is a continuation of application Ser. No. 09/726,462 filed Nov. 29, 2000, now U.S. Pat. No. 6,886,160 B1, claims the benefit thereof, and incorporates the same by reference.

FIELD OF THE INVENTION

The invention relates to the distribution method of mainframe data using PC-based data media. More specifically, the invention relates to a mainframe program for allowing the file transfer of mainframe sequential datasets and libraries of texts or load modules between a mainframe computer and a PC and between two mainframe computers using floppy diskettes, recordable CD-ROM, Internet world wide web, TCP/IP FTP, and email attachment, thus providing an alternative to magnetic tape reels and tape cartridges, also allowing the PC hard disk to be used as a backup storage of the mainframe libraries, as well as for allowing a mainframe text library which is downloaded to a PC to be edited on a local or remote stand-alone PC workstation.

DISCUSSION OF RELATED ART

There are currently more than 21,000 mainframe data centers worldwide. More than 2 trillion dollars has been invested in mainframe software (around 150 billion lines of COBOL code alone worldwide). Mainframe computers are becoming less expensive ($100,000/MIPS in 1992, $2,300/MIPS in 2000, and $840 in 2002). 70% of all business information resides in mainframe databases. The operation costs of the distributed computing based on mini-computers are high. More than anything else, businesses need machines with enough computative power, a need which mini-computers cannot satisfy. Mainframes will continue to be the main workhorses for big businesses for the foreseeable future.

Mainframes have been upgraded by replacing the former "dumb" terminals, such as the IBM 3270s terminals which provided little more than a keyboard and a display screen, with desktop personal computers (PCs). These PCs can also be used as stand-alone computers for text editing, word processing, and other office tasks, when not being used as mainframe terminals.

A PC can connect to a mainframe system with the proper software and proper communication link. A PC terminal connects to and communicates with a mainframe through an IBM Systems Network Architecture (SNA) 3270 protocol emulation software. The PC can operate as a LAN terminal using a LAN server, an SNA gateway, and a 3270 emulation software, e.g., Attachmate Extra Personal Client™. The PC can work as a stand-alone mainframe terminal through a Synchronous Data Link Control (SDLC) communication board, a leased-line modem, and a 3270 emulation software, such as Attachmate Extra™, 3270 Elite™, or Dynacomm/Elite™. Or an Internet-enabled PC can work as a stand-alone mainframe terminal through a Telnet server which supports TCP/IP application protocol TN3270 clients with TN3270 Telnet SNA 3270 protocol emulation software, such as QWS3270 Plus TN3270 Telnet Application™ of Jolly Giant Software or E-Term™ for IBM of DCSi.

The following procedure (Procedure #1) is a PC-mainframe connection procedure for an Internet-enabled PC with QWS3270 Plus TN3270 application software of Jolly Giant Software:

Procedure #1

A PC-to-Mainframe Connect using TN3270 Telnet

1. Start the program QWS3270.
2. 'QWS3270PLUS TN3270 Telnet' screen comes up.
   Click the Host menu.
3. Click Connect from the drop-down list.
4. 'Host Selection' screen comes up.
   Type Session_Name. e.g., lj01
     decided by Host site
   Type Host_Name. e.g., 123.45.67.89
     a Telnet server's IP address
   Type Port number. e.g., 21 or 23.
     decided by Host site
   Choose Terminal Type. e.g., IBM-3278-2
   Click Connect button.
5. Internet Dialing and Connecting screens come up.
6. The mainframe data center's main SignOn screen comes up.
   Type User Id. e.g., a TSO User ID. lj01
   Type Password. e.g., password of lj01
7. TSO screen comes up.

A PC connected to a mainframe with an IBM SNA 3270 protocol emulation software or the TN3270 Telnet software supports file transfers between the mainframe and the PC using the IBM mainframe program "IND$FILE". An Internet-enabled PC connected to a mainframe FTP server using the TCP/IP file transfer protocol (FTP) also supports the file transfer between the mainframe and the PC.

The three file transfer procedures (Procedures #2-4) between a mainframe and a PC are explained as examples. The first procedure (Procedure #2) is a file transfer during a TSO session using Attachmate Extra SNA 3270 emulation software:

Procedure #2

TSO File Transfer with Attachmate Extra Emulator

1. Get out of ISPF screen.
2. On 'READY' TSO prompt screen,
   click Tools menu.
3. Click Transfer_File from drop-down list.
4. On the 'Transfer File' screen:
   Type PC File name.
   Type Host_File name inside quotes.
   Choose the transfer direction between
     Send or Receive.
   Choose a Scheme between Binary or Text mode.
   Choose TSO between the Host Systems
     TSO, CICS, and CMS.
   Click Add_to List button.
   Click Transfer button.
5. 'File Transfer Progressing' screen comes up.
6. After the transfer is complete, the 'Transfer Summary' screen appears.
   Check for the message
     'TRANS03 File Transfer complete.'
7. Click OK button.
8. A 'READY' TSO prompt screen will appear.

The second procedure (Procedure #3) is for an FTP file transfer started from the Attachmate main screen without a TSO session:

Procedure #3

FTP File Transfer from Attachmate Main Screen

1. Terminate TSO session.
2. On Attachmate initial session list screen, click Tools menu.

3. Click File_Transfer from drop-down list.
4. On 'File transfer' screen:
   Type PC-File name.
   Type Host_File name inside quotes.
   Choose the transfer direction
      between Send or Receive.
   Choose a Scheme between Binary or Text mode.
   Click Transfer button.
5. On 'FTP Connect' screen:
   Type Host_IP address. e.g., 123.45.67.89 or
      alias of FTP server
   Type User_ID. e.g., a TSO User ID, lj01
   Type Password. e.g., a TSO User ID's password
   Click OK button.
6. 'File transfer' screen comes up.
7. On 'Transfer Summary' screen,
   check 'Transferred successfully' Comment message.
   Click OK button.
8. Attachmate initial session list screen comes up.

The third procedure (Procedure #4) is FTP File Transfer started from MS-DOS prompt screen:

Procedure #4

FTP file Transfer from MS-DOS Screen

1. Minimize or terminate all other applications including Attachmate Extra.
2. Start MS-DOS.
3. On MS-DOS screen with C:\WINDOWS> prompt:
   Type FTP after C:\WINDOWS> prompt.
   Press Enter key.
4. FTP> prompt comes up.
   Type OPEN and Host_IP-address at FTP> prompt.
      e.g., OPEN 123.45.67.89 or OPEN abc.def.ghij.com.
   Press Enter key.
5. Internet connection starts,
   Dialing screen and Connecting screens come up.
   And finally the Internet screen disappears.
6. Click the minimized FTP program icon.
7. MS-DOS screen appears again with FTP messages of "Connected" and others.
   Type User ID at User prompt. e.g., lj01
   Press Enter key.
   Type password at Password prompt
   Press Enter key.
8. "Logon successful" FTP message comes up with FTP> prompt.
   Type BINARY or ASCII at FTP> prompt.
   At the FTP> prompt,
   type GET 'LJ01.TEXT.LIB(TEXT1)' C:\LJ01\TEXT1.TXT
      for download from mainframe to PC or
   type PUT C:\LJ01\TEXT1.TXT 'LJ01.TEXT.TEMP1'
      for upload from PC to mainframe.
   Press Enter key
9. Transfer starts.
10. After completion of transfer,
    check for '250 transfer completed successfully' FTP message.
11. Type QUIT at FTP> prompt.
    Press Enter key.
12. Main Windows screen with all icons comes up.
    Click the minimized MS-DOS icon.
13. MS-DOS screen comes up again with C:\WINDOWS> prompt.
    Type EXIT at C:\WINDOWS> prompt.
    Press Enter key.
14. Original Windows screen with all icons comes up.

After the mainframe file is transferred to a PC, the mainframe data stored in a PC can be copied to a PC-related data media repeatedly. Ubiquitous PC usage worldwide and the file transfer capability make it possible to send and receive data between mainframe data centers using PCs. Furthermore, the rise of PC-based technologies in exchanging information, such as email attachments using SMTP, the Internet world wide web, and FTP send/receive facility, allow data centers to transfer mainframe data using methods which were not previously available.

However, mainframe installations still send their mainframe libraries of texts and program load modules to other data centers using the half-inch thick, 9-track, 1600/6250 BPI, 1,200 foot 8.5-inch diameter or 2,400 foot 10.5-inch diameter round reel tapes created from IBM 3420/3430 Magnetic-Tape Units or 18-track, 550 foot 38,000 BPI tape cartridges created from IBM 3480 Magnetic-tape Units located in the mainframe computer rooms. There have been no alternatives until now. These magnetic tapes or cartridges require IBM proprietary magnetic tape units.

There are two main reasons for using magnetic tapes exclusively to deliver a mainframe library. First, a part or whole of a mainframe library can not be downloaded (file transfer from a mainframe to a PC) as a whole. Currently, each member of the mainframe library can only be downloaded individually one at a time. Therefore a mainframe library can not be delivered to other data centers using PC-based data media. At mainframe data centers, libraries are processed only by dataset utility programs developed by IBM. Currently, IBM does not provide the capacity to distribute a mainframe library via PC-related data media.

Second, only sequential datasets of fixed length records (a "flat" file, in PC terms) or text datasets of undefined record format can be delivered to another data center using PC-related data media, and be safely reverted to its original form at another mainframe data center. While any sequential datasets can be downloaded to a PC a single file at a time, not all sequential datasets can be reverted to their original form when uploaded (file transfer from a PC to a mainframe) at the same or another data center.

During the downloading process each mainframe record is concatenated to the previous record to create a long thread of string, and stored upon the PC. The uploading process breaks down this long concatenated string of PC data into separate mainframe records. A text file can be downloaded to a PC in text mode with a carriage return (CR, hexadecimal value 0D) and line feed (LF, hexadecimal value 0A) marker appended to the end of each record as a record separator. This file can then be uploaded to a mainframe and reverted to its original form by detecting the CR/LF separator as a marker for the end of each record.

In general, any text file or hexadecimal file of fixed length records can be transferred to a PC in binary mode without appending a record end marker, and can be reverted to its original form when uploaded to a mainframe in the same binary mode. This is possible only because the length of all records are the same, and each record can be separated at the same length even without record separators. Text sequential datasets of undefined record format are rarely in use.

Mainframe load modules are not of fixed length records, they are of undefined record format and they contain a lot of non-character hexadecimal data. As a result, mainframe load modules can not be reverted to their original form when they are uploaded back to a mainframe. Therefore, currently, mostly text datasets of fixed length records, e.g., usually members of text libraries, are delivered, member by member, to other mainframe data centers using PC-based data media.

The mainframe library is a partitioned dataset (PDS) and is equivalent to a PC directory or subdirectory which contains a large number of files as its components. The mainframe library also contains components so called members. There are only two types of mainframe libraries, a text library with only text members and a load library with only program load module members. Each member has records in it. Members of a library have common attributes, such as the record format, maximum record length, and length of each record. Each member can be handled as a separate sequential dataset. A single member of a text or load library is simple to process, but the processing of a library as a whole is not simple.

Text library members have fixed length records of 80-bytes long, and are used for storing program source codes, macros, procedures (PROCs), JCL statements, help texts, instructions, manuals, documents, and letters. Currently, only text library members are downloaded to a PC one member at a time, and copies of each text member are delivered using PC-based data media if necessary. A part or whole of a text library is still delivered using conventional magnetic tapes or cartridges exclusively.

The mainframe program load module is different from text files. The members of a load module library are all executable program load modules (the output of the IBM linkage editor IEWL, also called a load module, and the equivalent of a PC "program" file with .exe, .com, or .dll extensions). Each member has individual records in it. Each record of a load module contains mostly non-readable, non-character hexadecimals, interspersed with some readable characters. The length of any record can be different from that of any other record. The load library is defined only with the maximum record length (at least 256 bytes, but usually greater than 12,000 bytes, upto 32,760 bytes). Each record can be less than 256 bytes long or longer than 256 bytes, up to 32,760 bytes long.

These load modules must be transferred to a PC in binary mode due to the fact that it contains hexadecimal data. A single program load module is handled as a sequential dataset of undefined record format, and it is not of fixed length records. Each record of different length must be separated from the next record by an end marker when downloaded to a PC, similar to the use of CR/LF as mentioned above in the case of the text mode transfer. However this end marker can be confused as normal hexadecimal data, and can not be handled correctly when uploaded to a mainframe. So, each record of a load module is concatenated at the end of the previous record without a separating marker when downloading. If this concatenated string of data, which does not possess a record separator, is uploaded to a mainframe in binary mode again, the end of each record can not be determined. Therefore the uploaded file will not have its original form, and will no longer be executable.

In summary, currently only a sequential dataset of fixed length records (e.g., a member of a text library), can be delivered to other mainframe data centers using PC-related data media. A part or whole library can not be downloaded to a PC as a single unit, so magnetic tapes or cartridges are exclusively used for the distribution of a part or whole of a program load library or text library to other mainframe data centers.

SUMMARY OF INVENTION

A new mainframe program, PCFORM, converts the content of the whole or a part of any mainframe library of load modules or texts or any sequential dataset of fixed record format, undefined record format or variable record format to a sequential dataset of fixed length records (FIGS. 17-19). These converted data can be subsequently downloaded to a PC and reverted to their original form in the same or another mainframe data center, if uploaded from a PC.

This invention makes it possible for software text and load libraries and VSAM and DB2 datasets, which are sequential datasets of undefined record format, to be transferred to another data center. Any libraries or any sequential datasets can be transferred to another data center.

This invention allows the mainframe data transfer to be conducted using PC-based data media as an alternative to the conventional magnetic tape reels and tape cartridges. The new program PCFORM can be even distributed by a diskette, a recordable CD-ROM, over the world wide web, via FTP, or as an email attachment, and installed at the user's mainframe without having to use the aforementioned tapes. After the installation of PCFORM, any kind of library can be transported to that data center via any PC data media.

The PC-based data media mentioned above to be used in conjunction with this invention can include any of the following: 3.5-inch standard 1.44 MB floppy diskettes, 650-700 MB recordable CD-ROM's, 100 MB or 250 MB ZIP disks, 3.5-inch 120-Mbytes SuperDisk diskettes, email, Internet Website, TCP/IP FTP or TELNET, and any other PC data media technologies which will be widely used in the future, such as recordable DVD-ROM's.

This invention helps mainframe programmers download their mainframe texts and load modules from expensive mainframe disks to cheap and high-capacity PC hard disks. This allows mainframe programmers to use PC hard disk space to store backups of their mainframe work text data and load modules. This avoids the excessive buildup of backup libraries within mainframe disks, as well as the external accumulation of magnetic tapes.

By downloading the mainframe text library data to a PC, the mainframe programmers can perform routine text editing work on a stand-alone PC work station, instead of signing on to the mainframe. The copy of the downloaded PC file can be carried to a remote PC, where the mainframe programmer can perform any text editing.

The main benefits of this invention are derived from the facts that (1) PCs are ubiquitous, and familiar to most mainframe data center users, (2) most mainframe data centers already have a file transfer facility between their PC terminals and the mainframe, (3) a PC hard disk file of the downloaded mainframe dataset can be used repeatedly, (4) copying from a PC hard disk to PC-based data media is simpler, easier, and faster than creating a mainframe magnetic tape, (5) delivery is easy and simple, (6) emerging CD-ROM, Internet, TCP/IP FTP, and email can be used, (7) PC data media can be a convenient means for the backup storage of a mainframe text library and load library, and (8) a PC, local or remote, can be used as a stand-alone working station for mainframe text editing, especially for program source codes.

The only requirement to be able to use this invention is that the sender and the receiver of this portable PC data media must have a file transfer facility between a mainframe and a PC. Then the program PCFORM can be installed on their mainframe system using the invention itself, without using any magnetic tapes from the start. After the program PCFORM is installed, a part or whole of any library or any sequential dataset can be downloaded to a PC, delivered to other mainframe computer data centers using PC-based data media, and uploaded from a PC in those receiving mainframe data centers.

There has been a need to better integrate emerging PC technology with mainframe technology, and to use the more convenient and cost effective PC-environment data transportation media in mainframe software libraries and data distribution. Also, there was a need to use cheap and high-capacity PC hard disks for storing mainframe text libraries, and use the PC as a stand-alone text editing work station for mainframe text library data in the PC hard disk.

The invention provides a method and apparatus for converting a part or whole of a mainframe software load library or text library or a mainframe sequential dataset of fixed record format, undefined record format or variable record format to a sequential dataset of fixed length records which can be distributed using PC-based data media to other mainframe computer data centers.

One embodiment of the invention provides a method and apparatus for reverting a mainframe software libraries and data delivered via PC-based data media to its original form when uploaded to a mainframe computer at the same site or at another site.

A further embodiment of the invention provides a method and apparatus for storing mainframe text libraries in a PC hard disk and working at a local or remote stand-alone PC for text editing of mainframe program source codes, macros, JCL streams, procs, manuals, documents, and letters which were downloaded from a mainframe.

BRIEF DESCRIPTION OF THE DRAWINGS

The invention and its particular features and advantages will become more apparent with examination of the following detailed description considered with the accompanying drawings, wherein:

FIG. 1 is a functional block diagram of the PC data media delivery of a single program load module when the sender has the program PCFORM, but the receiver does not;

FIG. 2 is a functional block diagram of the PC data media delivery of a program load library when both the sender and the receiver has the program PCFORM;

FIG. 3 is a functional block diagrams of the PC data media delivery of a text library when both the sender and the receiver has the program PCFORM;

FIG. 4 is a functional block diagrams of the PC data media delivery of a sequential dataset of fixed record format, undefined record format or variable record format when both the sender and the receiver has the program PCFORM;

FIG. 5 shows how this invention can be used with the Internet world wide web download;

FIG. 6 shows how this invention can be used with the Internet email attachment file;

FIG. 7 shows how this invention can be used with the TCP/IP FTP protocol;

FIG. 8 is a functional block diagram of the current conventional magnetic tape delivery;

FIGS. 9-16 are the block diagrams of the program PCFORM;

FIG. 17 shows the conversion of an input record with a 4-byes header and division into shorter records;

FIG. 18 shows the conversion of an input record with the division into shorter records and a 4-byes header for each divided shorter record;

FIG. 19 shows the conversion of an input record with zero padding at the end of the input data; and TABLE 1 is the listing of the source codes of the program PCFORM in assembler language.

DETAILED DESCRIPTION OF THE INVENTION

FIGS. 1 to 7 show four different situations within which this invention can be used with the PC-based data media. FIG. 8 shows the flow of events in the conventional magnetic tape delivery method. Before describing the block diagrams (FIGS. 1-7) of this invention, the flow diagram (FIG. 8) of the conventional magnetic tape delivery, is described first.

Conventional Delivery Using Magnetic Tapes

As an example explanation, let's assume that a software company, a sender 1, wants to deliver a whole text library, a program load module, and a whole load library 49 of a software package to a customer data center, a receiver 2, by tape 76. This explanation assumes that the name of a sender 1 is BSoft Co. The name of the software package to be delivered is assumed to be CPGM. Receiver 2 of this product CPGM will be referred to as C Co. The JCL streams of JCL Lists #1 and #2 explain how the events of FIG. 8 are actually handled in the mainframe data centers. The job control language (JCL) specifies the program name and the required files for the program. JCL streams or statements are entered to the operating system by the SUBMIT TSO command from the TSO/ISPF screen. The OS interprets these JCL statements, brings up the program from the step library or system load library, allocates the requested files, and passes the CPU control to the program.

A sender programmer 17 of a sending site 1 starts 71 a JCL stream of JCL List #1. An IBM utility program IEBCOPY 72 copies a whole text library, a program load module, and a whole load library 49 to tapes 76 as the output. A computer operator 69 mounts 73 the blank tape on the tape drive units when prompted by a system console 69. After IEBCOPY 72 finishes copying 74-75, system console 69 prompts the unloading 77 of tapes 76.

---

JCL List #1
Copy a text library, a load module and a load library to magnetic tape

---

```
//jobname  JOB (account),MSGCLASS=V,CLASS=L
//TEXTS    EXEC PGM=IEBCOPY
//IN DD DISP=SHR,DSN=BSOFT.CPGM.TEXTLIB
//OUT DD   DSN=TEXTLIB.TAPE,
//         DISP=(,KEEP,DELETE),
//         DCB=(BSOFT.CPGM.TEXTLIB),
//         UNIT=TAPE,
//         LABEL=(1,SL), dataset sequence no=1
//         VOL=(,RETAIN,,2) maximum 2 tapes
//SYSUT3   DD UNIT=SYSDA,SPACE=(TRK,(500,20))
//SYSUT4   DD UNIT=SYSDA,SPACE=(TRK,(500,20))
//SYSPRINT DD SYSOUT=*
//SYSIN    DD *
    COPY INDD=IN,OUTDD=OUT
//*
//LOAD1 EXEC PGM=IEBCOPY
//IN     DD   DISP=SHR,DSN=BSOFT.CPGM.LOADLIB
//OUT    DD   DSN=PROGRAM1.TAPE,
//         DISP=(,KEEP,DELETE),
//         DCB=(BSOFT.CPGM.LOADLIB),
//         UNIT=TAPE,
//         LABEL=(2,SL), dataset sequence no=2
//         VOL=(,RETAIN,,,REF=*.TEXTS.OUT)
//SYSUT3   DD UNIT=SYSDA,SPACE=(TRK,(500,20))
//SYSUT4   DD UNIT=SYSDA,SPACE=(TRK,(500,20))
//SYSPRINT DD SYSOUT=*
//SYSIN    DD *
    COPY INDD=IN,OUTDD=OUT
    SELECT MEMBER=(PROGRAM1)
//*
//LOADS EXEC PGM=IEBCOPY
//IN     DD   DISP=SHR,DSN=BSOFT.CPGM.LOADLIB
//OUT    DD   DSN=LOADLIB.TAPE,
//         DISP=(,KEEP,DELETE),
//         DCB=(BSOFT.CPGM.LOADLIB),
//         UNIT=TAPE,
//         LABEL=(3,SL), dataset sequence no=3
//         VOL=(,RETAIN,,,REF=*.LOAD1.OUT)
```

JCL List #1
Copy a text library, a load module and a load library to magnetic tape

```
//SYSUT3  DD UNIT=SYSDA,SPACE=(TRK,(500,20))
//SYSUT4  DD UNIT=SYSDA,SPACE=(TRK,(500,20))
//SYSPRINT DD SYSOUT=*
//SYSIN    DD *
   COPY INDD=IN,OUTDD=OUT
//
```

Receiver programmer 28 receives delivered tapes 79. Receiver programmer 28 checks the volume serial number of tapes and creates a JCL stream of JCL List #2. Receiver programmer at 28 brings received tapes 79 to a computer room 4 and starts a loading JCL streams in JCL List #2 which requests a tape mount 82, and copies 83-84 the content of tapes 79 to destination libraries 58. After a load job 81 finishes, the computer operator unloads 85 tapes 79.

JCL List #2
Loading a text library, a load module, and a load library from magnetic tape

```
//jobname  JOB (account),MSGCLASS=V,CLASS=L
//TEXTS EXEC PGM=IEBCOPY
//IN      DD   DSN=TEXTLIB.TAPE,
//             DISP=OLD,
//             UNIT=TAPE,
//             LABEL=(1,SL), dataset sequence no=1
//             VOL=(,RETAIN,,,SER=123456)
//*     destination text library
//OUT     DD   DSN=C.CPGM.TEXTLIB,
//             DISP=(,CATLG),
//             DCB=(DSORG=PO,RECFM=FB,
//                LRECL=80,BLKSIZE=8000),
//             UNIT=SYSDA,
//             SPACE=(CYL,(5,2,10)) depending on software
//SYSUT3  DD UNIT=SYSDA,SPACE=(TRK,(500,20))
//SYSUT4  DD UNIT=SYSDA,SPACE=(TRK,(500,20))
//SYSPRINT DD SYSOUT=*
//SYSIN    DD *
   COPY INDD=IN,OUTDD=OUT
//*
//LOAD1 EXEC PGM=IEBCOPY
//IN      DD   DSN=PROGRAM1.TAPE,
//             DISP=OLD,
//             UNIT=TAPE,
//             LABEL=(2,SL), dataset sequence no=2
//             VOL=(,RETAIN,,,REF=*.TEXTS.IN)
//*     destination load library
//OUT     DD   DSN=C.CPGM.LOADLIB,
//             DISP=(,CATLG),
//             DCB=(DSORG=PO,RECFM=U,BLKSIZE=32760),
//             UNIT=SYSDA,
//             SPACE=(CYL,(20,5,50)) depending on software
//SYSUT3  DD UNIT=SYSDA,SPACE=(TRK,(500,20))
//SYSUT4  DD UNIT=SYSDA,SPACE=(TRK,(500,20))
//SYSPRINT DD SYSOUT=*
//SYSIN    DD *
   COPY INDD=IN,OUTDD=OUT
//*
//LOADS EXEC PGM=IEBCOPY
//IN      DD   DSN=LOADLIB.TAPE,
//             DISP=OLD,
//             UNIT=TAPE,
//             LABEL=(3,SL), dataset sequence no=3
//             VOL=(REF=*.LOAD1.IN)
//*     destination load library
//OUT     DD   DSN=C.CPGM.LOADLIB,
//             DISP=OLD
//SYSUT3  DD UNIT=SYSDA,SPACE=(TRK,(500,20))
//SYSUT4  DD UNIT=SYSDA,SPACE=(TRK,(500,20))
//SYSPRINT DD SYSOUT=*
//SYSIN    DD *
```

JCL List #2
Loading a text library, a load module, and a load library from magnetic tape

```
   COPY INDD=IN,OUTDD=OUT
//
```

The tape delivery method is characterized by the operator interventions 73, 77, 82, 85, tapes 76, 79, two tape control units in two computer rooms 3, 4 and moving tapes between computer rooms 3, 4 and programmers' work areas 17, 28.

Delivery by the Present Invention

FIGS. 1-7 show four different situations within which this invention can be used with the PC-based data media. The floppy diskette is most common PC-based data media. The recordable CD-ROM is easy and simple to use and provides enough capacity for most mainframe data delivery situations. More and more mainframe data centers are in a situation in which they are ready to use the Internet and the TCP/IP FTP as the data transportation media. This invention does not require the involvement of any mainframe computer operators 69 and 70 nor magnetic tape drive units 76 and 79, as is required in the conventional tape delivery method shown in FIG. 8.

This new PC data media delivery method can be used in two different ways: when the receiver with and without the program PCFORM installed.

1. When a Receiver Doesn't have the Program PCFORM

FIG. 1 show the flow of the functional events in Procedure #5 when a sender 1 has a program PCFORM 13, but a receiver 2 doesn't have it. Sender 1 tries to send a copy of a single program load module 8 to another data center 2 which does not have the mainframe program PCFORM 13. In this case, receiver 1 can handle an individual program load module separately, but cannot handle a whole library of data.

Procedure #5

When the Receiver Doesn't have the Program PCFORM

1. A sender programmer at a PC 17 converts single mainframe program load module 8 to a download sequential dataset 16 of fixed record length of 256 bytes.
2. Sender programmer at 17 downloads 18-23 the converted content in download sequential dataset 16 to PC 17 hard disk using Procedure #2, #3 or #4.
3. Sender programmer at 17 chooses a PC data media 25, copies. PC 17 hard disk file to a transportation media 25, and mails 26 it, or notifies receiver 2 that program load module 8 is in a sender's Website 62 or FTP site 65.
4. A receiver programmer at PC 28 receives 26 a PC data media 27 and stores 29 it in PC 28 hard disk.
5. Receiver programmer at 28 uploads 30-35 the received data from PC 28 to a mainframe upload sequential dataset 36 of the same record length, 256 bytes, as used for download sequential dataset 16 at sender 1.
6. Receiver programmer at 28 converts the content of upload sequential dataset 36 to a member of a destination program load library 46 using an IBM utility program IEBGENER 38 and an IBM linkage editor IEWL 43.

2. When the Receiver has the Program PCFORM.

FIGS. 2-4 show the flow of functional events in Procedure #6 when both a sender 1 and a receiver 2 have program PCFORM 48, 55. Sender 1 can send a single load module, a part or whole of a load library, a part or whole of a text library or any sequential dataset 49 to receiver 2.

Procedure #6

When the Receiver has the Program PCFORM

1. A sender programmer at a PC 17 converts 50-51 a whole or part of program load module library, a whole or part of text library or a sequential dataset 49 to a download sequential dataset 52 of fixed length record of 80-bytes long using program PCFORM 48.
2. Sender programmer at 17 downloads 18-23 the content of download sequential dataset 52 to PC 17 hard disk using Procedure #2, #3 or #4.
3. Sender programmer at 17 chooses a PC data transportation media 25, copies PC 17 hard disk file(s) to transportation media 25, and mails 26 them or notifies receiver 2 that program load module(s) and/or text(s) are in a sender's Website 62 or FTP Server 65.
4. A receiver programmer at a PC 28 receives 26 a PC data media 27 and stores 29 them in PC 28 hard disk.
5. Receiver programmer at 28 uploads 30-35 the received data from PC 28 hard disk to a mainframe upload sequential dataset 53 of the same record length, 80 bytes, as used for download sequential dataset 52 of sender 1.
6. Receiver programmer at 28 converts 56-57 the content of mainframe upload sequential dataset 53 to a part or whole of a destination program load module library, a part or whole of a destination text library or a destination sequential dataset of respective record format 58 accordingly using program PCFORM 55.

For both above two situations of Procedures #5 and #6, the first three steps are for sender 1 (i.e., a mainframe software vendor company) to create PC 17 hard disk file(s) from a whole or part of program load module library, a whole or part of text library or a sequential dataset 49 of a sender's mainframe system.

The last three steps are for receiver 2 (i.e., general user mainframe data centers) to convert data delivered in PC data media 27 to members of mainframe destination load module library or text library or a sequential dataset 58. At step 6, if program load module library and/or text library 58 already exists in a user data center 4, only the delivered members of libraries will be added or updated in place.

A downloaded mainframe data file in PC hard disk can be copied to a Website 62 and downloaded by authorized mainframe users 28 via the Internet 60 as in FIG. 5. The program can be sent to each email user 28 directly as an email attachment as in FIG. 6. Or receiver programmer 28 can receive the content of sender's mainframe download dataset 16 via TCP/IP FTP as in FIG. 7.

The above two different situations, FIG. 1 and FIGS. 2-4, are described in more detail. All blocks, except blocks of TSO File Transfer and IND$FILE, in the figures represent different JCL streams, JCL Lists #3, #4, #6, #7, #9 and #12, which are explained in more detail. FIG. 1 is described first, and then FIGS. 2-4 are explained.

Detail Description of FIG. 1

FIG. 1 shows the functional block diagram when sender 1 has program PCFORM 13, but receiver 2 doesn't have the mainframe program PCFORM. In this situation, receiver 2 can only handle a single load module. This diagram explains how to send single program load module 8 to a mainframe user data center 2 via floppy diskettes or recordable CD-ROM 25, 27 without the involvement of magnetic tapes, and how to install the program into a mainframe destination load library 46. This diagram also shows how the new program PCFORM can be delivered to other software companies and general mainframe user companies without the need for magnetic tapes at the beginning.

For this example explanation, the JCL streams assume that the name of sender 1 is ASoft Co., the developer of the program PCFORM. The name of the program to be delivered is assumed to be PCFORM. In the example, receiver does not have the program PCFORM. Receiver 2 of this product PCFORM will be referred to as C Co., with a mainframe data center 4. Program PCFORM 8 is assumed to be in the program library ASOFT.LOADLIB at sender 1. The delivered PCFORM will be installed in C Co.'s destination load library, C.ASOFT.LOADLIB 46.

Download Procedure of the Sender in FIG. 1

The left side of FIG. 1 describes the download procedure for sender 1 to create portable floppy diskette or recordable CD-ROM 25.

The first step of creating download sequential dataset 16 is done by use of an IBM linkage editor program IEWL 7. The maximum record length of input load module PCFORM 8 in the COPYLIB load library is usually very large, e.g., up to 32,760 bytes. The maximum record length of an output temporary load module member 11 in a SYSLMOD temporary load library is defined as 256 bytes as a default: this is the recommended length. The BLKSIZE value of SYSLMOD temporary load library 11 must be 256 bytes or greater. But the BLKSIZE of 256 bytes is recommended. Step 7 converts 9-10 original load module PCFORM 8 into new temporary load module 11 of shorter-records. IBM linkage editor IEWL 7 performs this conversion when sender programmer 17 enters 6 a JCL stream of JCL List #3 to the operating system.

---

JCL List #3
Creating a temporary load module of shorter length

```
//jobname  JOB (account),MSGCLASS=V,CLASS=L
//LKED EXEC PGM=IEWL,PARM='MAP,XREF,LET,LIST'
//SYSPRINT DD SYSOUT=*
//SYSLOUT  DD SYSOUT=*
//SYSUT1   DD    DSN=&&SYSUT1,
//                UNIT=SYSDA,SPACE=(CYL,(2,1))
//COPYLIB  DD    DISP=SHR,DSN=ASOFT.LOADLIB
//SYSLMOD  DD    DSN=TEMP.LOADLIB,
//                DISP=(,CATLG),
//                DCB=(DSORG=PO,RECFM=U,
//                    LRECL=0,BLKSIZE=256)
//                UNIT=SYSDA,SPACE=(CYL,(1,1,3))
//SYSLIN   DD *
  ENTRY  PCFORM
  INCLUDE COPYLIB(PCFORM)
  NAME   TEMPTEMP
//
```

---

Here, the SYSLIN control information may be adjusted for each program load module 8 and receiver 2 of this program will use this SYSLIN control information when he uploads the program delivered. Depending on the software program, the first SYSLIN line ENTRY control statement may or may not be required, and can have a different name from that of the program.

Output temporary load module TEMPTEMP 11 in the SYSLMOD library is still an executable load module, which means that the length of each record in the module may be different from the length of others.

At the next step, program PCFORM 13 converts 14-15 temporary load module TEMPTEMP 11 to download sequential dataset 16 of uniform fixed length records. This conversion is necessary because only uniform fixed length records of a load module can be reverted to the original load module status when they are downloaded to a PC and uploaded to a mainframe back again. Program PCFORM 13 is executed by entering 12 a JCL stream of JCL List #4 to the OS/390 by sender programmer at 17:

---
JCL List #4
Creating the revertible sequential dataset from the
temporary load module
---
```
//jobname   JOB (account),MSGCLASS=V,CLASS=L
//CONVERT EXEC PGM=PCFORM
//STEPLIB DD DISP=SHR,DSN=ASOFT.LOADLIB
//IN      DD   DISP=SHR,DSN=TEMP.LOADLIB(TEMPTEMP)
//OUT     DD   DSN=DOWNLOAD.WORK,
//             DISP=(,CATLG),
//             DCB=(DSORG=PS,RECFM=FB,
//                  LRECL=256,BLKSIZE=2560),
//             UNIT=SYSDA,SPACE=(CYL,(1,1))
//CONTROL DD *
DUMP
//
```
---

The LRECL value of output download sequential dataset 16 specified by OUT ddname must be the same as the BLKSIZE value (256 bytes is recommended and is used as the default) of IN temporary load library 11 created by a JCL stream of JCL List #3. The disk SPACE value of OUT download sequential dataset 16 is approximately the same as the size of original program load module 8, when the value of its LRECL is near 256.

Original program load module library 8 itself can be used directly as the IN dataset of above JCL stream (JCL List #4). In this case, linkage editor IEWL 7 step which was necessary in the previous case can be eliminated. But because the LRECL value of OUT download sequential dataset 16 must be the same as the BLKSIZE value of the IN dataset, and due to the large BLKSIZE of original load library 8 (e.g., up to 32,760), the LRECL value of OUT download sequential dataset 16 becomes correspondingly very large. Thus the total output size to transfer between a mainframe and a PC, and between two mainframe data centers can be very large. This is not recommended. The smaller the LRECL value of the OUT dataset, the smaller the amount of the data which needs to be transferred. This is why the minimum allowable value, 256 bytes, is recommended as the default value.

Now, download sequential dataset 16 is ready to be transferred to a PC.

Sender programmer at 17 transfers 18-23 the content of mainframe download sequential dataset, DOWNLOAD.WORK, 16 to PC 17 as C:\pcform.exe in Binary mode using Procedure #2, #3 or #4.

Sender programmer at 17 copies 24 C:\pcform.exe, to a PC data transportation medium 25, e.g., a floppy diskette, A:\pcform.exe, or a recordable CD-ROM, D:\pcform.exe.

This dataset data can include letters, installation guides, installation JCLs, help information, manuals, and other documents.

Sender 1 mails 26 diskette or CD-ROM 25 to receiver data center 2.

A downloaded load module file in PC 17 hard disk can be copied to a Website 62 and downloaded by authorized mainframe users 28 via the Internet 60 as in FIG. 5. The program can be sent to each email user 28 directly as an email attachment as in FIG. 6. Or receiver programmer 28 can receive the content of sender's mainframe download dataset 16 via TCP/IP FTP as in FIG. 7.

Upload Procedure of the Receiver in FIG. 1

The right side of FIG. 1 describes the functional event flow at receiver's mainframe site 2, referred to as the upload procedure for the user data center.

Receiver programmer at 28 of mainframe site 2 receives floppy diskettes or CD-ROM 27 mailed 26 from sender 1 and saves 29 the content of diskettes or CD-ROM 27 to the hard disk of PC 28. Receiver programmer at 28 copies A:\pcform.exe or D:\pcform.exe to C:\ASOFT\pcform.exe.

Receiver programmer at 28 submits a JCL stream in JCL List #5 to the mainframe operating system to create upload sequential dataset 36, destination program load library 46, and destination text library 46 which will receive the data delivered.

The LRECL value 256 of FILE1 upload sequential dataset 36 must be the same value as the LRECL value (256 bytes recommended and used as the default) of download sequential dataset 16 of sender 1.

The BLKSIZE value 32,760 of FILE2 destination load library 46 is the maximum allowed value, and is the value which is recommended to use for the transfer. This value can be changed to any number equal to 256 bytes or greater.

---
JCL List #5
Creating the receiving datasets
---
```
//jobname   JOB (account),MSGCLASS=V,CLASS=L
//NEWDS   EXEC PGM=IEFBR14
//FILE1 DD  DSN=UPLOAD.WORK,
//          DISP=(,CATLG),
//          DCB=(DSORG=PS,RECFM=FB,
//               LRECL=256,BLKSIZE=2560),
//          UNIT=SYSDA,SPACE=(CYL,(1,1))
//*   destination load library
//FILE2 DD  DSN=C.ASOFT.LOADLIB,
//          DISP=(,CATLG),
//          DCB=(DSORG=PO,RECFM=U,
//               BLKSIZE=32760),
//          UNIT=SYSDA,
//          SPACE=(CYL,(1,1,5)) depending on software
//*   destination text library
//FILE3 DD  DSN=C.ASOFT.TEXTLIB,
//          DISP=(,CATLG),
//          DCB=(DSORG=PO,RECFM=FB,
//               LRECL=80,BLKSIZE=8000),
//          UNIT=SYSDA,
//          SPACE=(CYL,(5,2,10)) depending on software
//
```
---

Receive-r programmer at 28 transfers 30-35 delivered data in PC 28, C:\ASOFT\pcform.exe, to mainframe upload sequential dataset, UPLOAD.WORK, 36 in Binary mode using Procedures #2, #3 or #4.

Receiver programmer at 28 submits 37 a JCL stream in JCL List #6. JCL List #6 then calls IBM dataset utility program IEBGENER 38 and copies 39-40 the content of SYSUT1 upload sequential dataset 36 into a temporary member TEMPTEMP 41 of SYSUT2 destination load library 46.

---
JCL List #6
Creating a temporary member in a load library
---
```
//jobname    JOB (account),MSGCLASS=V,CLASS=L
//COPY EXEC PGM=IEBGENER
//SYSUT1 DD DISP=SHR,DSN=UPLOAD.WORK
//SYSUT2 DD DISP=SHR,DSN=C.ASOFT.LOADLIB(TEMPTEMP)
//SYSIN     DD DUMMY
//SYSPRINT  DD DUMMY
//
```

Temporary output member TEMPTEMP 41 or of SYSUT2 destination load library is not executable. Its only purpose is to be used as the input for linkage editor IEWL 43 in a next JCL stream of JCL List #7.

Receiver programmer at 28 then submits 42 a JCL stream in JCL List #7 which calls IBM utility program linkage editor IEWL and converts 44-45 non-executable member TEMPTEMP 41 of COPYLIB library to an executable load module member PCFORM 46 in the SYSLMOD destination load library.

JCL List #7
Creating the executable load module member from the temporary member

```
//jobname  JOB (account),MSGCLASS=V,CLASS=L
//LKED EXEC PGM=IEWL,PARM='MAP,XREF,LET,LIST'
//SYSPRINT DD SYSOUT=*
//SYSLOUT  DD   SYSOUT=*
//SYSUT1   DD   DSN=&&SYSUT1,UNIT=SYSDA,
//               SPACE=(CYL,(1,1))
//COPYLIB  DD   DISP=SHR,DSN=C.ASOFT.LOADLIB
//SYSLMOD  DD   DISP=SHR,DSN=C.ASOFT.LOADLIB
//SYSLIN   DD   *
  ENTRY PCFORM
  INCLUDE COPYLIB(TEMPTEMP)
  NAME  PCFORM
//
```

JCL List #7 creates an executable final load module member PCFORM 46, which was delivered in a converted form via diskette or CD-ROM 27, in SYSLMOD destination load library 46.

This example description illustrates how single load module PCFORM 46 was delivered via floppy diskette or CD-ROM 27, without having to use conventional magnetic tape 79, and is installed just using the available IBM utility programs at mainframe user data center 2, even without the help of the program PCFORM.

In summary, this invention will now allow a general mainframe user company, e.g., C Co., to receive any library and any sequential datasets from any mainframe software company, using any kind of PC-based data media, without any need whatsoever for the conventional magnetic tapes which are being currently used for such transfers.

Detail Description of FIGS. 2 and 3

A situation in which both sender 1 and receiver 2 have program PCFORM 48, 55 will now be explained. In this scenario both sender 1 (a software company) and receiver 2 (a general mainframe data center) have installed program PCFORM 48, 55 by the method depicted in FIG. 1, and as explained above.

FIGS. 2 and 3 diagrams explain how to send and install a whole or part of a load library or a text library of a mainframe software company 1 to a mainframe user data center 2 via floppy diskettes or recordable CD-ROM 25 without the use of magnetic tapes. FIG. 4 diagram show how a mainframe data center 1 send a sequential dataset of fixed record format, undefined record format or variable record format, e.g., copy datasets of VSAM datasets or DB2 datasets, to another mainframe data center using PC-based data media.

FIGS. 2 and 3 are explained first and FIG. 4 will be explained later.

The JCL streams of this diagram also assumes for the sake of convenience, as in the FIG. 1 explanation, that the name of sender 1, a mainframe software company, is assumed to be BSoft Co. A client company 2 of BSoft Co. is assumed to be C Co. The name of a mainframe software package 49 to be delivered to C Co. is CPGM. The load modules and related texts of the mainframe software package, CPGM, reside in the libraries BSOFT.CPGM.LOADLIB and BSOFT.CPGM.TEXTLIB at BSoft Co. They will be installed into the destination libraries C.CPGM.LOADLIB and C.CPGM.TEXTLIB of C Co. Program PCFORM is assumed in the program library BSOFT.ASOFT.LOADLIB at BSoft Co. and C.ASOFT.LOADLIB at C Co.

This example diagram is based on the use of 3.5-inch standard 1.44 MB floppy diskettes 25 and 27. Using recordable CD-ROM media is simpler than floppy diskettes.

Download Procedure of the Sender in FIGS. 2 and 3

We will begin by detailing the download procedure for sender 1 to create portable floppy diskettes 25 containing the data to be transferred.

Sender programmer at 17 creates a JCL stream in JCL List #8 for creating download sequential dataset 52 of fixed length records.

JCL List #8
Creating the download sequential dataset

```
//jobname  JOB (account),MSGCLASS=V,CLASS=L
//NEWDS  EXEC PGM=IEFBR14
//FILE1 DD  DSN=DOWNLOAD.WORK,
//            DISP=(,CATLG),
//            DCB=(DSORG=PS,RECFM=FB,
//              LRECL=80,BLKSIZE=8000),
//            UNIT=SYSDA,SPACE=(CYL,(10,10))
//
```

The primary and secondary quantity of CYLinders may be different depending on the size of each target load library or text library to be delivered, and whether a whole or part of the library or just a single member is to be delivered. One cylinder can hold approximately 650 K bytes of data. In the above example the SPACE parameter specifies a maximum of 160 cylinders and an approximate maximum of 104 million bytes (equivalent to approximately 7 2400-ft magnetic tape reels). Download sequential dataset 52 is used repeatedly, so SPACE parameter should be allocated a high enough value to fit all the libraries to be sent out.

The LRECL value of texts is fixed at 80 bytes. There is no variety and thus no confusion about the LRECL value for a text library. But for program load modules, sender programmer at 17 can choose any fixed LRECL value of 80 or greater for download sequential dataset, DOWNLOAD.WORK, 52. Receiver-programmer at 28 of mainframe site 2 must use this same LRECL value to create upload sequential dataset 53. In order to avoid any confusion, the LRECL value of download sequential dataset 52 can be fixed at 80-bytes long as a default value for both the program load modules and texts. The LRECL value 80 is strongly recommended. And this default value of 80 bytes length is used in this example explanation. This dataset of 80 bytes record length can be used for both text libraries and load libraries.

When program load modules are sent out to users, sender programmer 17 may notify receiver programmer 28 about the BLKSIZE value of original load module library, e.g., BSOFT.CPGM.LOADLIB 49. Receiver programmer 28 can create destination program load module library 58 with the BLKSIZE value suggested by sender programmer 17, or greater up to the maximum allowed BLKSIZE value of 32,760 which can receive any BLKSIZE value of original load library 49.

Sender programmer at 17 submits the above IBM dataset utility program IEFBR14 JCL stream (JCL List #8) to create download sequential dataset, DOWNLOAD.WORK 52.

Download sequential dataset 52 and other download work datasets which will be created later will be used repeatedly for each library download. Therefore the full procedure, from the submission 47 of PCFORM program 48 to the completion 23 of the file transfer to a PC, must be done separately for each library whether it is a load library or a text library. A library is downloaded to a PC one library at a time.

Sender programmer at 17 creates a JCL stream (JCL List #9) which will bring up program PCFORM 48 from the STEPLIB library. The IN DD statement identifies original text or load library 49 to be delivered. The OUT dataset is download sequential dataset 52.

---

JCL List #9
Dumping the content of a load library to the download sequential dataset

---

```
//jobname JOB (account),MSGCLASS=V,CLASS=L
//PCFORM EXEC PGM=PCFORM
//STEPLIB DD DISP=SHR,DSN=BSOFT.ASOFT.LOADLIB
//SYSPRINT DD SYSOUT=*
//*       original library
//IN      DD DISP=SHR,DSN=BSOFT.CPGM.LOADLIB
//*       download dataset
//OUT     DD DISP=SHR,DSN=DOWNLOAD.WORK
//CONTROL DD *
DUMP
//
```
---

The DUMP CONTROL command without any member makes program PCFORM 48 dump 50-51 whole records in IN input original text or load library 49 to OUT output download sequential dataset 52.

The CONTROL control command DUMP converts the content of IN original library 49 to OUT download sequential dataset 52 records. The DUMP command starts at column 1 and can be followed by any number of library member names; in this case only the named members will be dumped to download sequential dataset 52. More than one member list lines can follow the DUMP control command line, but the first column must be blank. Using DUMP control command without any member names, as shown in the above sample JCL stream, will convert the whole content of original library 49 to download sequential dataset 52 records.

---

JCL Note #1
Examples of free format DUMP command syntax

---

```
(1). DUMP
(2). DUMP    PROGRAM1    Program2
       program3,PROGRAM4,
         PROGRAM5    program6,
       PROGRAM7,PROGRAM8
(3). DUMP
       PROGRAM1    PROGRAM2
         PROGRAM3,      PROGRAM4
           PROGRAM5
             PROGRAM6,PROGRAM7
(4). DUMP    (
       JCL1, JCL2, JCL3, HELP1,
       HELP2, UPLOAD1,
         Manual1
           Manual2
       ERRORMSG    ,VENDOR
       )
```
---

Let's start with the download of load library 49 first. The download procedure of a text library will be repeated after the completion of the load library download.

Sender programmer at 17 submits 47 above PCFORM program JCL stream (JCL List #9) to dump the software package in original load library 49 to download sequential dataset 52.

If output download sequential dataset 52 is too big for a standard 1.44 MB floppy diskette, the records in download sequential dataset 52 must be divided into smaller sequential datasets in order to use 1.44 MB floppy diskettes as the transportation media. This division is necessary only for 1.44 MB floppy diskettes. If a recordable CD-ROM is used, this division is not necessary. Also, if the data is to be transferred over the world wide web or the TCP/IP FTP, this division is not necessary.

If a text member or a part or whole of a text library is downloaded to a PC, sometimes it can be edited in the PC using a PC word processor or an ASCII editor. Therefore it is handy to keep the text file small enough to edit in the PC using ASCII editor. Some ASCII editors can not handle larger files.

For load modules, this division can be done only in the mainframe. But for texts, this division can be done in the mainframe or in a PC with PC word processors or ASCII text editors.

One 3.5-inch floppy diskette can deliver 1.4 million bytes or up to approximately 17,000 records of 80-byte length mainframe records. But let's use the number 15,000 as an example for simplicity. If the library to be downloaded is a text library, it is recommended to divide the library into smaller datasets which are easier for PC text editors to handle.

If download sequential dataset, DOWNLOAD.WORK, 52 contains more than 15,000 records of 80-byte long, it is necessary to create more than one smaller temporary work sequential datasets, e.g., DOWNLOAD.WORK1 and DOWNLOAD.WORK2, and so on, until the whole library can be divided into approximately 15,000 80-byte records per each smaller dataset. These temporary smaller datasets are created using the same DCB parameters as download sequential dataset 52, that is, DSORG=PS, RECFM=FB, LRECL=80, BLKSIZE=8000, but with a different SPACE parameter, SPACE=(CYL,(1,1)) for example.

And sender programmer at 17 divides the content of download sequential dataset, DOWNLOAD.WORK, 52 into smaller datasets of 15,000 records for each dataset using the TSO/ISPF EDIT panel or another software program. For an explanation, let's assume that download sequential dataset 52 was divided into four smaller datasets, DOWNLOAD.WORK1, DOWNLOAD.WORK2, DOWNLOAD.WORK3, and DOWNLOAD.WORK4.

Now, download sequential dataset(s) 52 is ready to be downloaded to a PC.

Sender programmer at 17 transfers 18-23 mainframe download sequential datasets 52 to the hard disk of PC 17 individually in Binary mode using Procedure #2, #3 or #4:

1. if download sequential dataset 52 itself is to be downloaded 18-23, download DOWNLOAD.WORK to the PC file C:\CPGM.exe, or 2. if download sequential dataset was divided into smaller datasets,
   download DOWNLOAD.WORK1 to C:\CPGM1.exe,
   download DOWNLOAD.WORK2 to C:\CPGM2.exe,
   download DOWNLOAD.WORK3 to C:\CPGM3.exe,
   download DOWNLOAD.WORK4 to C:\CPGM4.exe.

Now, whole original load library 49 is stored in the hard disk of PC 17. It is ready to be delivered to any client user data center 2, e.g., including C Co. in this example.

Now, let's repeat the full download procedure for text library 49. As mentioned before, the download for each individual library starts with the submission 47 of program PCFORM JCL stream (JCL List #10).

This time, the IN dataset of PCFORM program 48 is a text library 49. Same download sequential dataset 52 is used repeatedly as the OUT dataset. So the previous content of download sequential dataset 52 will be overwritten with new content every time after this step 48.

---
JCL List #10
Dumping the content of a text library to the download sequential dataset
---

```
//jobname JOB (account),MSGCLASS=V,CLASS=L
//PCFORM EXEC PGM=PCFORM
//STEPLIB DD DISP=SHR,DSN=BSOFT.ASOFT.LOADLIB
//SYSPRINT DD SYSOUT=*
//*       original library
//IN      DD DISP=SHR,DSN=BSOFT.CPGM.TEXTLIB
//*       download dataset
//OUT     DD DISP=SHR,DSN=DOWNLOAD.WORK
//CONTROL DD *
 DUMP
//
```

After PCFORM program 48 is finished successfully, the content of download sequential dataset 52 can be divided into smaller work datasets, e.g., DOWNLOAD.WORK1, DOWNLOAD.WORK2, DOWNLOAD.WORK3, DOWNLOAD.WORK4, and so on, using the same method as used for the load library above.

As the final step of the text library download, sender programmer 17 transfers 18-23 the mainframe datasets to the hard disk of PC 17 individually in Text mode using Procedure #2, #3 or #4:

1. if download sequential dataset 52 itself is to be downloaded, download DOWNLOAD.WORK to the PC file C:\CPGM.txt, or
2. if download sequential dataset 52 was divided into smaller work datasets,
    download DOWNLOAD.WORK1 to C:\CPGM1.txt,
    download DOWNLOAD.WORK2 to C:\CPGM2.txt,
    download DOWNLOAD.WORK3 to C:\CPGM3.txt,
    download DOWNLOAD.WORK4 to C:\CPGM4.txt.

Now, whole program load library and/or whole text library 49 are stored in the hard disk of PC 17. They are ready to be delivered to any client user data center 2, e.g., C Co. in this example.

Sender programmer at 17 copies 24 all parts of the downloaded libraries from the hard disk of PC 17 to PC data media 25. In the case of the example below, the libraries are copied to 1.44 MB floppy diskettes:
    copy C:\CPGM1.exe to A:\CPGM1.exe
    copy C:\CPGM2.exe to A:\CPGM2.exe
    copy C:\CPGM3.exe to A:\CPGM3.exe
    copy C:\CPGM4.exe to A:\CPGM4.exe
    copy C:\CPGM1.txt to A:\CPGM1.txt
    copy C:\CPGM2.txt to A:\CPGM2.txt
    copy C:\CPGM3.txt to A:\CPGM3.txt
    copy C:\CPGM4.txt to A:\CPGM4.txt This data will be accompanied with letters, installation guides, installation JCLs, help information, manuals, and other documents.

Now, sender programmer 17 mails diskettes 25 which were created.

As like the explanation of FIG. 1 diagram, downloaded load module and text files in PC 17 hard disk can be copied to a Website 62 and downloaded by authorized mainframe users 28 via the Internet 60 as in FIG. 5. The files can be sent to each email user 28 directly as an email attachments as in FIG. 6. Or receiver programmer 28 can receive the content of sender's mainframe download dataset 16 via TCP/IP FTP as in FIG. 7.

Upload Procedure of the Receiver in FIGS. 2 and 3

The right side of the FIGS. 2 and 3 show the upload procedure for each user data center which received the diskettes of a library.

Receiver programmer 28 receives 26 floppy diskettes 27 and saves 29 them onto PC 28 hard disk as:
    copy A:\CPGM1.exe to C:\BSOFT\CPGM1.exe
    copy A:\CPGM2.exe to C:\BSOFT\CPGM2.exe
    copy A:\CPGM3.exe to C:\BSOFT\CPGM3.exe
    copy A:\CPGM4.exe to C:\BSOFT\CPGM4.exe
    copy A:\CPGM1.txt to C:\BSOFT\CPGM1.txt
    copy A:\CPGM2.txt to C:\BSOFT\CPGM2.txt
    copy A:\CPGM3.txt to C:\BSOFT\CPGM3.txt
    copy A:\CPGM4.txt to C:\BSOFT\CPGM4.txt.

Receiver programmer 28 submits a JCL stream in JCL List #11 to create required datasets: destination load library 58, destination text library 58, and upload sequential datasets 53, e.g., UPLOAD.WORK1, UPLOAD.WORK2, UPLOAD.WORK3, and UPLOAD.WORK4, to receive the data delivered.

---
JCL List #11
Creating the receiving datasets
---

```
//jobname  JOB (account),MSGCLASS=V,CLASS=L
//NEWDS  EXEC PGM=IEFBR14
//*    destination text library
//DD1 DD  DSN=C.CPGM.TEXTLIB,
//         DISP=(,CATLG),
//         DCB=(DSORG=PO,RECFM=FB,
//           LRECL=80,BLKSIZE=8000),
//         UNIT=SYSDA,
//         SPACE=(CYL,(10,10,20)) depending on software
//*    destination program library
//DD2 DD  DSN=C.CPGM.LOADLIB,
//         DISP=(,CATLG),
//         DCB=(DSORG=PO,RECFM=U,BLKSIZE=32760),
//         UNIT=SYSDA,
//         SPACE=(CYL,(10,10,20)) depending on software
//DD3 DD  DSN=UPLOAD.WORK1,
//         DISP=(,CATLG),
//         DCB=(DSORG=PS,RECFM=FB,
//           LRECL=80,BLKSIZE=800),
//         UNIT=SYSDA,SPACE=(CYL,(1,1))
//*    for Cpgm2.exe or .txt
//DD4 DD  DSN=UPLOAD.WORK2,
//         DISP=(,CATLG),
//         DCB=(DSORG=PS,RECFM=FB,
//           LRECL=80,BLKSIZE=800),
//         UNIT=SYSDA,SPACE=(CYL,(1,1))
//*    for Cpgm3.exe or .txt
//DD5 DD  DSN=UPLOAD.WORK3,
//         DISP=(,CATLG),
//         DCB=(DSORG=PS,RECFM=FB,
//           LRECL=80,BLKSIZE=800),
//         UNIT=SYSDA,SPACE=(CYL,(1,1))
//*    for Cpgm4.exe or .txt
//DD6 DD  DSN=UPLOAD.WORK4,
//         DISP=(,CATLG),
//         DCB=(DSORG=PS,RECFM=FB,
//           LRECL=80,BLKSIZE=800),
//         UNIT=SYSDA,SPACE=(CYL,(1,1))
//
```

The LRECL value of upload sequential datasets, UPLOAD.WORKN 53 must be the same value as LRECL value of download sequential dataset, DOWNLOAD.WORK, 52 at sender's site 1. The LRECL value of 80 bytes is the default value for the sender. But sender 1 may use a different value, so receiver 2 must be careful about this LRECL value.

The disk space parameters of destination load library and destination text library 58 must be carefully decided. This space must be sufficient to receive all the data delivered. Mostly sender 1 supplies this information. Upload sequential datasets 53 are used repeatedly for each upload of both the text and load library data, so it is recommended to allocate enough D space to fit all situations.

At the above, the BLKSIZE value 32,760 of destination load library, C.CPGM.LOADLIB, 58 is the maximum allowed value, and is recommended and set as the default value. This value can be changed to any value equal to or greater than the BLKSIZE value of original load library 49 at sender 1, which is usually supplied by sender 1.

Like the download procedure of each library, the whole upload procedure, from the first step 30 of the file transfer step 30-35 to the completion of loading 55 the final library, is also performed repeatedly for each individual library delivered. Each library must be uploaded separately individually.

Let's start with the upload of the load library data delivered. The upload procedure for the text library data will be repeated later after the completion of the upload of the load library data.

Receiver programmer 28 now transfers 30-35 PC 28 files of original load library 49 to mainframe upload sequential datasets 53 in binary mode using Procedure #2, #3 or #4.

transfer C:\BSOFT\CPGM1.exe to UPLOAD.WORK1.
   transfer C:\BSOFT\CPGM2.exe to UPLOAD.WORK2.
   transfer C:\BSOFT\CPGM3.exe to UPLOAD.WORK3.
   transfer C:\BSOFT\CPGM4.exe to UPLOAD.WORK4.

Now, all the copies of original load library 49 are transferred to a receiver's mainframe 4.

Receiver programmer 28 has to load 56-57 all the contents of upload sequential dataset 53 to destination load library 58 by running 54 program PCFORM 55. A PCFORM program JCL stream in JCL List #12 is submitted 54 and program PCFORM 55 loads 56-57 all the data in IN upload sequential datasets 53 to OUT destination program load library 58.

---
JCL List #12
Loading the delivered load library data to a load library
---

```
//jobname JOB (account),MSGCLASS=V,CLASS=L
//PCFORM EXEC PGM=PCFORM
//STEPLIB DD DISP=SHR,DSN=C.ASOFT.LOADLIB
//SYSPRINT DD SYSOUT=*
//IN     DD DISP=SHR,DSN=UPLOAD.WORK1
//       DD DISP=SHR,DSN=UPLOAD.WORK2
//       DD DISP=SHR,DSN=UPLOAD.WORK3
//       DD DISP=SHR,DSN=UPLOAD.WORK4
//*      destination library
//OUT DD DISP=SHR,DSN=C.CPGM.LOADLIB
//CONTROL DD *
LOAD
//
```

Here, the CONTROL control command LOAD converts the content of upload sequential datasets 53 to the members of destination library 58. The LOAD command starts at column 1 and can be followed by any number of library member names. More than one member list lines can follow the LOAD control command line, but the first column of the following lines must be blank. In this case, only the named members are picked up from upload sequential datasets 53 and loaded to destination library 58. The LOAD control command without any member names, as shown as in the above sample JCL stream, will load the whole content of upload sequential datasets 53 to destination library 58.

---
JCL Note #2
Example of free format LOAD command syntax
---

```
(1).  LOAD
(2).  LOAD     PROGRAM1   PROGRAM2
               PROGRAM3,Program4,
            PROGRAM5     program6,
               PROGRAM7,PROGRAM8
(3).  LOAD
               PROGRAM1   PROGRAM2
               program3,     PROGRAM4
               PROGRAM5
            PROGRAM6,PROGRAM7
(4).  LOAD    (
               text1 jcl2
               source3
                Macro4
            Source5      ,SOURCE6 )
```

Now, delivered original load library or load modules 49 were loaded 56-57 into destination program load module library 58. This was done without the use of magnetic tape.

The upload of a part or whole of a text library also can be done in just the same way. At first, the PC files of delivered text data are transferred 30-35 to mainframe upload sequential datasets 53 and the content of upload sequential datasets 53 are loaded 56-57 to destination text library 58 by a program PCFORM JCL stream (JCL List #13).

Receiver programmer 28 transfers the PC files of original text library 49 to mainframe upload sequential datasets 53 in Text mode using Procedure #2, #3 or #4.

transfer C:\BSOFT\CPGM1.txt to UPLOAD.WORK1.
   transfer C:\BSOFT\CPGM2.txt to UPLOAD.WORK2.
   transfer C:\BSOFT\CPGM3.txt to UPLOAD.WORK3.
   transfer C:\BSOFT\CPGM4.txt to UPLOAD.WORK4.

Receiver programmer 28 loads 56-57 all the transferred content to destination text library 58 by running 54 program PCFORM JCL stream shown in JCL List #13 which is just the same as above load library upload procedure, except for the OUT library name. The IN dataset is upload sequential dataset 53 and OUT dataset is final destination text library 58.

---
JCL List #13
Loading the delivered text library data to a text library
---

```
//jobname JOB (account),MSGCLASS=V,CLASS=L
//PCFORM EXEC PGM=PCFORM
//STEPLIB DD DISP=SHR,DSN=C.ASOFT.LOADLIB
//SYSPRINT DD SYSOUT=*
//IN     DD DISP=SHR,DSN=UPLOAD.WORK1
//       DD DISP=SHR,DSN=UPLOAD.WORK2
//       DD DISP=SHR,DSN=UPLOAD.WORK3
//       DD DISP=SHR,DSN=UPLOAD.WORK4
//*      destination text library
//OUT DD DISP=SHR,DSN=C.CPGM.TEXTLIB
//CONTROL DD *
LOAD
//
```

Text members or a whole text library were loaded 56-57 into destination text library 58. JCL Lists #12 and #13 are similar except the OUT datasets.

Delivery of Various Sequential Datasets in FIG. 4

Any sequential dataset of fixed record format, undefined record format or variable record format can be transferred to another mainframe using PC-based data media and can be reverted to its original form when uploaded, as depicted in FIG. 4.

The events in FIG. 4 can be explained using JCL streams of JCL Lists #14 and #15, which are similar to JCL Lists #9 or

10 and JCL Lists #12 or #13 with only small differences. The IN dataset in JCL stream of JCL List #14 at the sender's site and the OUT dataset in JCL List #15 at the receiver's site are sequential datasets of fixed record format, undefined record format or variable record format respectively. The block size of both IN and OUT sequential datasets must be the same when they are of undefined record format or variable record format. The logical record length of both IN and OUT sequential datasets must be same when they are of fixed record format. Download and upload procedures of FIG. 4 are exactly the same as in FIGS. 2 and 3.

JCL List #14
Dumping the content of a sequential dataset to the download sequential dataset

```
//jobname JOB (account),MSGCLASS=V,CLASS=L
//PCFORM EXEC PGM=PCFORM
//STEPLIB DD DISP=SHR,DSN=BSOFT.ASOFT.LOADLIB
//SYSPRINT DD SYSOUT=*
//IN      DD DISP=SHR,DSN=a_F/U/V_dataset_name
//OUT     DD DISP=SHR,DSN=DOWNLOAD.WORK
//CONTROL DD *
DUMP
//
```

JCL List #15
Loading the delivered data to a destination sequential dataset

```
//jobname JOB (account),MSGCLASS=V,CLASS=L
//PCFORM EXEC PGM=PCFORM
//STEPLIB DD DISP=SHR,DSN=C.ASOFT.LOADLIB
//SYSPRINT DD SYSOUT=*
//IN      DD DISP=SHR,DSN=UPLOAD.WORK
//OUT     DD DISP=SHR,DSN=a_F/U/V_dataset_name
//CONTROL DD *
LOAD
//
```

Conclusion of FIGS. 1-7

If two mainframe data centers have the program PCFORM, one data center can send any sequential dataset and a part or whole of a load library or a text library using PC-based data transportation media. Any data center can be a sender or a receiver of mainframe data.

If the receiver does not have the program PCFORM, it can only receive a single load module, but it can not receive a library or other dataset. This feature is useful to send the program PCFORM to other mainframe data centers using PC-based data media.

Creation of Download Sequential Datasets

This invention solves the download and upload problems of a single load module, a part or whole of a load module library, a part or whole of a text library and a sequential dataset by converting to a download sequential dataset of fixed record format.

Fixed record format means that each record has the same length. As the explanation in the section of the Discussion of Related Art, only a sequential dataset of fixed record format can be downloaded to a PC and uploaded to a mainframe from a PC into its original form. A dataset which is not of fixed record format must be converted to a sequential dataset of fixed record format first to be delivered to another mainframe data center. The download sequential dataset of the sender and the upload sequential dataset of the receiver are defined as a fixed record format and their logical record length must be the same.

For undefined record format dataset, only the block size is given and each block has only one record in it. So the block size is the maximum length of the records. Minimum record length can be 1 byte long. Each record can have different record length of from 1 byte to the maximum record length defined. This type of dataset cannot be reverted to its original form if downloaded to a PC and uploaded back to a mainframe. This type of dataset must first be converted to a sequential dataset of fixed record format to be delivered to another mainframe data center.

A program load module library and its members, program load modules, are of undefined record format.

Many VSAM datasets and DB2 datasets are of undefined-type record format. For VSAM dataset, it's not called undefined record format, but it does have undefined record lengths. In many VSAM datasets, its maximum record length and average record length are given. Here, average record length is just an average value, not a minimum value. Each record length can be from 1 byte long to the maximum record length defined. When these VSAM datasets are copied to a sequential dataset, the sequential dataset must be of an undefined record format.

FIG. 1 shows that a single load module is delivered when the sender has the program PCFORM, but the receiver does not have the program PCFORM. The load module is an undefined record format dataset. In this case, the logical record length of the download dataset of fixed record length is defined with the same value as the blick size of the library in where the single load module is located. Each input load module record of various length is padded with zeroes at the end of input data up to the blick size length as in FIG. 19 and written out to the download sequential dataset. These padded records are uploaded and reverted to its original form in another mainframe using IBM utility programs IEBGENER and IEWL.

FIG. 2 shows that a part or whole of a load module library is delivered to another mainframe data center when both the sender and the receiver have the program PCFORM. As explained above, a load module library is of undefined record format. Only its block size is given and the length of one record can be different from other records and unpredictable. These undefined various length records must be converted to a sequential dataset of fixed length records. The conversion of a load module library is handled in two different ways in this invention. First method (FIG. 17) is: each input record is appended at the beginning of each logical record by a 4-bytes header which contains the real length of the undefined record and this record with 4-bytes header is divided into fixed length shorter records of download sequential dataset of fixed record length format. When uploading, the real record length in a 4-bytes header is analyzed first and proper number of following records are concatenated according to this length. The second method (FIG. 18) is: each input record of various length is first divided into shorter records of (the logical record length of the download sequential dataset minus 4) bytes length. Each divided record is appended at the beginning with a 4-bytes of header of 2-bytes of real data length and 2-bytes of sequence number of shorter records in the original input record. The first divided shorter record has the sequence number, 1. The last shorter record of each input record may have the data length shorter than the record length of the download sequential dataset of fixed record format. When upload, the upload record with the sequence number 1 in the header becomes the start of each output record and the real data length is in the header, so the concatenation is possible.

FIG. 3 shows when a part or whole of a text library is delivered to another mainframe data center when both the sender and receiver have the program PCFORM. In the case of a text library, all records are of fixed length and their length is 80-bytes long. No conversion is necessary because the output download sequential dataset is of fixed record format and its record length is defined as 80-bytes long. Each record from the input text library is written out to the output download dataset. Upload sequential dataset is also of fixed record format and record length is 80-bytes. Each upload record is written out to the destination text library. There is no conversion of text records.

FIG. 4 shows when a sequential dataset of fixed record format, undefined record format or variable record format is delivered to another mainframe data center when both the sender and the receiver have the program PCFORM. As mentioned above, for a sequential dataset of undefined record format, only the maximum record length is known, minimum record length can be 1 byte long and each record can have different record length. This is just the same situation as for the load module library. So, the udefined various length records are converted just the same ways as for the load module library records. The above two conversion methods of a load module library can be used for this sequential dataset of undefined record format.

Although the invention has been described with reference to a particular arrangement of events, features, sequences and the like, these are not intended to exhaust all possible arrangements or features, and indeed many other modifications and variations will be ascertainable to thoseof skill in the art.

TABLE 1

| | | | |
|---|---|---|---|
| PCFORM | CSECT | | |
| | USING | *,15 | |
| | STM | 14,12,12(13) | |
| | BAL | 2,*+76 | |
| | DROP | 15 | |
| | DS | 18F | |
| | ST | 2,8(,13) | |
| | ST | 13,4(,2) | |
| | LR | 13,2 | |
| | USING | PCFORM+8,13,12,11,10,9,8 BASES | |
| | LA | 12,4095(,13) | |
| | LA | 12,1(,12) | |
| | LA | 11,4095(,12) | |
| | LA | 11,1(,11) | |
| | LA | 10,4095(,11) | |
| | LA | 10,1(,10) | |
| | LA | 9,4095(,10) | |
| | LA | 9,1(,9) | |
| | LA | 8,4095(,9) | |
| | LA | 8,1(,8) | |
| * | | | |
| | OPEN | SYSIN | |
| | TM | SYSIN+X'30',X'10' | OPEN OK ? |
| | BNO | PDSPROG3 | NO |
| | OPEN | (SYSPRINT,OUTPUT) | |
| * | | | |
| | LA | 8,CNTLTBL | |
| | LA | 2,CMPCSTR | ADDRESS OF CMPCSTR TABLE |
| | ST | 2,ACPMCSTR | INITIALIZE TO THE BEGINNING |
| | ST | 2,12(,8) | |
| CMDSYSIN | DS | 0H | |
| | GET | SYSIN | |
| | MVC | MSGWORK,0(1) | |
| | PUT | SYSPRINT,MSGWORK | |
| * | | | |
| | LA | 7,MSGWORK | |
| | CLI | 0(7),C' ' | CONTINUED CARD ? |
| | BE | ANLCNTL2 | YES, CONTINUED CARD |
| | MVI | CMDCONTN,X'00' | COMMAND CONTINUATION OFF |
| | LR | 1,7 | STARTING LOCATION OF STRING |
| | LA | 2,5 | LENGTH |
| | BAL | 14,TOCAPITL | CONVERT TO CAPITAL |
| | CLC | =C'LOAD ',0(7) | LIBRARY LOAD COMMAND ? |
| | BE | CMDLLOAD | YES |
| | CLC | =C'DUMP ',0(7) | LIBRARY DUMP COMMAND ? |
| | BE | CMDLDUMP | YES |
| | B | CMDSNTXE | |
| ANLCNTL2 | DS | 0H | CONTINUED CARD |
| | CLI | CMDCONTN,X'01' | LIB DUMP COMMAND CONTINUED ? |
| | BE | CMDLDMPH | YES |
| | CLI | CMDCONTN,X'02' | LIB LOAD COMMAND CONTINUED ? |
| | BE | CMDLLODH | YES |
| | B | CMDSNTXE | SYNTAX ERROR |
| * | | | |
| CMDSNTXE | DS | 0H | |
| | WTO | 'COMMAND SYNTAX ERROR' | |
| | LA | 15,4 | COMMAND SYNTAX ERROR |
| | L | 13,4(13) | |
| | ST | 15,16(,13) | . |
| | LM | 14,12,12(13) | . |
| | BR | 14 | . |
| * | | | |

TABLE 1-continued

```
*
ACPMCSTR   DS     A
CNTLTBL    DS     XL16
CMPCSTR    DS     CL4000    MAXIMUM 500 MEMBER NAMES
*
CMDCONTN   DC     X'00'  X'01'  LIB DUMP COMMAND CONTINUED
*                        X'02'  LIB LOAD COMMAND CONTINUED
*
CMDCONTI   DC     X'00'
*
DSDMVC1    MVC    0(0,4),0(5)   MOVE FROM R5 TO R4
*
SYSIN      DCB    DDNAME=CONTROL,DSORG=PS,MACRF=GL,    X
                  RECFM=FB,LRECL=80,BLKSIZE=800,EODAD=SYSINEND
*
MSGWORK    DC     CL80' '
MSGWORK2   DC     CL80' '
*
SYSPRINT   DCB    DDNAME=SYSPRINT,DSORG=PS,MACRF=PM,   X
                  RECFM=FB,LRECL=80,BLKSIZE=800
*
*
*
CMDLLOAD   DS     0H  LOAD
*                     LOAD     PROGRAM1   PROGRAM2
*                              PROGRAM3,PROGRAM4,
*                              PROGRAM5 PROGRAM6,
*                              PROGRAM7,PROGRAM8
*                     LOAD
*                              PROGRAM1   PROGRAM2
*                              PROGRAM3,     PROGRAM4
*                              PROGRAM5
*                              PROGRAM6,PROGRAM7
*                     LOAD     (
*                              PROGRAM1   PROGRAM2
*                              PROGRAM3
*                              PROGRAM4
*                              PROGRAM5,PROGRAM6
*                              )
*
           MVC    0(4,8),=C'LOAD'
           MVI    CMDCONTI,X'00'   LIB LOAD STARTS
           MVI    CMDCONTN,X'02'   LIB LOAD MAY CONTINUE
           LA     7,4(,7)          AFTER 'LOAD '
           B      CMDLDMPB
*
CMDLLODH   DS     0H
           B      CMDLDMPH
*
*
CMDLDUMP   DS     0H  DUMP
*                     DUMP     PROGRAM1   PROGRAM2
*                              PROGRAM3,PROGRAM4,
*                              PROGRAM5     PROGRAM6,
*                              PROGRAM7,PROGRAM8
*                     DUMP
*                              PROGRAM1   PROGRAM2
*                              PROGRAM3,     PROGRAM4
*                              PROGRAM5
*                              PROGRAM6,PROGRAM7
*                     DUMP     (
*                              PROGRAM1   PROGRAM2
*                              PROGRAM3
*                              PROGRAM4
*                              PROGRAM5    ,PROGRAM6
*                              )
*
           MVC    0(4,8),=C'DUMP'
           MVI    CMDCONTI,X'00'   LIB DUMP STARTS
           MVI    CMDCONTN,X'01'   LIB DUMP MAY CONTINUE
           LA     7,4(,7)          AFTER 'DUMP '
*
CMDLDMPB   DS     0H
           SR     2,2
           ST     2,4(,8)          ZERO MEMBER COUNT
           STH    2,10(,8)         ZERO TEXT LENGTH
           LR     1,7
           BAL    14,SKIPBLNK      SKIP BLANKS
           BZ     CMDSYSIN         ALL BLANKS. GO GET NEXT CARD
           LR     7,1              LOCATION OF NON-BLANK FOUND
```

TABLE 1-continued

```
            B       CMDLDMPC
*
CMDLDMPH    DS      0H
            LR      1,7
            BAL     14,SKIPBLNK     SKIP BLANKS
            BZ      CMDSNTXE        ALL BLANKS. SYNTAX ERROR
            LR      7,1             LOCATION OF NON-BLANK FOUND
*
CMDLDMPC    DS      0H
            CLI     0(7),C'('
            BNE     CMDLDMPF
            LH      2,10(,8)        TEXT LENGTH
            LTR     2,2             ANY LENGTH ?
            BNZ     CMDSNTXE        YES. SYNTAX ERROR
            CLI     CMDCONTI,X'00'  CLOSING PAREN EXPECTED FLAG ON ?
            BNE     CMDSNTXE        YES. SYNTAX ERROR
            MVI     CMDCONTI,X'01'  CLOSING PARENTHESIS EXPECTED FLAG
            LA      7,1(,7)         AFTER '('
*
CMDLDMPF    DS      0H
            LR      1,7
            BAL     14,SKIPBLNK     SKIP BLANKS
            BZ      CMDSYSIN        ALL BLANKS. GO GET NEXT CARD
            LR      7,1             LOCATION OF NEXT STRING
            CLI     0(7),C','
            BE      CMDLDMPJ        GO IGNORE ,
            CLI     0(7),C')'
            BE      CMDLDMPG        ALL MEMBER NAME DONE
            LR      1,7             STARTING LOCATION OF STRING
            LA      2,9             LENGTH
            BAL     14,TOCAPITL     CONVERT TO CAPITAL
            LR      1,7
            BAL     14,FINDDELM     R1 POINTS TO THE STARTING POINT
            BZ      CMDSNTXE        DELIMITER NOT FOUND
            LR      6,1
            SR      1,7             LENGTH OF MEMBER NAME
            C       1,=F'8'         MEMBER NAME > 8 CHARS ?
            BH      CMDSNTXE        YES, INVALID MEMBER NAME
            BCTR    1,0
            LR      5,7
            L       4,ACPMCSTR      NEXT TEXT SAVE AREA ADDRESS
            MVI     0(4),C' '
            MVC     1(7,4),0(4)
            EX      1,DSDMVC1       MVC 0(0,4),0(5)
            LR      7,6
            L       4,ACPMCSTR      USED TEXT SAVE AREA ADDRESS
            LA      4,8(,4)
            ST      4,ACPMCSTR      NEXT TEXT SAVE AREA ADDRESS
            L       1,4(,8)         MEMBER COUNT
            LA      1,1(,1)         INCREASE MEMBER COUNT
            ST      1,4(,8)         NEW MEMBER COUNT
            LH      1,10(,8)        TEXT LENGTH
            LA      1,8(,1)         INCREASE TEXT LENGTH
            STH     1,10(,8)        NEW TEXT LENGTH
            B       CMDLDMPF
*
CMDLDMPJ    DS      0H
            LA      7,1(,7)         IGNORE ,
            B       CMDLDMPF
*
CMDLDMPG    DS      0H
            CLI     CMDCONTI,X'01'  CLOSING PAREN EXPECTED FLAG ON ?
            BNE     CMDSNTXE        NO. SYNTAX ERROR
            LH      1,10(,8)        TEXT LENGTH
            LTR     1,1             ANY MEMBER NAME ?
            BZ      CMDSNTXE        NO. SYNTAX ERROR
            MVI     CMDCONTN,X'00'  COMMAND CONTINUATION OFF
            MVI     CMDCONTI,X'02'  PARM OFF
            B       CMDSYSIN        ALL MEMBER DONE
*
*
*           FIND THE TRAILING DELIMITER
FINDDELM    DS      0H              R1 POINTS TO THE STARTING POINT
            LR      3,1             ARGUMENT ADDRESS
            XC      PDSTRTHX,PDSTRTHX
            MVI     PDSTRTHX+C' ',X'01'
            MVI     PDSTRTHX+C',',X'01'
            MVI     PDSTRTHX+C')',X'01'
            LA      1,9(,1)         MAX 9 bytes
            TRT     0(9,3),PDSTRTHX SEARCH FOR A DELIMITER BYTE
```

TABLE 1-continued

```
              BNZR    14                      ADDRESS OF THE FIRST DELIMITER IN R1
              BR      14                      DELIMITER NOT FOUND
*
*             SKIP BLANKS
SKIPBLNK      DS      0H                      R1 POINTS TO THE STARTING POINT
              LR      3,1                     ARGUMENT ADDRESS
              MVI     PDSTRTHX,X'01'
              MVC     PDSTRTHX+1(255),PDSTRTHX
              MVI     PDSTRTHX+C' ',X'00'
              LA      1,74(,1)                MAX 74 blanks
              TRT     0(74,3),PDSTRTHX        SEARCH FOR A NON-BLANK BYTE
              BNZR    14                      ADDRESS OF THE FIRST NON-BLANK IN R1
              BR      14                      ALL BLANKS
*
*             R1   POINTS TO THE TEXT STRING
*             R2   CONTAINS THE LENGTH
TOCAPITL      DS      0H
              LR      3,1
              BCTR    2,0
              EX      2,TOCAPIT2    TR    0(0,3),TOCPTLTB
              BR      14
TOCAPIT2      TR      0(0,3),TOCPTLTB
TOCPTLTB      DC      256AL1(*-TOCPTLTB)
              ORG     TOCPTLTB+C'a'
              DC      C'ABCDEFGHI'
              ORG     TOCPTLTB+C'j'
              DC      C'JKLMNOPQR'
              ORG     TOCPTLTB+C's'
              DC      C'STUVWXYZ'
              ORG     ,
*
*
              LTORG
*
SYSINEND      DS      0H
              CLOSE   SYSIN
*
*
              LA      5,CNTLTBL
              L       2,4(,5)                 MEMBER COUNT
              ST      2,ACTNCNT
              LH      2,10(,5)                TEXT LENGTH
              STH     2,TEXTLEN
              L       2,12(,5)                TEXT LOCATION
              ST      2,TEXTLOC
*
              LA      15,DUMPINOT
              CLC     0(4,5),=C'DUMP'
              BE      PDSPROG4
              LA      15,LOADINOT
              CLC     0(4,5),=C'LOAD'
              BE      PDSPROG4
*
PDSPROG3      DS      0H
              WTO     'CONTROL command missing'
              LA      15,4
              B       PDSPROG9
*
PDSPROG4      DS      0H
              BALR    14,15
*
              WTO     'COMPLETED SUCCESSFULLY'
              SR      15,15         .
*
PDSPROG9      DS      0H
              L       13,4(,13)
              ST      15,16(,13)    .
              LM      14,12,12(13)  .
              BR      14            .
*
*
ACTNCNT       DS      A                       MEMBER COUNT
TEXTLEN       DS      H                       TEXT LENGTH IF ANY
TEXTLOC       DS      A                       TEXT LOCATION IF ANY
*
PDSDMPSW      DC      X'02' X'01'             WHEN EACH INPUT LOAD LIBRARY RECORD
*                                             IS FIRST DIVIDED INTO RECORDS OF SAME
*                                             LENGTH OF (OUTPUT LRECL - 4) BYTES AND
*                                             THEN EACH DIVIDED RECORD IS APPENDED AT
*                                             THE FRONT WITH 4-BYTES HEADER OF 2-BYTES
```

TABLE 1-continued

```
*                              OF CONTENT LENGTH IN THE DIVIDED RECORD
*                              AND 2-BYTES OF CONTINATION SEQUENCE NUMBER
*                  X'02'       WHEN 4-BYTES HEADER, WITH 2-BYTES OF
*                              INPUT LOAD LIBRARY RECORD LENGTH AND 2
*                              NULL BYTES, IS FIRST APPENDED AT THE
*                              BEGINING OF EACH INPUT LOAD LIBRARY RECORD
*                              AND THEN IT IS DIVIDED INTO THE OUTPUT
*                              RECORDS OF SAME LENGTH
*
*
           LTORG
*
*
RETURN99   DS      0H
           CLOSE   PSGETDCB
           CLOSE   PSPUTDCB
           LM      0,15,PDSRSAVE
           BR      14
*
*
*
*          TRANSFER OF RECFM=U or V or F DATASET IS POSSIBLE.
*          TRANSFER OF A SINGLE LOAD MODULE IS POSSIBLE.
*
DUMPINOT   DS      0H
           STM     0,15,PDSRSAVE
*
           MVC     JFCBDCB+X'28'(8),=CL8'IN'    MOVE DDNAME INTO DCB
           RDJFCB  JFCBDCB
           LTR     15,15                        RDJFCB succeeded ?
           BNZ     PDSERR0G                     NO
           OPEN    JFCBDCB
           MVC     OBTNDSN,JFCBAREA             MOVE DATASET NAME
           MVC     OBTVOLSR,JFCBAREA+X'76'      MOVE VOL=SER NUMBER
           OBTAIN  OBTAIN1
           LTR     15,15                        OBTAIN OK ?
           BNZ     PDSERR0H                     NO
           CLOSE   JFCBDCB
           TM      OBTNDSCB+X'26',X'02'         PO ?
           BNO     UVFDTSET                     NO, CHECK U OR VB OR F DATASET
*
           TM      JFCBAREA+X'56',X'01'         A MEMBER OF A PDS ?
           BNO     PDSDUMP                      NO, A PDS WHOLE LIBRARY
*
*          A SINGLE MEMBER OF A LIBRARY
           OPEN    PSGETDCB
           TM      PSGETDCB+X'30',X'10'         OPEN OK ?
           BNO     PDSERR03                     NO
           TM      PSGETDCB+X'24',X'C0'         RECFM=U ?
           BNO     FDATASET                     NO, A TEXT MEMBER
           LH      2,PSGETDCB+X'3E'             MAX BLOCK SIZE
           STH     2,PDSBLKSZ
           LA      2,RETURN99                   NEW EODAD ADDRESS
           STCM    2,7,PSGETDCB+X'21'           EODAD
           OPEN    (PSPUTDCB,OUTPUT)
           TM      PSPUTDCB+X'30',X'10'         OPEN OK ?
           BNO     PDSERR04                     NO
           TM      PSPUTDCB+X'24',X'C0'         RECFM=U ?
           BO      PDSERR0F                     NO, RECFM NOT SUPPORTED
           TM      PSPUTDCB+X'24',X'80'         RECFM=F or FB ?
           BNO     PDSERR0F                     NO, RECFM NOT SUPPORTED
           LH      2,PSPUTDCB+X'52'             LRECL OF OUTPUT FILE
           STH     2,PSOLRECL
           CH      2,PDSBLKSZ                   OUT LRECL > IN BLKSIZE ?
           BL      PDSERR08                     OUT LRECL TOO SMALL
PADDING2   DS      0H
           L       2,=A(THEWORK)
           LH      3,PSPUTDCB+X'3E'             OUT BLKSIZE
           SR      4,4
           SR      5,5
           MVCL    2,4                          MAKE IT ZERO
           GET     PSGETDCB
           LR      4,1
           LH      5,PSGETDCB+X'52'             IN LRECL
           L       2,=A(THEWORK)
           LR      3,5
           MVCL    2,4                          MOVE IN RECORD TO OUT BUFFER
           PUT     PSPUTDCB,THEWORK
           B       PADDING2
*
```

TABLE 1-continued

```
*
*              U OR VB OR F DATASET
UVFDTSET  DS      0H
          OPEN    PSGETDCB
          TM      PSGETDCB+X'30',X'10'      INPUT OPEN OK ?
          BNO     PDSERR03                  NO
          TM      PSGETDCB+X'1A',X'40'      INPUT DSORG = PS ?
          BNO     PDSERR0J                  NO.
          MVC     PDSRECFM,PSGETDCB+X'24'   V=X'40' or VB=X'50' or U=X'C0'
          TM      PSGETDCB+X'24',X'C0'      INPUT RECFM=U ?
          BO      UDATASET                  YES
          TM      PSGETDCB+X'24',X'80'      INPUT RECFM=F ?
          BO      FDATASET                  YES
          TM      PSGETDCB+X'24',X'40'      INPUT RECFM=V ?
          BO      VDATASET                  YES
          B       PDSERR0K
*
*
*
*              DOWNLOAD OF INPUT RECFM = V or VB DATASET
VDATASET  DS      0H
          LA      2,RETURN99                NEW EODAD ADDRESS
          STCM    2,7,PSGETDCB+X'21'        EODAD
          OPEN    (PSPUTDCB,OUTPUT)
          TM      PSPUTDCB+X'30',X'10'      OUTPUT OPEN OK ?
          BNO     PDSERR04                  NO
          LH      2,PSPUTDCB+X'52'          OUTPUT LRECL
          STH     2,PSOLRECL
*
          MVC     PDSOUTWK(23),=CL23'Dump of VB Dataset : '
          TM      PSGETDCB+X'24',X'10'      INPUT RECFM=VB ?
          BO      VDATSET1                  YES
          MVC     PDSOUTWK(23),=CL23'Dump of V Dataset : '
VDATSET1  DS      0H
          MVC     PDSOUTWK+23(44),JFCBAREA  DSNAME
          TIME    DEC
          STCM    1,15,PDSWRKDW    X'00YYDDDF'
          STCM    0,12,PDSWRKDW+4  X'HHMM'
          LA      1,PDSWRKDW+1     X'0095013F'      95/01/13
          BAL     14,EDITDATE               R1 -> YYDDDMMDD
          MVC     PDSOUTWK+68(2),5(1)   MM
          MVI     PDSOUTWK+70,C'/'
          MVC     PDSOUTWK+71(2),7(1)   DD
          MVI     PDSOUTWK+73,C'/'
          MVC     PDSOUTWK+74(2),0(1)   YY
          PUT     PSPUTDCB,PDSOUTWK
          MVI     PDSOUTWK,C'*'
          MVC     PDSOUTWK+1(79),PDSOUTWK
          PUT     PSPUTDCB,PDSOUTWK
*
VDATSET2  DS      0H
          L       2,=A(THEWORK3)
          L       3,=A(THEWORKL)
          SR      0,0
          SR      1,1
          MVCL    2,0                       INIT WITH X'00'
          GET     PSGETDCB
          LR      6,1                       A LOGICAL RECORD WHEN RECFM=V
*                                           A BLOCK WHEN RECFM=VB
*
          LH      2,PSGETDCB+X'52'          INPUT LENGTH.
*                                           A LOGICAL RECORD LENGTH WHEN RECFM=V
*                                           A BLOCK LENGTH WHEN RECFM=VB
          STH     2,PSILRECL
          L       2,=A(THEWORK3)
          LH      3,PSILRECL                INPUT LRECL
          LR      0,6
          LR      1,3
          MVCL    2,0
          L       5,=A(THEWORK3)
VDATSET3  DS      0H
          L       3,=A(THEWORK3)
          LH      2,PSILRECL                INPUT LRECL
          AR      3,2
          CR      5,3
          BNL     VDATSET2
          PUT     PSPUTDCB,(5)
          LH      2,PSOLRECL                OUTPUT LRECL
          AR      5,2
          B       VDATSET3
```

TABLE 1-continued

```
*
*
*            DOWNLOAD OF INPUT RECFM = F DATASET
FDATASET     DS      0H
*            DOWNLOAD OF INPUT RECFM = U DATASET
UDATASET     DS      0H
             LA      2,RETURN99              NEW EODAD ADDRESS
             STCM    2,7,PSGETDCB+X'21'      EODAD
             OPEN    (PSPUTDCB,OUTPUT)
             TM      PSPUTDCB+X'30',X'10'    OUTPUT OPEN OK ?
             BNO     PDSERR04                NO
             TM      PSPUTDCB+X'24',X'C0'    OUTPUT RECFM=U ?
             BO      PDSERR0F                YES, RECFM NOT SUPPORTED
             TM      PSPUTDCB+X'24',X'80'    OUTPUT RECFM=F or FB ?
             BNO     PDSERR0F                NO, RECFM NOT SUPPORTED
             LH      2,PSPUTDCB+X'52'        OUTPUT LRECL
             STH     2,PSOLRECL
*
             MVC     PDSOUTWK(23),=CL23'Dump of U Dataset : '
             TM      PSGETDCB+X'24',X'C0'    INPUT RECFM=U ?
             BO      UDATSET1                YES
             TM      PSGETDCB+X'24',X'80'    INPUT RECFM=F ?
             BNO     PDSERR0K                NO
             MVC     PDSOUTWK(23),=CL23'Dump of F Dataset : '
UDATSET1     DS      0H
             MVC     PDSOUTWK+23(44),JFCBAREA    DSNAME
             TIME    DEC
             STCM    1,15,PDSWRKDW           X'00YYDDDF'
             STCM    0,12,PDSWRKDW+4         X'HHMM'
             LA      1,PDSWRKDW+1            X'0095013F'    95/01/13
             BAL     14,EDITDATE             R1 -> YYDDDMMDD
             MVC     PDSOUTWK+68(2),5(1)     MM
             MVI     PDSOUTWK+70,C'/'
             MVC     PDSOUTWK+71(2),7(1)     DD
             MVI     PDSOUTWK+73,C'/'
             MVC     PDSOUTWK+74(2),0(1)     YY
             PUT     PSPUTDCB,PDSOUTWK
             MVI     PDSOUTWK,C'*'
             MVC     PDSOUTWK+1(79),PDSOUTWK
             PUT     PSPUTDCB,PDSOUTWK
*
UDATSET2     DS      0H
             GET     PSGETDCB
             LR      6,1
             LH      2,PSGETDCB+X'52'        IN LRECL
             STH     2,PSILRECL
*
             CLI     PDSDMPSW,X'02'
             BE      UDATSET5
*
*            WHEN EACH INPUT U RECORD FORMAT RECORD IS FIRST DIVIDED INTO
*            MORE THAN ONE RECORDS OF SAME LENGTH OF (OUTPUT LRECL - 4)
*            BYTES AND THEN EACH DIVIDED RECORD IS APPENDED AT THE FRONT
*            WITH 4-BYTES HEADER OF 2-BYTES OF CONTENT LENGTH IN THE
*            DIVIDED RECORD AND 2-BYTES OF CONTINUATION SEQUENCE NUMBER
*
             LR      4,6
             LR      5,6
             LH      2,PSILRECL
             AR      4,2                     THE END OF INPUT BLOCK
             SR      1,1
             STH     1,PSORECNO
UDATSET3     DS      0H
             CR      5,4                     BLOCK END ?
             BNL     UDATSET2                YES
             L       2,=A(THEWORK3)
             LH      3,PSOLRECL              OUTPUT LRECL
             SR      0,0
             SR      1,1
             MVCL    2,0                     INIT WITH X'00'
*
             LH      3,PSOLRECL              OUTPUT FILE LRECL
             S       3,=F'4'
             LR      0,4
             SR      0,5                     REMAINING LENGTH
             CR      0,3
             BNL     UDATSET4
             LR      3,0
UDATSET4     DS      0H
             L       2,=A(THEWORK3)
```

TABLE 1-continued

```
              STH      3,0(,2)              LENGTH
              LH       1,PSORECNO
              LA       1,1(,1)
              STH      1,PSORECNO
              STH      1,2(,2)              CONCATENATION COUNT
              LR       0,5
              LR       1,3
              LA       2,4(,2)              AFTER HEADER
              MVCL     2,0
              L        3,=A(THEWORK3)
              PUT      PSPUTDCB,(3)
              LH       2,0(,3)              LENGTH
              AR       5,2                  NEXT LOCATION IN BLOCK
              B        UDATSET3
*
*             WHEN 4-BYTES HEADER, WITH 2-BYTES OF RECORD LENGTH OF INPUT
*             U RECORD FORMAT RECORD AND 2 NULL BYTES, IS FIRST APPENDED
*             AT THE BEGINING OF EACH INPUT U RECFM RECORD AND IT IS
*             DIVIDED INTO MORE THAN ONE OUTPUT RECORDS OF SAME LENGTH
UDATSET5      DS       0H
              L        2,=A(THEWORK3)
              LH       3,PSPUTDCB+X'3E'     OUTPUT BLOCK SIZE
              LA       3,8(,3)
              SR       4,4
              SR       5,5                  INIT WITH X'00'
              MVCL     2,4
*
              LH       3,PSILRECL           INPUT LRECL SIZE
              L        5,=A(THEWORK3)       ADDRESS IN THEWORK3
              STH      3,0(5)               SAVE THE LENGTH OF THE INPUT RECORD
              SR       1,1
              STH      1,2(,5)
              LR       0,6                  INPUT RECORD ADDRESS
              LR       1,3                  INPUT RECORD LENGTH
              LA       2,4(,5)              AFTER HEADER
              MVCL     2,0
              LH       2,PSILRECL           INPUT LRECL SIZE
              L        5,=A(THEWORK3)
              LA       4,4(2,5)             THE END OF DATA IN THEWORK3
              LH       3,PSOLRECL           OUTPUT FILE LRECL
UDATSET6      DS       0H
              CR       5,4                  END OF DATA IN THEWORK3 ?
              BNL      UDATSET2             YES
              PUT      PSPUTDCB,(5)
              AR       5,3                  NEXT LOCATION IN THEWORK3
              B        UDATSET6
*
*
*
LOADINOT      DS       0H
              STM      0,15,PDSRSAVE
*
              MVC      JFCBDCB+X'28'(8),=CL8'OUT' MOVE DDNAME INTO DCB
              RDJFCB   JFCBDCB
              LTR      15,15                RDJFCB succeeded ?
              BNZ      PDSERR0G             NO
              OPEN     JFCBDCB
              MVC      OBTNDSN,JFCBAREA     MOVE DATASET NAME
              MVC      OBTVOLSR,JFCBAREA+X'76'  MOVE VOL=SER NUMBER
              OBTAIN   OBTAIN1
              LTR      15,15                OBTAIN OK ?
              BNZ      PDSERR0H             NO
              CLOSE    JFCBDCB
              TM       OBTNDSCB+X'26',X'02' OUTPUT IS A PO ?
              BO       PDSLOAD              YES
*
              OPEN     PSGETDCB
              TM       PSGETDCB+X'30',X'10' INPUT OPEN OK ?
              BNO      PDSERR03             NO
              TM       PSGETDCB+X'1A',X'40' INPUT DSORG = PS ?
              BNO      PDSERR0J             NO.
              TM       PSGETDCB+X'24',X'C0' INPUT RECFM=U ?
              BO       PDSERR0K             YES
              TM       PSGETDCB+X'24',X'80' INPUT RECFM=F ?
              BNO      PDSERR0K             NO
              OPEN     (PSPUTDCB,OUTPUT)
              TM       PSPUTDCB+X'30',X'10' OUTPUT OPEN OK ?
              BNO      PDSERR04             NO
              MVC      PDSRECFM,PSPUTDCB+X'24'  V-X'40' or VB=X'50' or U=X'C0'
*
```

TABLE 1-continued

|  | GET | PSGETDCB | FIRST UPLOAD RECORD |
| --- | --- | --- | --- |
|  | LR | 6,1 |  |
|  | CLC | =CL23'Dump of U Dataset | : ',0(6) |
|  | BE | UPSLOAD | LOAD OF RECFM = U |
|  | CLC | =CL23'Dump of F Dataset | : ',0(6) |
|  | BE | FPSLOAD | LOAD OF RECFM = F |
|  | CLC | =CL23'Dump of V Dataset | : ',0(6) |
|  | BE | VPSLOAD | LOAD OF RECFM = V |
|  | CLC | =CL23'Dump of VB Dataset | : ',0(6) |
|  | BE | VBPSLOAD | LOAD OF RECFM = VB |
|  | B | PDSERR0L |  |
| * |  |  |  |
| * |  |  |  |
| * |  | UPLOAD OF RECFM = V DATASET |  |
| VPSLOAD | DS | 0H |  |
| * |  | UPLOAD OF RECFM = VB DATASET |  |
| VBPSLOAD | DS | 0H |  |
|  | LA | 2,RETURN99 | NEW EODAD ADDRESS |
|  | STCM | 2,7,PSGETDCB+X'21' | EODAD |
|  | GET | PSGETDCB | 2ND UPLOAD RECORD |
|  | LH | 2,PSGETDCB+X'52' | IN LRECL |
|  | STH | 2,PSILRECL |  |
|  | TM | PDSRECFM,X'40' | OUTPUT RECFM=V ? |
|  | BNO | PDSERR0M | NO, RECFM NOT SUPPORTED |
| VPSLOAD2 | DS | 0H |  |
|  | L | 2,=A(THEWORK3) |  |
|  | L | 3,=A(THEWORKL) |  |
|  | SR | 0,0 |  |
|  | SR | 1,1 |  |
|  | MVCL | 2,0 | INIT WITH X'00' |
|  | GET | PSGETDCB | FIRST SECTION RECORD |
|  | LR | 6,1 |  |
|  | LH | 2,0(,6) | LENGTH OF THE OUTPUT RECORD |
|  | STH | 2,PSOLRECL | OUTPUT LENGTH |
|  | LH | 3,PSPUTDCB+X'3E' | OUTPUT BLKSIZE |
|  | CR | 2,3 |  |
|  | BH | PDSERR0A | BLOCKSIZE TOO SMALL |
|  | L | 5,=A(THEWORK3) |  |
|  | LR | 2,5 |  |
|  | LH | 3,PSILRECL | INPUT LRECL |
|  | LR | 0,6 |  |
|  | LR | 1,3 |  |
|  | MVCL | 2,0 |  |
|  | LH | 3,PSILRECL | INPUT LRECL |
|  | AR | 5,3 |  |
| VPSLOAD3 | DS | 0H |  |
|  | L | 3,=A(THEWORK3) |  |
|  | LH | 2,PSOLRECL | OUTPUT LRECL |
|  | AR | 3,2 |  |
|  | CR | 5,3 |  |
|  | BNL | VPSLOAD4 |  |
|  | GET | PSGETDCB |  |
|  | LR | 6,1 |  |
| * |  |  |  |
|  | LR | 2,5 |  |
|  | LH | 3,PSILRECL | INPUT LRECL |
|  | LR | 0,6 |  |
|  | LR | 1,3 |  |
|  | MVCL | 2,0 |  |
|  | LH | 3,PSILRECL | INPUT LRECL |
|  | AR | 5,3 |  |
|  | B | VPSLOAD3 |  |
| * |  |  |  |
| VPSLOAD4 | DS | 0H |  |
|  | LH | 2,PSOLRECL |  |
|  | STH | 2,PSPUTDCB+X'52' |  |
|  | PUT | PSPUTDCB,THEWORK3 |  |
|  | B | VBPSLOD2 |  |
| * |  |  |  |
| * |  |  |  |
| * |  | UPLOAD OF RECFM = U DATASET |  |
| UPSLOAD | DS | 0H |  |
|  | GET | PSGETDCB | 2ND UPLOAD RECORD |
|  | LH | 2,PSGETDCB+X'52' | IN LRECL |
|  | STH | 2,PSILRECL |  |
| * |  |  |  |
|  | TM | PSPUTDCB+X'24',X'C0' | OUTPUT RECFM=U ? |
|  | BNO | PDSERR0M | NO, RECFM NOT SUPPORTED |
|  | LH | 2,PSPUTDCB+X'3E' | OUTPUT BLKSIZE |
|  | STH | 2,PSOLRECL |  |

TABLE 1-continued

```
*
          CLI     PDSDMPSW,X'02'
          BE      UPSLOADB
*
*
*         WHEN EACH INPUT RECORD OF U RECORD FORMAT RECORD WAS FIRST
*         DIVIDED INTO MORE THAN ONE RECORDS OF SAME LENGTH OF
*         (OUTPUT LRECL - 4) BYTES AND THEN EACH DIVIDED RECORD WAS
*         APPENDED AT THE FRONT WITH 4-BYTES HEADER OF 2-BYTES OF
*         CONTENT LENGTH IN THE DIVIDED RECORD AND 2-BYTES OF
*         CONTINUATION SEQUENCE NUMBER
*
          LA      2,UPSLOADA           NEW EODAD ADDRESS
          STCM    2,7,PSGETDCB+X'21'   EODAD
          L       5,=A(THEWORK)
          XC      PSIRECNO,PSIRECNO
UPSLOAD4  DS      0H
          L       3,=A(THEWORK)
          LH      2,PSOLRECL           OUTPUT BLOCK SIZE
          AR      3,2
          CR      5,3
          BH      PDSERR0A             OUTPUT DATASET BLOCKSIZE TOO SMALL
          GET     PSGETDCB
          LR      6,1
          CLC     2(2,6),=X'0001'      CONCATENATION COUNT
          BNE     UPSLOAD5
          CLC     PSIRECNO,=X'0000'
          BNE     UPSLOAD6             FIRST OUTPUT RECORD
UPSLOAD5  DS      0H
          MVC     PSIRECNO,2(6)
          LH      1,PSILRECL           INPUT LRECL
          S       1,=F'4'              HEADER LENGTH
          LH      3,0(,6)              REAL DATA LENGTH
          CR      3,1
          BH      PDSERR0B             INPUT UPLOAD DATASET LRECL TOO SMALL
          LR      4,5
          LR      1,5                  SAVE R5
          LR      5,3
          LA      2,4(,6)
          MVCL    4,2
          LR      5,1                  RESTORE R5
          LH      2,0(,6)              REAL DATA LENGTH
          AR      5,2
          B       UPSLOAD4
*
UPSLOAD6  DS      0H                   FIRST OUTPUT RECORD
          L       4,=A(THEWORK)
          SR      5,4                  OUTPUT RECORD LENGTH
          STH     5,PSPUTDCB+X'52'     OUTPUT RECORD LENGTH
          PUT     PSPUTDCB,(4)
*
UPSLOAD7  DS      0H
          L       5,=A(THEWORK)
          LH      1,PSILRECL
          S       1,=F'4'              HEADER LENGTH
          LH      3,0(,6)              REAL DATA LENGTH
          CR      3,1
          BH      PDSERR0B             INPUT UPLOAD DATASET LRECL TOO SMALL
          LR      4,5
          LR      1,5                  SAVE R5
          LR      5,3
          LA      2,4(,6)
          MVCL    4,2
          LR      5,1                  RESTORE R5
          LH      2,0(,6)              REAL DATA LENGTH
          AR      5,2
UPSLOAD8  DS      0H
          L       3,=A(THEWORK)
          LH      2,PSPUTDCB+X'3E'
          AR      3,2
          CR      5,3
          BH      PDSERR0A             OUTPUT DATASET BLOCKSIZE TOO SMALL
          GET     PSGETDCB
          LR      6,1
          CLC     2(2,6),=X'0001'      CONCATENATION COUNT
          BE      UPSLOAD9
          LH      1,PSGETDCB+X'52'
          S       1,=F'4'              HEADER LENGTH
          LH      3,0(,6)              REAL DATA LENGTH
          CR      3,1
          BH      PDSERR0B             INPUT UPLOAD DATASET LRECL TOO SMALL
```

TABLE 1-continued

|  |  |  |  |
|---|---|---|---|
|  | LR | 4,5 |  |
|  | LR | 1,5 | SAVE R5 |
|  | LR | 5,3 |  |
|  | LA | 2,4(,6) |  |
|  | MVCL | 4,2 |  |
|  | LR | 5,1 | RESTORE R5 |
|  | LH | 2,0(,6) | REAL DATA LENGTH |
|  | AR | 5,2 |  |
|  | B | UPSLOAD8 |  |
| * |  |  |  |
| UPSLOAD9 | DS | 0H |  |
|  | L | 4,=A(THEWORK) |  |
|  | SR | 5,4 |  |
|  | STH | 5,PSPUTDCB+X'52' | OUTPUT RECORD SIZE |
|  | PUT | PSPUTDCB,(4) |  |
|  | B | UPSLOAD7 |  |
| * |  |  |  |
| UPSLOADA | DS | 0H |  |
|  | L | 4,=A(THEWORK) |  |
|  | SR | 5,4 |  |
|  | LTR | 5,5 |  |
|  | BZ | RETURN99 |  |
|  | STH | 5,PSPUTDCB+X'52' | OUTPUT RECORD SIZE |
|  | PUT | PSPUTDCB,(4) |  |
|  | B | RETURN99 |  |
| * |  |  |  |
| * |  | WHEN 4-BYTES HEADER, WITH 2-BYTES OF RECODE LENGTH OF |  |
| * |  | INPUT U RECORD FORMAT RECORD AND 2 NULL BYTES, WAS FIRST |  |
| * |  | APPENDED AT THE BEGINING OF EACH INPUT LOAD LIBRARY RECORD |  |
| * |  | AND THEN IT WAS DIVIDED INTO MORE THAN ONE OUTPUT RECORDS |  |
| * |  | OF SAME LENGTH |  |
| * |  |  |  |
| UPSLOADB | DS | 0H |  |
|  | LA | 2,UPSLOADF | NEW EODAD ADDRESS |
|  | STCM | 2,7,PSGETDCB+X'21' | EODAD |
| UPSLOADC | DS | 0H |  |
|  | GET | PSGETDCB | FIRST UPLOAD RECORD OF EACH OUTPUT |
|  | LR | 6,1 |  |
|  | LH | 2,0(,6) | LENGTH OF OUTPUT RECORD |
|  | STH | 2,LTHEWORK |  |
|  | LH | 3,PSOLRECL | OUTPUT DATASET BLKSIZE |
|  | CR | 2,3 |  |
|  | BH | PDSERR0A | OUTPUT DATASET BLOCKSIZE TOO SMALL |
|  | LH | 4,PSILRECL | INPUT UPLOAD RECORD LRECL |
|  | S | 4,=F'4' | HEADER LENGTH |
|  | LR | 1,4 |  |
|  | LR | 3,4 |  |
|  | LA | 2,4(,6) | AFTER 4-BYTES HEADER |
|  | L | 0,=A(THEWORK) |  |
|  | MVCL | 0,2 |  |
|  | L | 2,=A(THEWORK) |  |
|  | AR | 2,4 |  |
|  | ST | 2,ATHEWORK |  |
| UPSLOADD | DS | 0H |  |
|  | L | 2,ATHEWORK |  |
|  | L | 3,=A(THEWORK) |  |
|  | SR | 2,3 |  |
|  | LH | 3,LTHEWORK |  |
|  | CR | 2,3 |  |
|  | BNL | UPSLOADE |  |
|  | GET | PSGETDCB |  |
|  | LR | 6,1 |  |
|  | LH | 3,PSILRECL | INPUT UPLOAD RECORD LRECL |
|  | L | 4,ATHEWORK |  |
|  | LR | 1,4 |  |
|  | AR | 1,3 |  |
|  | ST | 1,ATHEWORK |  |
|  | LR | 5,3 |  |
|  | LR | 2,6 |  |
|  | MVCL | 4,2 |  |
|  | B | UPSLOADD |  |
| * |  |  |  |
| UPSLOADE | DS | 0H |  |
|  | L | 4,=A(THEWORK) |  |
|  | LH | 5,LTHEWORK |  |
|  | STH | 5,PSPUTDCB+X'52' | OUTPUT RECORD LENGTH |
|  | PUT | PSPUTDCB,(4) |  |
|  | B | UPSLOADC |  |
| * |  |  |  |
| UPSLOADF | DS | 0H |  |

TABLE 1-continued

```
         B      RETURN99
*
*
*        UPLOAD OF RECFM = F DATASET
FPSLOAD  DS     0H
         GET    PSGETDCB             2ND UPLOAD RECORD
         LH     2,PSGETDCB+X'52'     IN LRECL
         STH    2,PSILRECL
*
         TM     PSPUTDCB+X'24',X'C0' OUTPUT RECFM=U ?
         BO     PDSERR0M             YES, RECFM NOT SUPPORTED
         TM     PSPUTDCB+X'24',X'80' OUTPUT RECFM=F ?
         BNO    PDSERR0M             NO, RECFM NOT SUPPORTED
         LH     2,PSPUTDCB+X'52'     OUTPUT LRECL
         STH    2,PSOLRECL
*
         CLI    PDSDMPSW,X'02'
         BE     FPSLOADB
*
*        WHEN EACH INPUT RECORD OF U RECORD FORMAT RECORD WAS FIRST
*        DIVIDED INTO MORE THAN ONE RECORDS OF SAME LENGTH OF
*        (OUTPUT LRECL - 4) BYTES AND THEN EACH DIVIDED RECORD WAS
*        APPENDED AT THE FRONT WITH 4-BYTES HEADER OF 2-BYTES OF
*        CONTENT LENGTH IN THE DIVIDED RECORD AND 2-BYTES OF
*        CONTINUATION SEQUENCE NUMBER
*
         LA     2,FPSLOADA           NEW EODAD ADDRESS
         STCM   2,7,PSGETDCB+X'21'   EODAD
         L      5,=A(THEWORK)
         XC     PSIRECNO, PSIRECNO
FPSLOAD4 DS     0H
         L      3,=A(THEWORK)
         LH     2,PSOLRECL           OUTPUT LRECL
         AR     3,2
         CR     5,3
         BH     PDSERR0O             OUTPUT DATASET LRECL TOO SMALL
         GET    PSGETDCB
         LR     6,1
         CLC    2(2,6),=X'0001'      CONCATENATION COUNT
         BNE    FPSLOAD5
         CLC    PSIRECNO,=X'0000'
         BNE    FPSLOAD6             FIRST OUTPUT RECORD
FPSLOAD5 DS     0H
         MVC    PSIRECNO,2(6)
         LH     1,PSILRECL           INPUT LRECL
         S      1,=F'4'              HEADER LENGTH
         LH     3,0(,6)              REAL DATA LENGTH
         CR     3,1
         BH     PDSERR0B             INPUT UPLOAD DATASET LRECL TOO SMALL
         LR     4,5
         LR     1,5                  SAVE R5
         LR     5,3
         LA     2,4(,6)
         MVCL   4,2
         LR     5,1                  RESTORE R5
         LH     2,0(,6)              REAL DATA LENGTH
         AR     5,2
         B      FPSLOAD4
*
FPSLOAD6 DS     0H                   FIRST OUTPUT RECORD
         L      4,=A(THEWORK)
         SR     5,4                  OUTPUT RECORD LENGTH
         LH     2,PSPUTDCB+X'52'     OUTPUT RECORD LENGTH
         CR     5,2
         PUT    PSPUTDCB,(4)
*
FPSLOAD7 DS     0H
         L      5,=A(THEWORK)
         LH     1,PSILRECL
         S      1,=F'4'              HEADER LENGTH
         LH     3,0(,6)              REAL DATA LENGTH
         CR     3,1
         BH     PDSERR0B             INPUT UPLOAD DATASET LRECL TOO SMALL
         LR     4,5
         LR     1,5                  SAVE R5
         LR     5,3
         LA     2,4(,6)
         MVCL   4,2
         LR     5,1                  RESTORE R5
         LH     2,0(,6)              REAL DATA LENGTH
```

TABLE 1-continued

|  |  |  |  |
|---|---|---|---|
|  | AR | 5,2 |  |
| FPSLOAD8 | DS | 0H |  |
|  | L | 3,=A(THEWORK) |  |
|  | LH | 2,PSOLRECL |  |
|  | AR | 3,2 |  |
|  | CR | 5,3 |  |
|  | BH | PDSERR0O | OUTPUT DATASET LRECL TOO SMALL |
|  | GET | PSGETDCB |  |
|  | LR | 6,1 |  |
|  | CLC | 2(2,6),=X'0001' | CONCATENATION COUNT |
|  | BE | FPSLOAD9 |  |
|  | LH | 1,PSILRECL |  |
|  | S | 1,=F'4' | HEADER LENGTH |
|  | LH | 3,0(,6) | REAL DATA LENGTH |
|  | CR | 3,1 |  |
|  | BH | PDSERR0B | INPUT UPLOAD DATASET LRECL TOO SMALL |
|  | LR | 4,5 |  |
|  | LR | 1,5 | SAVE R5 |
|  | LR | 5,3 |  |
|  | LA | 2,4(,6) |  |
|  | MVCL | 4,2 |  |
|  | LR | 5,1 | RESTORE R5 |
|  | LH | 2,0(,6) | REAL DATA LENGTH |
|  | AR | 5,2 |  |
|  | B | FPSLOAD8 |  |
| * |  |  |  |
| FPSLOAD9 | DS | 0H |  |
|  | L | 4,=A(THEWORK) |  |
|  | SR | 5,4 |  |
|  | LH | 2,PSPUTDCB+X'52' | OUTPUT RECORD SIZE |
|  | PUT | PSPUTDCB,(4) |  |
|  | B | FPSLOAD7 |  |
| * |  |  |  |
| FPSLOADA | DS | 0H |  |
|  | L | 4,=A(THEWORK) |  |
|  | SR | 5,4 |  |
|  | LTR | 5,5 |  |
|  | BZ | RETURN99 |  |
|  | LH | 2,PSPUTDCB+X'52' | OUTPUT RECORD SIZE |
|  | PUT | PSPUTDCB,(4) |  |
|  | B | RETURN99 |  |
| * |  |  |  |
| * |  | WHEN 4-BYTES HEADER, WITH 2-BYTES OF RECODE LENGTH OF |  |
| * |  | INPUT U RECORD FORMAT RECORD AND 2 NULL BYTES, WAS FIRST |  |
| * |  | APPENDED AT THE BEGINING OF EACH INPUT LOAD LIBRARY RECORD |  |
| * |  | AND THEN IT WAS DIVIDED INTO MORE THAN ONE OUTPUT RECORDS |  |
| * |  | OF SAME LENGTH |  |
| * |  |  |  |
| FPSLOADB | DS | 0H |  |
|  | LA | 2,FPSLOADF | NEW EODAD ADDRESS |
|  | STCM | 2,7,PSGETDCB+X'21' | EODAD |
| FPSLOADC | DS | 0H |  |
|  | GET | PSGETDCB | FIRST UPLOAD RECORD OF EACH OUTPUT |
|  | LR | 6,1 |  |
|  | LH | 2,0(,6) | LENGTH OF OUTPUT RECORD |
|  | STH | 2,LTHEWORK |  |
|  | LH | 3,PSOLRECL | OUTPUT DATASET BLKSIZE |
|  | CR | 2,3 |  |
|  | BH | PDSERR0O | OUTPUT DATASET LRECL TOO SMALL |
|  | LH | 4,PSILRECL | INPUT UPLOAD RECORD LRECL |
|  | S | 4,=F'4' | HEADER LENGTH |
|  | LR | 1,4 |  |
|  | LR | 3,4 |  |
|  | LA | 2,4(,6) | AFTER 4-BYTES HEADER |
|  | L | 0,=A(THEWORK) |  |
|  | MVCL | 0,2 |  |
|  | L | 2,=A(THEWORK) |  |
|  | AR | 2,4 |  |
|  | ST | 2,ATHEWORK |  |
| FPSLOADD | DS | 0H |  |
|  | L | 2,ATHEWORK |  |
|  | L | 3,=A(THEWORK) |  |
|  | SR | 2,3 |  |
|  | LH | 3,LTHEWORK |  |
|  | CR | 2,3 |  |
|  | BNL | FPSLOADE |  |
|  | GET | PSGETDCB |  |
|  | LR | 6,1 |  |
|  | LH | 3,PSILRECL | INPUT UPLOAD RECORD LRECL |
|  | L | 4,ATHEWORK |  |

TABLE 1-continued

```
              LR       1,4
              AR       1,3
              ST       1,ATHEWORK
              LR       5,3
              LR       2,6
              MVCL     4,2
              B        FPSLOADD
*
FPSLOADE      DS       0H
              L        4,=A(THEWORK)
              LH       5,LTHEWORK
              LH       2,PSPUTDCB+X'52'     OUTPUT RECORD LENGTH
              PUT      PSPUTDCB,(4)
              B        FPSLOADC
*
FPSLOADF      DS       0H
              B        RETURN99
*
*
*
PDSDUMP       DS       0H
*             STM      0,15,PDSRSAVE
              OPEN     PDSRDCB1
              TM       PDSRDCB1+X'30',X'10'
              BNO      PDSERR02
              TM       PDSRDCB1+X'1A',X'02'     PDS ?
              BNO      PDSERR0C                 NOT A PDS
              TM       PDSRDCB1+X'24',X'80'     RECFM=F or FB or U ?
              BNO      PDSERR09                 NO, RECFM NOT SUPPORTED
              MVC      PDSRECFM,PDSRDCB1+X'24'  F=X'80' or FB=X'90' or U=X'C0'
              LH       2,PDSRDCB1+X'3E'         MAX BLOCK SIZE
              STH      2,PDSBLKSZ
              LH       2,PDSRDCB1+X'52'         LRECL
              STH      2,PDSLRECL
              CLOSE    PDSRDCB1
*
              LH       2,TEXTLEN
              LTR      2,2                      ANY MEMBER ENTERED ?
              BNZ      PDSDUMPA                 YES. MEMBER NAME ENTERED.
*             ALL MEMBERS WILL BE DUMPED.
              OPEN     PDSRBDCB
              TM       PDSRBDCB+X'30',X'10'
              BNO      PDSERR01
              LA       2,PDSDUMP4
              STCM     2,7,PDSRBDCB+X'21'       EODAD
              *
              L        2,=A(THEWORK)            INIT THEWORK WITH X'00'
              L        3,=A(THEWORKL+8)         BLOCK SIZE
              SR       0,0                      INIT WITH X'00'
              SR       1,1
              MVCL     2,0
*
              L        6,=A(THEWORK2)
PDSDUMP1      DS       0H
              L        3,=A(THEWORK)
              READ     PDSDDEC1,SF,PDSRBDCB,(3),'S',MF=E
              CHECK    PDSDDEC1
              L        5,PDSDDEC1+12            RECORD AREA ADDRESS FROM DECB
*
              LH       4,0(,5)                  TEXT LENGTH IN THE INDEX RECORD BLOCK
              AR       4,5                      THE END OF RECORD IN THE BLOCK
              LA       5,2(,5)                  AFTER 2-BYTES LENGTH FIELD
PDSDUMP2      DS       0H
              CR       5,4                      THE END OF TEXT IN THE BLOCK ?
              BNL      PDSDUMP1                 YES
              CLC      0(8,5),=8X'FF'           THE END OF MEMBER LIST ?
              BE       PDSDUMP4                 YES
              MVC      0(8,6),0(5)              MEMBER NAME
*
              MVC      PDSDIREL(PDSSTOWE-PDSDIREL),0(5)     40 BYTES
              MVI      PDSDIRVS,C' '
              MVC      PDSDIRVS+1(PDSDIRNE-PDSDIRVS-1),PDSDIRVS
              SR       2,2
              IC       2,PDSSEG#                # OF 2-BYTES FOLLOWING
              SLL      2,28
              SRL      2,27                     MULTIPLY BY 2
              LA       5,12(2,5)                NEXT ENTRY LOCATION
              CLI      PDSRECFM,X'C0'           RECFM= U ?
              BNE      PDSDMP22                 NO, TEXT LIBRARY
*             LOAD MODULE LIBRARY
```

TABLE 1-continued

|  |  |  |  |  |
|---|---|---|---|---|
|  | MVC | 8(PDSSTOWE−PDSSEG#,6),PDSSEG# | 29 BYTES |  |
|  | LA | 6,8+PDSSTOWE−PDSSEG#(,6) | 37 BYTES ENTRY |  |
|  | B | PDSDUMP2 |  |  |
| PDSDMP22 | DS | 0H | TEXT LIBRARY |  |
|  | LTR | 2,2 |  |  |
|  | BZ | PDSDUMP3 |  |  |
|  | LA | 1,PDSCRTDT+1 | X'0095013F' | 95/01/13 |
|  | BAL | 14,EDITDATE | R1 −> YYDDDMMDD |  |
|  | MVC | PDSDIRCR(2),0(1)   YY |  |  |
|  | MVI | PDSDIRCR+2,C'/' |  |  |
|  | MVC | PDSDIRCR+3(2),5(1)   MM |  |  |
|  | MVI | PDSDIRCR+5,C'/' |  |  |
|  | MVC | PDSDIRCR+6(2),7(1)   DD |  |  |
|  | LA | 1,PDSUPDDT+1 | X'0095013F' | 95/01/13 |
|  | BAL | 14,EDITDATE | R1 −> YYDDDMMDD |  |
|  | MVC | PDSDIRUP(2),0(1)   YY |  |  |
|  | MVI | PDSDIRUP+2,C'/' |  |  |
|  | MVC | PDSDIRUP+3(2),5(1)   MM |  |  |
|  | MVI | PDSDIRUP+5,C'/' |  |  |
|  | MVC | PDSDIRUP+6(2),7(1)   DD |  |  |
|  | SR | 2,2 |  |  |
|  | SR | 3,3 |  |  |
|  | IC | 3,PDSUPDTM |  |  |
|  | SLDL | 2,28 |  |  |
|  | SRL | 3,28 |  |  |
|  | STC | 2,PDSDIRTM |  |  |
|  | STC | 3,PDSDIRTM+1 |  |  |
|  | OC | PDSDIRTM(2),=X'F0F0' |  |  |
|  | MVI | PDSDIRTM+2,C':' |  |  |
|  | SR | 2,2 |  |  |
|  | SR | 3,3 |  |  |
|  | IC | 3,PDSUPDTM+1 |  |  |
|  | SLDL | 2,28 |  |  |
|  | SRL | 3,28 |  |  |
|  | STC | 2,PDSDIRTM+3 |  |  |
|  | STC | 3,PDSDIRTM+4 |  |  |
|  | OC | PDSDIRTM+3(2),=X'F0F0' |  |  |
|  | SR | 2,2 |  |  |
|  | IC | 2,PDSVERSN | X'0163' | 01.99 |
|  | CVD | 2,PDSWRKDW |  |  |
|  | UNPK | PDSWRKWD,PDSWRKDW+6(2) |  |  |
|  | OI | PDSWRKWD+7,X'F0' |  |  |
|  | MVC | PDSDIRVS(2),PDSWRKWD+6 |  |  |
|  | MVI | PDSDIRVS+2,C'.' |  |  |
|  | SR | 2,2 |  |  |
|  | IC | 2,PDSVERSN+1 | X'0163' | 01.99 |
|  | CVD | 2,PDSWRKDW |  |  |
|  | UNPK | PDSWRKWD,PDSWRKDW+6(2) |  |  |
|  | OI | PDSWRKWD+7,X'F0' |  |  |
|  | MVC | PDSDIRVS+3(2),PDSWRKWD+6 |  |  |
| * |  |  |  |  |
|  | LH | 2,PDSLINE# | X'0276' | 630 |
|  | CVD | 2,PDSWRKDW |  |  |
|  | UNPK | PDSWRKWD,PDSWRKDW+4(4) |  |  |
|  | OI | PDSWRKWD+7,X'F0' |  |  |
|  | MVC | PDSDIRL#,PDSWRKWD+3 |  |  |
|  | LH | 2,PDSINIT# | X'000A' | 10 |
|  | CVD | 2,PDSWRKDW |  |  |
|  | UNPK | PDSWRKWD,PDSWRKDW+4(4) |  |  |
|  | OI | PDSWRKWD+7,X'F0' |  |  |
|  | MVC | PDSDIR0#,PDSWRKWD+3 |  |  |
|  | MVC | PDSDIRUS,PDSUPDNM | TSO USER ID |  |
| PDSDUMP3 | DS | 0H |  |  |
|  | MVC | 8(PDSDIRNE−PDSDIRVS,6),PDSDIRVS |  |  |
|  | LA | 6,8+PDSDIRNE−PDSDIRVS(,6) | 64 BYTES ENTRY |  |
|  | B | PDSDUMP2 |  |  |
| * |  |  |  |  |
|  | READ | PDSDDEC1,SF,PDSRBDCB,THEWORK,'S',MF=L |  |  |
| * |  |  |  |  |
| PDSDUMP4 | DS | 0H |  |  |
|  | MVC | 0(8,6),=8X'FF' | THE END MARK |  |
|  | CLOSE | PDSRBDCB |  |  |
|  | B | PDSDUMPM |  |  |
| * |  |  |  |  |
| * |  |  |  |  |
| PDSDUMPA | DS | 0H |  |  |
|  | L | 5,=A(THEWORK2) |  |  |
|  | L | 6,TEXTLOC |  |  |
| PDSDUMPB | DS | 0H |  |  |
|  | L | 3,TEXTLOC |  |  |

TABLE 1-continued

|            |       |                                  |                                   |
|------------|-------|----------------------------------|-----------------------------------|
|            | LH    | 2,TEXTLEN                        |                                   |
|            | AR    | 3,2                              |                                   |
|            | CR    | 6,3                              |                                   |
|            | BNL   | PDSDUMPG                         |                                   |
|            | OPEN  | PDSRBDCB                         |                                   |
|            | TM    | PDSRBDCB+X'30',X'10'             |                                   |
|            | BNO   | PDSERR01                         |                                   |
|            | LA    | 2,PDSERR05                       | SUCH MEMBER NOT FOUND IN THIS PDS |
|            | STCM  | 2,7,PDSRBDCB+X'21'               | EODAD                             |
| *          |       |                                  |                                   |
| PDSDUMPC   | DS    | 0H                               |                                   |
|            | L     | 3,=A(THEWORK)                    |                                   |
|            | READ  | PDSDDEC3,SF,PDSRBDCB,(3),'S',MF=E |                                  |
|            | CHECK | PDSDDEC3                         |                                   |
|            | L     | 4,PDSDDEC3+12                    | RECORD AREA ADDRESS FROM DECB     |
| *          |       |                                  |                                   |
|            | LH    | 3,0(,4)                          | TEXT LENGTH IN THE BLOCK          |
|            | AR    | 3,4                              | THE END OF RECORD IN THE BLOCK    |
|            | LA    | 4,2(,4)                          | AFTER 2-BYTES LENGTH FIELD        |
| PDSDUMPD   | DS    | 0H                               |                                   |
|            | CR    | 4,3                              | THE END OF TEXT IN THE BLOCK ?    |
|            | BNL   | PDSDUMPC                         | YES                               |
|            | CLC   | 0(8,4),=8X'FF'                   | THE END OF MEMBER LIST ?          |
|            | BE    | PDSERR05                         | YES. NO SUCH MEMBER IN THIS PDS   |
|            | CLC   | 0(8,4),0(6)                      | SAME MEMBER NAME ?                |
|            | BE    | PDSDUMPE                         | YES                               |
|            | SR    | 2,2                              |                                   |
|            | IC    | 2,11(,4)                         | # OF 2-BYTES FOLLOWING            |
|            | SLL   | 2,28                             |                                   |
|            | SRL   | 2,27                             | MULTIPLY BY 2                     |
|            | LA    | 4,12(2,4)                        | NEXT ENTRY LOCATION               |
|            | B     | PDSDUMPD                         |                                   |
| *          |       |                                  |                                   |
| PDSDUMPE   | DS    | 0H                               |                                   |
|            | LA    | 6,8(,6)                          | NEXT MEMBER IN TEXTLOC            |
|            | MVC   | 0(8,5),0(4)                      | MEMBER NAME                       |
| *          |       |                                  |                                   |
|            | MVC   | PDSDIREL(PDSSTOWE−PDSDIREL),0(4) MAXIMUM 40 BYTES | |
|            | MVI   | PDSDIRVS,C' '                    |                                   |
|            | MVC   | PDSDIRVS+1(PDSDIRNE−PDSDIRVS−1),PDSDIRVS |                         |
|            | SR    | 2,2                              |                                   |
|            | IC    | 2,PDSSEG#                        | # OF 2-BYTES FOLLOWING            |
|            | SLL   | 2,28                             |                                   |
|            | SRL   | 2,27                             | MULTIPLY BY 2                     |
|            | LA    | 4,12(2,4)                        | NEXT ENTRY LOCATION               |
|            | CLI   | PDSRECFM,X'C0'                   | RECFM= U ?                        |
|            | BNE   | PDSDMPE2                         | NO, TEXT LIBRARY                  |
| *          | LOAD MODULE LIBRARY |                    |                                   |
|            | MVC   | 8(PDSSTOWE−PDSSEG#,5),PDSSEG#    |                                   |
|            | LA    | 5,8+PDSSTOWE−PDSSEG#(,5)         |                                   |
|            | CLOSE | PDSRBDCB                         |                                   |
|            | B     | PDSDUMPB                         |                                   |
| PDSDMPE2   | DS    | 0H                               | TEXT LIBRARY                      |
|            | LTR   | 2,2                              |                                   |
|            | BZ    | PDSDUMPF                         |                                   |
|            | LA    | 1,PDSCRTDT+1                     | X'0095013F'   95/01/13            |
|            | BAL   | 14,EDITDATE                      | R1 -> YYDDDMMDD                   |
|            | MVC   | PDSDIRCR(2),0(1)    YY           |                                   |
|            | MVI   | PDSDIRCR+2,C'/'                  |                                   |
|            | MVC   | PDSDIRCR+3(2),5(1) MM            |                                   |
|            | MVI   | PDSDIRCR+5,C'/'                  |                                   |
|            | MVC   | PDSDIRCR+6(2),7(1) DD            |                                   |
|            | LA    | 1,PDSUPDDT+1                     | X'0095013F'   95/01/13            |
|            | BAL   | 14,EDITDATE                      | R1 -> YYDDDMMDD                   |
|            | MVC   | PDSDIRUP(2),0(1)    YY           |                                   |
|            | MVI   | PDSDIRUP+2,C'/'                  |                                   |
|            | MVC   | PDSDIRUP+3(2),5(1) MM            |                                   |
|            | MVI   | PDSDIRUP+5,C'/'                  |                                   |
|            | MVC   | PDSDIRUP+6(2),7(1) DD            |                                   |
|            | SR    | 2,2                              |                                   |
|            | SR    | 3,3                              |                                   |
|            | IC    | 3,PDSUPDTM                       |                                   |
|            | SLDL  | 2,28                             |                                   |
|            | SRL   | 3,28                             |                                   |
|            | STC   | 2,PDSDIRTM                       |                                   |
|            | STC   | 3,PDSDIRTM+1                     |                                   |
|            | OC    | PDSDIRTM(2),=X'F0F0'             |                                   |
|            | MVI   | PDSDIRTM+2,C':'                  |                                   |
|            | SR    | 2,2                              |                                   |
|            | SR    | 3,3                              |                                   |

TABLE 1-continued

|  |  |  |  |  |
|---|---|---|---|---|
|  | IC | 3,PDSUPDTM+1 |  |  |
|  | SLDL | 2,28 |  |  |
|  | SRL | 3,28 |  |  |
|  | STC | 2,PDSDIRTM+3 |  |  |
|  | STC | 3,PDSDIRTM+4 |  |  |
|  | OC | PDSDIRTM+3(2),=X'F0F0' |  |  |
|  | SR | 2,2 |  |  |
|  | IC | 2,PDSVERSN | X'0163' | 01.99 |
|  | CVD | 2,PDSWRKDW |  |  |
|  | UNPK | PDSWRKDW,PDSWRKDW+6(2) |  |  |
|  | OI | PDSWRKWD+7,X'F0' |  |  |
|  | MVC | PDSDIRVS(2),PDSWRKWD+6 |  |  |
|  | MVI | PDSDIRVS+2,C'.' |  |  |
|  | SR | 2,2 |  |  |
|  | IC | 2,PDSVERSN+1 | X'0163' | 01.99 |
|  | CVD | 2,PDSWRKDW |  |  |
|  | UNPK | PDSWRKDW,PDSWRKDW+6(2) |  |  |
|  | OI | PDSWRKWD+7,X'F0' |  |  |
|  | MVC | PDSDIRVS+3(2),PDSWRKWD+6 |  |  |
| * |  |  |  |  |
|  | LH | 2,PDSLINE# | X'0276' | 630 |
|  | CVD | 2,PDSWRKDW |  |  |
|  | UNPK | PDSWRKDW,PDSWRKDW+4(4) |  |  |
|  | OI | PDSWRKWD+7,X'F0' |  |  |
|  | MVC | PDSDIRL#,PDSWRKWD+3 |  |  |
|  | LH | 2,PDSINIT# | X'000A' | 10 |
|  | CVD | 2,PDSWRKDW |  |  |
|  | UNPK | PDSWRKDW,PDSWRKDW+4(4) |  |  |
|  | OI | PDSWRKWD+7,X'F0' |  |  |
|  | MVC | PDSDIR0#,PDSWRKWD+3 |  |  |
|  | MVC | PDSDIRUS,PDSUPDNM | TSO USER ID |  |
| PDSDUMPF | DS | 0H |  |  |
|  | MVC | 8(PDSDIRNE–PDSDIRVS,5),PDSDIRVS |  |  |
|  | LA | 5,8+PDSDIRNE–PDSDIRVS(,5) |  |  |
|  | CLOSE | PDSRBDCB |  |  |
|  | B | PDSDUMPB |  |  |
| * |  |  |  |  |
|  | READ | PDSDDEC3,SF,PDSRBDCB,THEWORK,'S',MF=L |  |  |
| * |  |  |  |  |
| PDSDUMPG | DS | 0H |  |  |
|  | MVC | 0(8,5),=8X'FF' | THE END MARK |  |
|  | B | PDSDUMPM |  |  |
| * |  |  |  |  |
| * |  |  |  |  |
| PDSDUMPM | DS | 0H |  |  |
|  | OPEN | (PSPUTDCB,OUTPUT) |  |  |
|  | TM | PSPUTDCB+X'30',X'10' |  |  |
|  | BNO | PDSERR04 |  |  |
|  | LH | 2,PSPUTDCB+X'52' | LRECL OF OUTPUT FILE |  |
|  | STH | 2,PSOLRECL |  |  |
|  | MVC | PDSOUTWK(23),=CL23'Dump of TEXT Library : ' |  |  |
|  | CLI | PDSRECFM,X'C0' | RECFM=U ? |  |
|  | BNE | PDSDMPM2 | NO, TEXT LIBRARY |  |
|  | MVC | PDSOUTWK(23),=CL23'Dump of LOAD Library : ' |  |  |
| PDSDMPM2 | DS | 0H |  |  |
|  | RDJFCB | JFCBDCB |  |  |
|  | MVC | PDSOUTWK+23(44),JFCBAREA | DSNAME |  |
|  | TIME | DEC |  |  |
|  | STCM | 1,15,PDSWRKDW | X'00YYDDDF' |  |
|  | STCM | 0,12,PDSWRKDW+4 | X'HHMM' |  |
|  | LA | 1,PDSWRKDW+1 | X'0095013F' | 95/01/13 |
|  | BAL | 14,EDITDATE | R1 -> YYDDDMMDD |  |
|  | MVC | PDSOUTWK+68(2),5(1) | MM |  |
|  | MVI | PDSOUTWK+70,C'/' |  |  |
|  | MVC | PDSOUTWK+71(2),7(1) | DD |  |
|  | MVI | PDSOUTWK+73,C'/' |  |  |
|  | MVC | PDSOUTWK+74(2),0(1) | YY |  |
|  | PUT | PSPUTDCB,PDSOUTWK |  |  |
|  | CLI | PDSRECFM,X'C0' | RECFM=U ? |  |
|  | BE | PDSDMPM3 | LOAD LIBRARY |  |
|  | MVI | PDSOUTWK,C'*' |  |  |
|  | MVC | PDSOUTWK+1(79),PDSOUTWK |  |  |
|  | PUT | PSPUTDCB,PDSOUTWK |  |  |
| PDSDMPM3 | DS | 0H |  |  |
|  | OPEN | PDSRDCB1 |  |  |
|  | TM | PDSRDCB1+X'30',X'10' |  |  |
|  | BNO | PDSERR02 |  |  |
| * |  |  |  |  |
| * |  |  |  |  |
|  | LA | 2,PDSDUMPQ | WHEN EACH INPUT LOAD LIBRARY RECORD IS |  |

TABLE 1-continued

```
*                                    DIVIDED AT THE SAME LENGTH OF
*                                    (OUTPUT LRECL - 4) BYTES AND THEN
*                                    EACH DIVIDED RECORD IS APPENDED WITH
*                                    4-BYTES HEADER OF 2-BYTES OF CONTENT
*                                    LENGTH AND 2-BYTES OF CONTINUATION
*                                    SEQUENCE NUMBER
           CLI       PDSDMPSW,X'01'
           BE        PDSDMPM4
*          LA        2,PDSDUMPU      WHEN 4-BYTES HEADER, WITH 2-BYTES OF
*                                    INPUT LOAD LIBRARY RECORD LENGTH AND
*                                    AND 2 NULL BYTES, IS APPENDED AT THE
*                                    BEGINING OF EACH INPUT LOAD LIBRARY
*                                    RECORD FIRST AND THEN IT IS DIVIDED
*                                    INTO THE OUTPUT RECORDS OF SAME LENGTH
*
PDSDMPM4   DS        0H
           STCM      2,7,PDSRDCB1+X'21'     EODAD
*
*
           L         6,=A(THEWORK2)
PDSDUMPN   DS        0H
           CLC       0(8,6),=BX'FF'
           BE        PDSDUMPR
           MVI       PDSOUTWK,C' '
           MVC       PDSOUTWK+1(L'PDSOUTWK-1),PDSOUTWK
           MVC       PDSOUTWK(12),=C'@@@@****%%%%'       MEMBER NAME RECORD MARK
           MVC       PDSOUTWK+12(8),0(6)                 MEMBER NAME
           MVC       PDSOUTWK+4+PDSDIRNE-PDSDIRVS+4(12),=CL12 'DON''T CHANGE'
           PUT       PSPUTDCB,PDSOUTWK                   WRITE MEMBER NAME MARK
           MVC       PDSOUTWK(4),=C';;;;'
           CLI       PDSRECFM,X'C0'                      RECFM=U ?
           BE        PDSDMPN2                            YES, LOAD LIBRARY
           MVC       PDSOUTWK+4(PDSDIRNE-PDSDIRVS),8(6)
           MVC       PDSOUTWK+4+PDSDIRNE-PDSDIRVS+4(12),=CL12'DON''T CHANGE'
           MVC       PDSBLDL1,0(6)             MEMBER NAME
           LA        6,8+PDSDIRNE-PDSDIRVS(,6) NEXT MEMBER LOCATION
           B         PDSDMPN3
PDSDMPN2   DS        0H
           MVI       PDSOUTWK+4,X'00'
           MVC       PDSOUTWK+5(75),PDSOUTWK+4
           MVC       PDSOUTWK+4(PDSSTOWE-PDSSEG#),8(6)
           MVC       PDSBLDL1,0(6)             MEMBER NAME
           LA        6,8+PDSSTOWE-PDSSEG#(,6)  NEXT MEMBER LOCATION
PDSDMPN3   DS        0H
           PUT       PSPUTDCB,PDSOUTWK         MEMBER DIRECTORY INFO
           LA        1,1                       1 MEMBER
           STH       1,PDSBLDLN                SAVE # OF MEMBERS
           BLDL      PDSRDCB1,PDSBLDLL
*
           LA        5,PDSBLDLT                LOCATION OF TTR
           FIND      PDSRDCB1,(5),C            POSITION AT THE FIRST BLOCK
*
*
*
           CLI       PDSDMPSW,X'02'
           BE        PDSDUMPS
*
*
*          WHEN EACH INPUT LOAD LIBRARY RECORD IS FIRST DIVIDED INTO
*          RECORDS OF SAME LENGTH OF (OUTPUT LRECL - 4) BYTES AND THEN
*          EACH DIVIDED RECORD IS APPENDED AT THE FRONT WITH 4-BYTES
*          HEADER OF 2-BYTES OF CONTENT LENGTH IN THE DIVIDED RECORD
*          AND 2-BYTES OF CONTINUATION SEQUENCE NUMBER
PDSDUMPO   DS        0H
           L         2,=A(THEWORK)
           LH        3,PDSRDCB1+X'3E'    INPUT BLOCK SIZE
           LA        3,8(,3)
           LA        5,X'FF'
           SLL       5,24
           SR        4,4
           MVCL      2,4
*
           L         5,=A(THEWORK)
           READ      PDSDDEC2,SF,PDSRDCB1,(5),'S'
*
           CHECK PDSDDEC2
*
           LH        2,PDSRDCB1+X'3E'    INPUT BLOCK SIZE
           CLI       PDSRECFM,X'C0'      RECFM=U ?
           BNE       PDSDMPO2            NO, TEXT LIBRARY
```

TABLE 1-continued

|  |  |  |  |
|---|---|---|---|
|  | LH | 2,PDSRDCB1+X'52' | INPUT LRECL SIZE |
| PDSDMPO2 | DS | 0H |  |
|  | L | 4,=A(THEWORK) |  |
|  | AR | 4,2 | THE END OF INPUT BLOCK |
|  | SR | 1,1 |  |
|  | STH | 1,PSORECNO |  |
| PDSDUMPP | DS | 0H |  |
|  | CR | 5,4 | BLOCK END ? |
|  | BNL | PDSDUMPO | YES |
|  | CLI | PDSRECFM,X'C0' | RECFM=U ? |
|  | BE | PDSDMPP2 | YES, LOAD LIBRARY |
| * | TEXT LIBRARY |  |  |
|  | CLC | 0(8,5),=8X'FF' | THE END OF INPUT BLOCK ? |
|  | BE | PDSDUMPO | YES |
|  | PUT | PSPUTDCB,(5) |  |
|  | LA | 5,80(,5) | NEXT LOCATION IN BLOCK |
|  | B | PDSDUMPP |  |
| * | LOAD LIBRARY |  |  |
| PDSDMPP2 | DS | 0H |  |
|  | L | 2,=A(THEWORK3) |  |
|  | LH | 3,PSPUTDCB+X'52' | OUTPUT LRECL |
|  | SR | 0,0 |  |
|  | SR | 1,1 |  |
|  | MVCL | 2,0 | INIT WITH X'00' |
| * |  |  |  |
|  | LH | 3,PSOLRECL | OUTPUT FILE LRECL |
|  | S | 3,=F'4' |  |
|  | LR | 0,4 |  |
|  | SR | 0,5 | REMAINING LENGTH |
|  | CR | 0,3 |  |
|  | BNL | PDSDMPP3 |  |
|  | LR | 3,0 |  |
| PDSDMPP3 | DS | 0H |  |
|  | L | 2,=A(THEWORK3) |  |
|  | STH | 3,0(,2) | LENGTH |
|  | LH | 1,PSORECNO |  |
|  | LA | 1,1(,1) |  |
|  | STH | 1,PSORECNO |  |
|  | STH | 1,2(,2) | CONCATENATION COUNT |
|  | LR | 0,5 |  |
|  | LR | 1,3 |  |
|  | LA | 2,4(,2) | AFTER HEADER |
|  | MVCL | 2,0 |  |
|  | L | 3,=A(THEWORK3) |  |
|  | PUT | PSPUTDCB,(3) |  |
|  | LH | 2,0(,3) | LENGTH |
|  | AR | 5,2 | NEXT LOCATION IN BLOCK |
|  | B | PDSDUMPP |  |
| * |  |  |  |
| PDSDUMPQ | DS | 0H | END OF A MEMBER |
|  | B | PDSDUMPN |  |
| * |  |  |  |
| * |  |  |  |
| * |  |  |  |
| * | WHEN 4-BYTES HEADER, WITH 2-BYTES OF INPUT LOAD LIBRARY |  |  |
| * | RECORD LENGTH AND 2 NULL BYTES, IS FIRST APPENDED AT THE |  |  |
| * | BEGINING OF EACH INPUT LOAD LIBRARY RECORD AND IT IS DIVIDED |  |  |
| * | INTO THE OUTPUT RECORDS OF SAME LENGTH |  |  |
| PDSDUMPS | DS | 0H |  |
|  | L | 2,=A(THEWORK) |  |
|  | LH | 3,PDSRDCB1+X'3E' | INPUT BLOCK SIZE |
|  | LA | 3,8(,3) |  |
|  | SR | 4,4 |  |
|  | LA | 5,X'FF' | INIT WITH X'FF' |
|  | SLL | 5,24 |  |
|  | MVCL | 2,4 |  |
| * |  |  |  |
|  | L | 5,=A(THEWORK) |  |
|  | READ | PDSDDEC4,SF,PDSRDCB1,(5),'S' |  |
| * |  |  |  |
|  | CHECK | PDSDDEC4 |  |
| * |  |  |  |
|  | CLI | PDSRECFM,X'C0' | RECFM=U ? |
|  | BE | PDSDMPT2 | LOAD LIBRARY |
| * | TEXT LIBRARY |  |  |
|  | LH | 2,PDSRDCB1+X'3E' | INPUT BLOCK SIZE |
|  | L | 4,=A(THEWORK) |  |
|  | AR | 4,2 | THE END OF INPUT BLOCK |
| PDSDUMPT | DS | 0H |  |
|  | CR | 5,4 | BLOCK END ? |

TABLE 1-continued

|  | BNL | PDSDUMPS | YES |
|---|---|---|---|
|  | CLC | 0(8,5),=8X'FF' | THE END OF INPUT BLOCK ? |
|  | BE | PDSDUMPS | YES |
|  | PUT | PSPUTDCB,(5) | |
|  | LA | 5,80(,5) | NEXT LOCATION IN BLOCK |
|  | B | PDSDUMPT | |
| * | LOAD LIBRARY | | |
| PDSDMPT2 | DS | 0H | |
|  | LH | 3,PDSRDCB1+X'52' | INPUT LRECL SIZE |
|  | L | 4,=A(THEWORK3) | ADDRESS IN THEWORK3 |
|  | STH | 3,0(4) | SAVE THE LENGTH OF THE INPUT RECORD |
|  | SR | 1,1 | |
|  | STH | 1,2(,4) | |
|  | LR | 0,5 | INPUT RECORD ADDRESS |
|  | LR | 1,3 | INPUT RECORD LENGTH |
|  | LA | 2,4(,4) | AFTER HEADER |
|  | MVCL | 2,0 | |
|  | LH | 3,PDSRDCB1+X'52' | INPUT LRECL SIZE |
|  | LA | 4,4(3,4) | THE END OF DATA IN THEWORK3 |
|  | L | 5,=A(THEWORK3) | |
|  | LH | 3,PSOLRECL | OUTPUT FILE LRECL |
| PDSDMPT3 | DS | 0H | |
|  | CR | 5,4 | END OF DATA IN THEWORK3 ? |
|  | BNL | PDSDUMPS | YES |
|  | PUT | PSPUTDCB,(5) | |
|  | AR | 5,3 | NEXT LOCATION IN THEWORK3 |
|  | B | PDSDMPT3 | |
| * | | | |
| PDSDUMPU | DS | 0H | END OF A MEMBER |
|  | B | PDSDUMPN | |
| * | | | |
| * | | | |
| PDSDUMPR | DS | 0H | |
|  | CLOSE | PDSRDCB1 | |
|  | CLOSE | PSPUTDCB | |
|  | LM | 0,15,PDSRSAVE | |
|  | BR | 14 | |
| * | | | |
|  | LTORG | | |
| * | | | |
| * | | | |
| * | LOAD MEMBERS FROM A PS DATASET TO A PDS LIBRARY | | |
| PDSLOAD | DS | 0H | |
| * | STM | 0,15,PDSRSAVE | |
|  | OPEN | PSGETDCB | |
|  | TM | PSGETDCB+X'30',X'10' | |
|  | BNO | PDSERR03 | |
|  | LH | 2,PSGETDCB+X'52' | LRECL |
|  | STH | 2,PSILRECL | |
|  | OPEN | (PDSWDCB1,OUTPUT) | |
|  | TM | PDSWDCB1+X'30',X'10' | |
|  | BNO | PDSERR01 | |
|  | TM | PDSWDCB1+X'1A',X'02' | PDS ? |
|  | BNO | PDSERR0C | NOT A PDS |
|  | LH | 2,PDSWDCB1+X'3E' | BLKSIZE |
|  | STH | 2,PDSBLKSZ | |
|  | MVC | PDSRECFM,PDSWDCB1+X'24' | RECFM |
|  | LA | 2,PDSLOADH | |
|  | STCM | 2,7,PSGETDCB+X'21' | NEW EODAD |
| * | | | |
| * | TIME | DEC,,ZONE=LT,LINKAGE=SVC | |
|  | TIME | DEC | |
| * | | | |
|  | STCM | 1,15,PDSCRTDT | X'00YYDDDF' |
|  | STCM | 1,15,PDSUPDDT | X'00YYDDDF' |
|  | STCM | 0,12,PDSUPDTM | X'HHMM' |
|  | SRL | 1,16 | 000000YY |
|  | LR | 0,1 | |
|  | SRDL | 0,4 | |
|  | MH | 0,=H'10' | |
|  | SRL | 1,28 | |
|  | AR | 1,0 | |
|  | STC | 1,PDSVERSN+1 | |
| * | | | |
|  | L | 1,X'10' | GET CVT ADDRESS 00FD8E48 |
|  | L | 1,0(,1) | CVTTCBP 218 |
|  | L | 1,0(,1) | MY TCB FROM X'218' |
|  | L | 1,12(,1) | TIOT |
|  | MVC | PDSUPDNM,0(1) | JOB NAME |
| * | | | |

TABLE 1-continued

```
              MVI      PDSTRTHX,X'01'
              MVC      PDSTRTHX+1(255),PDSTRTHX
              MVC      PDSTRTHX+C'0'(10),=10X'00'
*
              L        2,=A(THEWORK)       INIT THEWORK WITH X'00'
              L        3,=A(THEWORKL+8)    BLOCK SIZE
              SR       0,0                 INIT WITH X'00'
              SR       1,1
              MVCL     2,0
*
              GET      PSGETDCB
              LR       6,1
              CLC      =CL23'Dump of TEXT Library : ',0(6)
              BE       PDSLOAD1            TEXT LIBRARY
              CLC      =CL23'Dump of LOAD Library : ',0(6)
              BNE      PDSERR0N            NOT A LIBRARY UPLOAD
              CLI      PDSRECFM,X'C0'      RECFM=U ?
              BNE      PDSERR0D            OUTPUT IS NOT A RECFM=U LIBRARY
PDSLOAD1      DS       0H
              L        5,=A(THEWORK)
PDSLOAD2      DS       0H
              GET      PSGETDCB
              LR       6,1
              CLC      =C'@@@@****%%%%',0(6)
              BNE      PDSLOAD2
PDSLOAD3      DS       0H
              L        5,=A(THEWORK)       DO NOT DELETE
              MVC      PDSMEMNM,12(6)
              LH       3,TEXTLEN
              LTR      3,3
              BZ       PDSLOAD5
              L        4,TEXTLOC
              AR       3,4
PDSLOAD4      DS       0H
              CR       4,3
              BNL      PDSLOAD2
              CLC      PDSMEMNM,0(4)
              BE       PDSLOAD5
              LA       4,8(,4)
              B        PDSLOAD4
*
PDSLOAD5      DS       0H
              CLI      PDSRECFM,X'C0'      RECFM=U ?
              BE       PDSLOADM            YES, LOAD LIBRARY
*
              GET      PSGETDCB
              LR       6,1
*
              MVI      PDSSEG#,X'00'       DEFAULT TO NO DIRECORY INFO
              CLC      0(4,6),=C';;;;'
              BNE      PDSLOAD6
              MVC      PDSDIRVS(PDSDIRNE-PDSDIRVS),4(6)
              LA       4,PDSTRTHX
              LA       5,PDSDIRVS
              LA       1,2(,5)
              LA       3,1
              EX       3,PDSTRT1    TRT    0(0,5),0(4)      R5->ARG, R4->TABLE
              BNZ      PDSLOAD6
              LA       5,PDSDIRVS+3
              LA       1,2(,5)
              LA       3,1
              EX       3,PDSTRT1    TRT    0(0,5),0(4)      R5->ARG, R4->TABLE
              BNZ      PDSLOAD6
              LA       5,PDSDIRCR
              LA       1,2(,5)
              LA       3,1
              EX       3,PDSTRT1    TRT    0(0,5),0(4)      R5->ARG, R4->TABLE
              BNZ      PDSLOAD6
              LA       5,PDSDIRCR+3
              LA       1,2(,5)
              LA       3,1
              EX       3,PDSTRT1    TRT    0(0,5),0(4)      R5->ARG, R4->TABLE
              BNZ      PDSLOAD6
              LA       5,PDSDIRCR+6
              LA       1,2(,5)
              LA       3,1
              EX       3,PDSTRT1    TRT    0(0,5),0(4)      R5->ARG, R4->TABLE
              BNZ      PDSLOAD6
              LA       5,PDSDIRUP
              LA       1,2(,5)
```

TABLE 1-continued

| | | | | |
|---|---|---|---|---|
| LA | 3,1 | | | |
| EX | 3,PDSTRT1 | TRT | 0(0,5),0(4) | R5->ARG, R4->TABLE |
| BNZ | PDSLOAD6 | | | |
| LA | 5,PDSDIRUP+3 | | | |
| LA | 1,2(,5) | | | |
| LA | 3,1 | | | |
| EX | 3,PDSTRT1 | TRT | 0(0,5),0(4) | R5->ARG, R4->TABLE |
| BNZ | PDSLOAD6 | | | |
| LA | 5,PDSDIRUP+6 | | | |
| LA | 1,2(,5) | | | |
| LA | 3,1 | | | |
| EX | 3,PDSTRT1 | TRT | 0(0,5),0(4) | R5->ARG, R4->TABLE |
| BNZ | PDSLOAD6 | | | |
| LA | 5,PDSDIRTM | | | |
| LA | 1,2(,5) | | | |
| LA | 3,1 | | | |
| EX | 3,PDSTRT1 | TRT | 0(0,5),0(4) | R5->ARG, R4->TABLE |
| BNZ | PDSLOAD6 | | | |
| LA | 5,PDSDIRTM+3 | | | |
| LA | 1,2(,5) | | | |
| LA | 3,1 | | | |
| EX | 3,PDSTRT1 | TRT | 0(0,5),0(4) | R5->ARG, R4->TABLE |
| BNZ | PDSLOAD6 | | | |
| LA | 5,PDSDIRL# | | | |
| LA | 1,5(,5) | | | |
| LA | 3,4 | | | |
| EX | 3,PDSTRT1 | TRT | 0(0,5),0(4) | R5->ARG, R4->TABLE |
| BNZ | PDSLOAD6 | | | |
| LA | 5,PDSDIR0# | | | |
| LA | 1,5(,5) | | | |
| LA | 3,4 | | | |
| EX | 3,PDSTRT1 | TRT | 0(0,5),0(4) | R5->ARG, R4->TABLE |
| BNZ | PDSLOAD6 | | | |
| MVI | PDSSEG#,X'0F' | | | DIRECORY INFO |
| MVC | PDSUPDNM,PDSDIRUS | | | TSO USER ID |
| MVC | PDSWRKDW(2),PDSDIRCR+3 | | | MM |
| MVC | PDSWRKDW+2(2),PDSDIRCR+6 | | | DD |
| MVC | PDSWRKDW+4(2),PDSDIRCR | | | YY |
| LA | 1,PDSWRKDW | | | MMDDYY |
| BAL | 14,EDITDATE | | | R1 -> YYDDDC |
| ZAP | PDSCRTDT,0(3,1) | | | YYDDDC |
| OI | PDSCRTDT+L'PDSCRTDT-1,X'0F' | | | 00YYDDDF |
| MVC | PDSWRKDW(2),PDSDIRUP+3 | | | MM |
| MVC | PDSWRKDW+2(2),PDSDIRUP+6 | | | DD |
| MVC | PDSWRKDW+4(2),PDSDIRUP | | | YY |
| LA | 1,PDSWRKDW | | | MMDDYY |
| BAL | 14,EDITDATE | | | R1 -> YYDDDC |
| ZAP | PDSUPDDT,0(3,1) | | | YYDDDC |
| OI | PDSUPDDT+L'PDSUPDDT-1,X'0F' | | | 00YYDDDF |
| SR | 2,2 | | | |
| IC | 2,PDSDIRTM | 1st H of HH | | |
| N | 2,=F'15' | N 2,=X'0000000F' | | |
| SLL | 2,4 | | | |
| SR | 1,1 | | | |
| IC | 1,PDSDIRTM+1 | 2nd H of HH | | |
| N | 1,=F'15' | N 1,=X'0000000F' | | |
| OR | 2,1 | | | |
| STC | 2,PDSUPDTM | | | |
| SR | 2,2 | | | |
| IC | 2,PDSDIRTM+3 | 1st M of MM | | |
| N | 2,=F'15' | N 2,=X'0000000F' | | |
| SLL | 2,4 | | | |
| SR | 1,1 | | | |
| IC | 1,PDSDIRTM+4 | 2nd M of MM | | |
| N | 1,=F'15' | N 1,=X'0000000F' | | |
| OR | 2,1 | | | |
| STC | 2,PDSUPDTM+1 | | | |
| PACK | PDSWRKDW,PDSDIRVS(2) | | | |
| CVB | 2,PDSWRKDW | | | |
| STC | 2,PDSVERSN | | | |
| PACK | PDSWRKDW,PDSDIRVS+3(2) | | | |
| CVB | 2,PDSWRKDW | | | |
| STC | 2,PDSVERSN+1 | | | |
| MVC | PDSVERSN+2(2),=X'0001' | | | |
| PACK | PDSWRKDW,PDSDIRL# | | | |
| CVB | 2,PDSWRKDW | | | |
| STH | 2,PDSLINE# | | | |
| PACK | PDSWRKDW,PDSDIR0# | | | |
| CVB | 2,PDSWRKDW | | | |
| STH | 2,PDSINIT# | | | |

TABLE 1-continued

|  | MVC | PDSINIT#+2(2),=X'0000' |  |
|---|---|---|---|
| * | | | |
| PDSLOAD6 | DS | 0H | |
| | L | 5,=A(THEWORK) | |
| PDSLOAD7 | DS | 0H | |
| | L | 4,=A(THEWORK) | |
| | LH | 2,PDSWDCB1+X'3E' | |
| | AR | 4,2 | |
| | CR | 5,4 | |
| | BNL | PDSLOAD8 | |
| | GET | PSGETDCB | |
| | LR | 6,1 | |
| | CLC | =C'@@@@****%%%%',0(6) | |
| | BE | PDSLOADC | |
| | LH | 2,PSGETDCB+X'52' | |
| | BCTR | 2,0 | |
| | EX | 2,PDSLMVC1 | MVC  0(0,5),0(6) |
| | LA | 2,1(,2) | |
| | AR | 5,2 | |
| | B | PDSLOAD7 | |
| PDSLOAD8 | DS | 0H | |
| | L | 4,=A(THEWORK) | |
| | WRITE | PDSLDEC1,SF,PDSWDCB1,(4),'S' | |
| | CHECK | PDSLDEC1 | |
| | NOTE | PDSWDCB1 | |
| | STCM | 1,14,PDSTTR1 | |
| * | | | |
| PDSLOAD9 | DS | 0H | |
| | L | 5,=A(THEWORK) | |
| PDSLOADA | DS | 0H | |
| | L | 4,=A(THEWORK) | |
| | LH | 2,PDSWDCB1+X'3E' | |
| | AR | 4,2 | |
| | CR | 5,4 | |
| | BNL | PDSLOADB | |
| | GET | PSGETDCB | |
| | LR | 6,1 | |
| | CLC | =C'@@@@****%%%%',0(6) | |
| | BE | PDSLOADD | |
| | LH | 2,PSGETDCB+X'52' | |
| | BCTR | 2,0 | |
| | EX | 2,PDSLMVC1 | MVC  0(0,5),0(6) |
| | LA | 2,1(,2) | |
| | AR | 5,2 | |
| | B | PDSLOADA | |
| PDSLOADB | DS | 0H | |
| | L | 4,=A(THEWORK) | |
| | WRITE | PDSLDEC2,SF,PDSWDCB1,(4),'S' | |
| | CHECK | PDSLDEC2 | |
| | B | PDSLOAD9 | |
| * | | | |
| PDSLOADC | DS | 0H | |
| | L | 4,=A(THEWORK) | |
| | SR | 5,4 | |
| | LTR | 5,5 | |
| | BZ | PDSLOAD3 | |
| | LH | 3,PDSWDCB1+X'3E' | BLKSIZE |
| | STH | 5,PDSWDCB1+X'3E' | BLKSIZE |
| | WRITE | PDSLDEC3,SF,PDSWDCB1,(4),'S' | |
| | CHECK | PDSLDEC3 | |
| | STH | 3,PDSWDCB1+X'3E' | BLKSIZE |
| | NOTE | PDSWDCB1 | |
| | STCM | 1,14,PDSTTR1 | |
| | B | PDSLOADE | |
| * | | | |
| PDSLOADD | DS | 0H | |
| | L | 4,=A(THEWORK) | |
| | SR | 5,4 | |
| | LTR | 5,5 | |
| | BZ | PDSLOADE | |
| | LH | 3,PDSWDCB1+X'3E' | BLKSIZE |
| | STH | 5,PDSWDCB1+X'3E' | |
| | WRITE | PDSLDEC4,SF,PDSWDCB1,(4),'S' | |
| | CHECK | PDSLDEC4 | |
| | STH | 3,PDSWDCB1+X'3E' | BLKSIZE |
| | B | PDSLOADE | |
| * | | | |
| * | | | |
| PDSLOADM | DS | 0H | LOAD LIBRARY |
| | GET | PSGETDCB | |

TABLE 1-continued

```
           LR       6,1
           CLC      0(4,6),=C';;;;'
           BNE      PDSERR0E           DIRECTORY INFO MISSING
           IC       2,PDSSEG#
           SLL      2,27
           SRL      2,26
           BCTR     2,0
           XC       PDSSEG#(PDSSTOWE-PDSSEG#),PDSSEG#
           EX       2,PDSLMVCM    MVC   PDSSEG#(PDSSTOWE-PDSSEG#),4(6)
*
*
           CLI      PDSDMPSW,X'02'
           BE       PDSLOADO
*
*
*          WHEN EACH INPUT LOAD LIBRARY RECORD WAS FIRST DIVIDED INTO
*          RECORDS OF SAME LENGTH OF (OUTPUT LRECL - 4) BYTES AND THEN
*          EACH DIVIDED RECORD WAS APPENDED AT THE FRONT WITH 4-BYTES
*          HEADER OF 2-BYTES OF CONTENT LENGTH IN THE DIVIDED RECORD
*          AND 2-BYTES OF CONTINUATION SEQUENCE NUMBER
           L        5,=A(THEWORK)
           XC       PSIRECNO,PSIRECNO
PDSLOADN   DS       0H
           L        3,=A(THEWORK)
           LH       2,PDSWDCB1+X'3E'
           AR       3,2
           CR       5,3
           BH       PDSERR0A           OUTPUT PDS BLOCKSIZE TOO SMALL
           GET      PSGETDCB
           LR       6,1
           CLC      2(2,6),=X'0001'    CONCATENATION COUNT
           BNE      PDSLODN2
           CLC      PSIRECNO,=X'0000'
           BNE      PDSLODN3           FIRST RECORD OUTPUT OF A MEMBER
PDSLODN2   DS       0H
           MVC      PSIRECNO,2(6)
           LH       1,PSGETDCB+X'52'
           S        1,=F'4'            HEADER LENGTH
           LH       3,0(,6)            REAL DATA LENGTH
           CR       3,1
           BH       PDSERR0B           SEQUENTIAL DATASET LRECL TOO SMALL
           LR       4,5
           LR       1,5                SAVE R5
           LR       5,3
           LA       2,4(,6)
           MVCL     4,2
           LR       5,1                RESTORE R5
           LH       2,0(,6)            REAL DATA LENGTH
           AR       5,2
           B        PDSLOADN
*
PDSLODN3   DS       0H                 FIRST RECORD OF A MEMBER
           L        4,=A(THEWORK)
           SR       5,4                OUTPUT RECORD LENGTH
           LH       3,PDSWDCB1+X'3E'   MAXIMUM BLKSIZE
           STH      5,PDSWDCB1+X'3E'   OUTPUT RECORD LENGTH
           WRITE    PDSLDEC5,SF,PDSWDCB1,(4),'S'
           CHECK    PDSLDEC5
           STH      3,PDSWDCB1+X'3E'   MAXIMUM BLKSIZE
           NOTE     PDSWDCB1
           STCM     1,14,PDSTTR1
           XC       PDSPCDTR,PDSPCDTR  TTR OF FIRST PROGRAM CODE
           MVI      PDSPGMCD,X'00'
*
PDSLODN4   DS       0H
           L        5,=A(THEWORK)
           LH       1,PSGETDCB+X'52'
           S        1,=F'4'            HEADER LENGTH
           LH       3,0(,6)            REAL DATA LENGTH
           CR       3,1
           BH       PDSERR0B           SEQUENTIAL DATASET LRECL TOO SMALL
           LR       4,5
           LR       1,5                SAVE R5
           LR       5,3
           LA       2,4(,6)
           MVCL     4,2
           LR       5,1                RESTORE R5
           LH       2,0(,6)            REAL DATA LENGTH
           AR       5,2
PDSLODN5   DS       0H
```

TABLE 1-continued

```
              L        3,=A(THEWORK)
              LH       2,PDSWDCB1+X'3E'
              AR       3,2
              CR       5,3
              BH       PDSERR0A            OUTPUT PDS BLOCKSIZE TOO SMALL
              GET      PSGETDCB
              LR       6,1
              CLC      =C'@@@@****%%%%',0(6)
              BE       PDSLODN9
              CLC      2(2,6),=X'0001'     CONCATENATION COUNT
              BE       PDSLODN6
              LH       1,PSGETDCB+X'52'
              S        1,=F'4'             HEADER LENGTH
              LH       3,0(,6)             REAL DATA LENGTH
              CR       3,1
              BH       PDSERR0B            SEQUENTIAL DATASET LRECL TOO SMALL
              LR       4,5
              LR       1,5                 SAVE R5
              LR       5,3
              LA       2,4(,6)
              MVCL     4,2
              LR       5,1                 RESTORE R5
              LH       2,0(,6)             REAL DATA LENGTH
              AR       5,2
              B        PDSLODN5
*
PDSLODN6      DS       0H
              L        4,=A(THEWORK)
              SR       5,4
              LH       3,PDSWDCB1+X'3E'    MAXIMUM BLKSIZE
              STH      5,PDSWDCB1+X'3E'    RECORD OUTPUT SIZE
              WRITE    PDSLDEC6,SF,PDSWDCB1,(4),'S'
              CHECK    PDSLDEC6
              STH      3,PDSWDCB1+X'3E'    MAXIMUM BLKSIZE
              CLI      PDSPGMCD,X'01'      THE FIRST INSTRUCTION CODE LINE ?
              BNE      PDSLODN7            NO
              NOTE     PDSWDCB1
              STCM     1,14,PDSPCDTR       TTR OF FIRST PROGRAM CODE
              MVI      PDSPGMCD,X'02'
PDSLODN7      DS       0H
              CLI      0(4),X'20'
              BE       PDSLODN8
              CLI      0(4),X'80'
              BE       PDSLODN8
              CLI      0(4),X'01'
              BNE      PDSLODN8
              CLI      PDSPGMCD,X'00'      THE FIRST INSTRUCTION CODE LINE ?
              BNE      PDSLODN8            NO
              MVI      PDSPGMCD,X'01'      NEXT RECORD IS THE FIRST INSTRUCTION CODE
              LH       2,14(,4)            LENGTH OF NEXT INSTRUCTION CODE RECORD
PDSLODN8      DS       0H
              B        PDSLODN4
*
PDSLODN9      DS       0H                  LAST RECORD OF A MEMBER
              L        4,=A(THEWORK)
              SR       5,4
              LTR      5,5
              BZ       PDSLOADE
              LH       3,PDSWDCB1+X'3E'    MAXIMUM BLKSIZE
              STH      5,PDSWDCB1+X'3E'    OUTPUT RECORD SIZE
              WRITE    PDSLDEC7,SF,PDSWDCB1,(4),'S'
              CHECK    PDSLDEC7
              STH      3,PDSWDCB1+X'3E'    MAXIMUM BLKSIZE
              B        PDSLOADE
*
*
*             WHEN 4-BYTES HEADER, WITH 2-BYTES OF INPUT LOAD LIBRARY
*             RECORD LENGTH AND 2 NULL BYTES, WAS FIRST APPENDED AT THE
*             BEGINING OF EACH INPUT LOAD LIBRARY RECORD AND THEN IT WAS
*             DIVIDED INTO THE OUTPUT RECORDS OF SAME LENGTH
ATHEWORK      DC       A(THEWORK)  ADDRESS IN THEWORK
LTHEWORK      DC       H'0'
*
PDSLOADO      DS       0H
              GET      PSGETDCB            FIRST RECORD OF A MEMBER
              LR       6,1
              LH       2,0(,6)             LENGTH OF OUTPUT LOAD MODULE RECORD
              STH      2,LTHEWORK
              LH       3,PDSWDCB1+X'3E'    OUTPUT LOAD LIBRARY BLKSIZE
              CR       2,3
```

TABLE 1-continued

|  | BH | PDSERR0A | OUTPUT PDS BLOCKSIZE TOO SMALL |
| --- | --- | --- | --- |
|  | LH | 4,PSGETDCB+X'52' | INPUT LRECL |
|  | S | 4,=F'4' | HEADER LENGTH |
|  | LR | 1,4 |  |
|  | LR | 3,4 |  |
|  | LA | 2,4(,6) | AFTER 4-BYTES HEADER |
|  | L | 0,=A(THEWORK) |  |
|  | MVCL | 0,2 |  |
|  | L | 2,=A(THEWORK) |  |
|  | AR | 2,4 |  |
|  | ST | 2,ATHEWORK |  |
| PDSLODO2 | DS | 0H |  |
|  | L | 2,ATHEWORK |  |
|  | L | 3,=A(THEWORK) |  |
|  | SR | 2,3 |  |
|  | LH | 3,LTHEWORK |  |
|  | CR | 2,3 |  |
|  | BNL | PDSLODO3 |  |
|  | GET | PSGETDCB |  |
|  | LR | 6,1 |  |
|  | LH | 3,PSGETDCB+X'52' | INPUT LRECL |
|  | L | 4,ATHEWORK |  |
|  | LR | 1,4 |  |
|  | AR | 1,3 |  |
|  | ST | 1,ATHEWORK |  |
|  | LR | 5,3 |  |
|  | LR | 2,6 |  |
|  | MVCL | 4,2 |  |
|  | B | PDSLODO2 |  |
| * |  |  |  |
| PDSLODO3 | DS | 0H | FIRST RECORD OF A MEMBER |
|  | L | 4,=A(THEWORK) |  |
|  | LH | 3,PDSWDCB1+X'3E' | MAXIMUM BLKSIZE |
|  | LH | 5,LTHEWORK |  |
|  | STH | 5,PDSWDCB1+X'3E' | OUTPUT RECORD LENGTH |
|  | WRITE | PDSLDEC9,SF,PDSWDCB1,(4),'S' |  |
|  | CHECK | PDSLDEC9 |  |
|  | STH | 3,PDSWDCB1+X'3E' | MAXIMUM BLKSIZE |
|  | NOTE | PDSWDCB1 |  |
|  | STCM | 1,14,PDSTTR1 |  |
|  | XC | PDSPCDTR,PDSPCDTR | TTR OF FIRST PROGRAM CODE |
|  | MVI | PDSPGMCD,X'00' |  |
| * |  |  |  |
| PDSLODO4 | DS | 0H |  |
|  | L | 5,=A(THEWORK) |  |
|  | GET | PSGETDCB | FIRST INPUT RECORD FOR EACH OUTPUT |
| * |  |  | LOAD MODULE RECORD |
|  | LR | 6,1 |  |
|  | CLC | =C'@@@@****%%%%',0(6) |  |
|  | BE | PDSLOADE |  |
|  | LH | 2,0(,6) | LENGTH OF OUTPUT LOAD MODULE RECORD |
|  | STH | 2,LTHEWORK |  |
|  | LH | 3,PDSWDCB1+X'3E' | OUTPUT LOAD LIBRARY BLKSIZE |
|  | CR | 2,3 |  |
|  | BH | PDSERR0A | OUTPUT PDS BLOCKSIZE TOO SMALL |
|  | LA | 2,4(,6) |  |
|  | LH | 3,PSGETDCB+X'52' | LRECL |
|  | S | 3,=F'4' | HEADER |
|  | LR | 5,3 |  |
|  | L | 4,=A(THEWORK) |  |
|  | LR | 1,4 |  |
|  | AR | 1,3 |  |
|  | ST | 1,ATHEWORK |  |
|  | MVCL | 4,2 |  |
| PDSLODO5 | DS | 0H |  |
|  | L | 5,=A(THEWORK) |  |
|  | L | 2,ATHEWORK |  |
|  | SR | 2,5 |  |
|  | LH | 3,LTHEWORK |  |
|  | CR | 2,3 |  |
|  | BNL | PDSLODO6 |  |
|  | GET | PSGETDCB |  |
|  | LR | 6,1 |  |
|  | LH | 3,PSGETDCB+X'52' | INPUT LRECL |
|  | L | 4,ATHEWORK |  |
|  | LR | 1,4 |  |
|  | AR | 1,3 |  |
|  | ST | 1,ATHEWORK | NEW END OF DATA IN THEWORK |
|  | LR | 5,3 |  |
|  | LR | 2,6 |  |

TABLE 1-continued

```
               MVCL    4,2
               B       PDSLODO5
*
PDSLODO6    DS      0H
            L       4,=A(THEWORK)
            LH      5,LTHEWORK
            LH      3,PDSWDCB1+X'3E'   MAXIMUM BLKSIZE
            STH     5,PDSWDCB1+X'3E'   RECORD OUTPUT SIZE
            WRITE   PDSLDECA,SF,PDSWDCB1,(4),'S'
            CHECK   PDSLDECA
            STH     3,PDSWDCB1+X'3E'   MAXIMUM BLKSIZE
            CLI     PDSPGMCD,X'01'     THE FIRST INSTRUCTION CODE LINE ?
            BNE     PDSLODO7           NO
            NOTE    PDSWDCB1
            STCM    1,14,PDSPCDTR      TTR OF FIRST PROGRAM CODE
            MVI     PDSPGMCD,X'02'
PDSLODO7    DS      0H
            CLI     0(4),X'20'
            BE      PDSLODO8
            CLI     0(4),X'80'
            BE      PDSLODO8
            CLI     0(4),X'01'
            BNE     PDSLODO8
            CLI     PDSPGMCD,X'00'     THE FIRST INSTRUCTION CODE LINE ?
            BNE     PDSLODO8           NO
            MVI     PDSPGMCD,X'01'     NEXT RECORD IS THE FIRST INSTRUCTION CODE
            LH      2,14,(4)           LENGTH OF NEXT INSTRUCTION CODE RECORD
PDSLODO8    DS      0H
            B       PDSLODO4
*
*
PDSLOADE    DS      0H                 UPDATE DIRECTORY INDEX OF EACH MEMBER
            STOW    PDSWDCB1,PDSSTOWL,A
            LTR     15,15
            BZ      PDSLOADF           ADDITION OF A NEW MEMBER SUCCESSFUL
            C       15,=F'4'           THE SPECIFIED NAME ALREADY EXISTS ?
            BNE     PDSLOADG           NO
*           ALREADY EXISTS. DELETE IT FIRST AND ADD IT.
            MVC     PDSWRKDW,PDSMEMNM
            STOW    PDSWDCB1,PDSWRKDW,D
            LTR     15,15
            BNZ     PDSLOADG
            STOW    PDSWDCB1,PDSSTOWL,A
PDSLOADF    DS      0H
            XC      PDSTTR1,PDSTTR1
            B       PDSLOAD3
*
*
PDSLOADH    DS      0H                 EODAD OF PSGETDCB
            CLI     PDSREGFM,X'C0'     LOAD LIBRARY ?
            BNE     PDSLODH2           NO, TEXT LIBRARY
            CLI     PDSDMPSW,X'02'
            BE      PDSLOADI
            L       4,=A(THEWORK)
PDSLODH2    DS      0H
            CR      5,4
            BNH     PDSLOADJ           NO INPUT RECORD FOR THIS MEMBER
*           LAST RECORD OF THE LIBRARY WHEN PDSDMPSW = X'01'
            SR      5,4
            LH      3,PDSWDCB1+X'3E'   BLKSIZE
            STH     5,PDSWDCB1+X'3E'
            WRITE   PDSLDEC8,SF,PDSWDCB1,(4), 'S'
            CHECK   PDSLDEC8
            STH     3,PDSWDCB1+X'3E'   BLKSIZE
            CLC     PDSTTR1,=3X'00'
            BNE     PDSLOADI
*
            NOTE    PDSWDCB1
            STCM    1,14,PDSTTR1
*
PDSLOADI    DS      0H                 UPDATE DIRECTORY INDEX OF LAST MEMBER
            STOW    PDSWDCB1,PDSSTOWL,A
            LTR     15,15
            BZ      PDSLOADJ           ADDITION OF A NEW MEMBER SUCCESSFUL
            C       15,=F'4'           THE SPECIFIED NAME ALREADY EXISTS ?
            BNE     PDSLOADG           NO
*           ALREADY EXISTS. DELETE IT FIRST AND ADD IT.
            MVC     PDSWRKDW,PDSMEMNM
            STOW    PDSWDCB1,PDSWRKDW,D
            LTR     15,15
```

TABLE 1-continued

```
            BNZ     PDSLOADG
            STOW    PDSWDCB1,PDSSTOWL,A
PDSLOADJ    DS      0H
DCBPSGTE    DS      0H
            CLOSE   PDSWDCB1
            CLOSE   PSGETDCB
            LM      0,15,PDSRSAVE
            BR      14
*
PDSLOADG    DS      0H
            C       15,=F'12'              NO DIRECTORY SPACE AVAILABLE ?
            BE      PDSERR06               YES
            C       0,=X'00000D37'         ALL PDS SPACE USED ?
            BE      PDSERR07               YES
            B       PDSERR08
*
PDSERR01    DS      0H
            WTO     'PDS OPEN FAILED. 1'
            LA      15,8
            B       PDSPROG9
*
PDSERR02    DS      0H
            WTO     'PDS OPEN FAILED. 2'
            LA      15,12
            B       PDSPROG9
*
PDSERR03    DS      0H
            WTO     'INPUT DATASET OPEN FAILED'
            LA      15,16
            B       PDSPROG9
*
PDSERR04    DS      0H
            WTO     'OUTPUT DATASET OPEN FAILED'
            LA      15,20
            B       PDSPROG9
*
PDSERR05    DS      0H
            WTO     'MEMBER NAME NOT FOUND IN PDS'
            LA      15,24
            B       PDSPROG9
*
PDSERR06    DS      0H
            WTO     'PDS DIRECTORY SPACE NOT ENOUGH'
            LA      15,28
            B       PDSPROG9
*
PDSERR07    DS      0H
            WTO     'PDS SPACE NOT ENOUGH, D37'
            LA      15,32
            B       PDSPROG9
*
PDSERR08    DS      0H
            WTO     'PDS STOW ERROR'
            LA      15,36
            B       PDSPROG9
*
PDSERR09    DS      0H
            WTO     'RECORD FORMAT NOT SUPPORTED'
            LA      15,40
            B       PDSPROG9
*
PDSERR0A    DS      0H
            WTO     'OUTPUT DATASET BLOCKSIZE TOO SMALL'
            LA      15,44
            B       PDSPROG9
*
PDSERR0B    DS      0H
            WTO     'INPUT UPLOAD SEQUENTIAL DATASET LRECL TOO SMALL'
            LA      15,48
            B       PDSPROG9
*
PDSERR0C    DS      0H
            WTO     'NOT A PARTITIONED ORGANIZATION'
            LA      15,52
            B       PDSPROG9
*
PDSERR0D    DS      0H
            WTO     'NOT A RECFM=U LIBRARY'
            LA      15,56
            B       PDSPROG9
```

TABLE 1-continued

```
*
PDSERR0E    DS      0H
            WTO     'DIRECTORY INFO MISSING'
            LA      15,60
            B       PDSPROG9
*
PDSERR0F    DS      0H
            WTO     'OUT RECFM MUST BE F or FB'
            LA      15,64
            B       PDSPROG9
*
PDSERR0G    DS      0H
            WTO     'RDJFCB FAILED'
            LA      15,68
            B       PDSPROG9
*
PDSERR0H    DS      0H
            WTO     'OBTAIN FAILED'
            LA      15,72
            B       PDSPROG9
*
PDSERR0I    DS      0H
            WTO     'MUST BE A SINGLE MEMBER'
            LA      15,76
            B       PDSPROG9
*
PDSERR0J    DS      0H
            WTO     'NOT A PHYSICAL SEQUENTIAL DATASET'
            LA      15,80
            B       PDSPROG9
*
PDSERR0K    DS      0H
            WTO     'WRONG INPUT RECORD FORMAT'
            LA      15,84
            B       PDSPROG9
*
PDSERR0L    DS      0H
            WTO     'INPUT DATA NOT SUPPORTED'
            LA      15,88
            B       PDSPROG9
*
PDSERR0M    DS      0H
            WTO     'WRONG OUTPUT RECORD FORMAT'
            LA      15,92
            B       PDSPROG9
*
PDSERR0N    DS      0H
            WTO     'DATA DELIVERED IS NOT A LIBRARY'
            LA      15,96
            B       PDSPROG9
*
PDSERR0O    DS      0H
            WTO     'OUTPUT DATASET LRECL TOO SMALL'
            LA      15,100
            B       PDSPROG9
*
*
*
PDSRSAVE    DS      16F
PDSLMVC1    MVC     0(0,5),0(6)
PDSLMVCM    MVC     PDSSEG#(0),4(6)
PDSTRT1     TRT     0(0,5),0(4)         R5->ARG, R4->TABLE
PDSTRTHX    DS      XL256
PDSWRKDW    DS      D
PDSWRKWD    DS      CL8
PDSLRECL    DS      H
PSOLRECL    DS      H
PSORECNO    DS      H
*
PDSRECFM    DS      X       F=X'80' or FB=X'90' or U=X'C0'
PDSPGMCD    DS      X       X'01' NEXT RECORD IS THE FIRST INSTRUCTION CODE
PDSBLKSZ    DS      H
PSILRECL    DS      H
PSIRECNO    DS      H
*
*
PSGETDCB    DCB     DDNAME=IN,DSORG=PS,MACRF=GL,EODAD=DCBPSGTE
PSPUTDCB    DCB     DDNAME=OUT,DSORG=PS,MACRF=PM
*
PDSOUTWK    DS      0CL80
```

TABLE 1-continued

```
             DC      CL1' '
PDSDIREN     DS      0CL133
PDSDIRNM     DC      CL8' '              MEMBER NAME
             DC      CL3' '
PDSDIRVS     DC      CL5' '01.99         VERSION
             DC      CL2' '
PDSDIRCR     DC      CL8' 'YY/MM/DD      CREATION DATE
             DC      CL2' '
PDSDIRUP     DC      CL8' 'YY/MM/DD      LAST UPDATE DATE
             DC      CL2' '
PDSDIRTM     DC      CL5' 'HH:MM         LAST UPDATE TIME OF THE DATE
             DC      CL2' '
PDSDIRL#     DC      CL5' '              NUMBER OF LINES
             DC      CL2' '
PDSDIR0#     DC      CL5' '              NUMBER OF INITIAL LINES
             DC      CL2' '
PDSDIRUS     DC      CL8' '              TSO USER ID
PDSDIRNE     DC      CL256' '
*
*
PDSDIREL     DS      0F
PDSSTOWL     DS      0F
PDSMEMNM     DS      CL8
PDSTTR1      DS      XL3
PDSSEG#      DC      X'0F'
PDSPCDTR     DS      0XL3     TTR OF THE FIRST INSTRUCTION CODE RECORD
*                             WHEN IT IS A PROGRAM LOAD MODULE
PDSVERSN     DC      X'0163'         01.99
             DC      X'0001'
PDSCRTDT     DC      X'0099285F'     99/10/12
PDSUPDDT     DC      X'0099285F'     99/10/12
PDSUPDTM     DC      X'1042'         10:42
PDSLINE#     DC      X'0001'         1
PDSINIT#     DC      X'0001'         1
             DC      X'0000'
PDSUPDNM     DC      CL8' '
PDSSTOWE     DC      CL2' '
*
*
PDSBLDLL     DS      0F
PDSBLDLN     DC      H'1'      # OF ENTRIES
             DC      H'128'    LENGTH OF EACH ENTRY
PDSBLDL1     DC      CL8' '
PDSBLDLT     DS      XL3       TTR
             DC      X'0'      K    ONLY DATASET
             DC      X'0'      Z    PRIVATE LIBRARY
             DC      X'0'      C    MEMBER NAME
PDSBLDLU     DS      XL114     USER DATA
*
*
PDSRBDCB     DCB     DDNAME=IN,MACRF=R,DSORG=PO,                          X
                     RECFM=F,LRECL=256,BLKSIZE=256,                       X
                     EODAD=PDSDUMP4
*
PDSRDCB1     DCB     DDNAME=IN,MACRF=R,DSORG=PO    ,EODAD=PDSDUMP8
*
PDSWDCB1     DCB     DDNAME=OUT,DSORG=PO,MACRF=W
*
JFCBDCB      DCB     DDNAME=IN,  FOR VSAM, QSAM NEW OR OLD, BSAM, BDAM,   *
                     DSORG=PS,         BPAM, BPAM MEMBER NEW OR OLD       *
                     MACRF=(R),     *
                     EXLST=(JFCBLIST)
JFCBLIST     DC      AL1(135)            JFCB TYPE
             DC      AL3(JFCBAREA)       A(JFCB AREA)
             DS      0D
JFCBAREA     DS      0CL176              TARGET FOR RDJFCB
             DS      CL44                DSN
             DS      CL132
*
             DS      0F
OBTAIN1      CAMLST  SEARCH,OBTNDSN,OBTVOLSR,OBTNDSCB
OBTNDSN      DC      CL44' '
OBTVOLSR     DC      CL6'VOLSER'
OBTNDSCB     DS      140X
*
*
             LTORG
*
*
EDITDATE     DS      0H
```

TABLE 1-continued

```
*              R1 POINTS TO Julian date YYDDDC or Gregorian date MMDDYY
               LR      0,14                    SAVE R14
               TM      0(1),X'F0'
               BO      EDTDATEG                A GREGORIAN DATE
*
*              R1      POINTS TO JULIAN DATE, YYDDDC
               ZAP     EDTYYDDD,0(3,1)
               MVO     EDTYYC,EDTYYDDD(1)      0YYC <- YYDDDC
               ZAP     EDTDDDC,EDTYYDDD+1(2)   DDDC <- YYDDDC
EDTDATE2       DS      0H
               LA      15,EDTMONTH
               ZAP     EDTYYYC,EDTYYC
               DP      EDTYYYC,EDTP004
               CP      EDTYYYC+L'EDTYYYC-L'EDTP004(L'EDTP004),EDTP000
               BNE     EDTDATE3
               LA      15,EDTMONT2
EDTDATE3       DS      0H
               LA      14,12
EDTDATE4       DS      0H
               CP      EDTDDDC,4(2,15)
               BNH     EDTDATE5
               LA      15,4(15)
               BCT     14,EDTDATE4
               SP      EDTDDDC,0(2,15)         365/366
               AP      EDTYYC,EDTP001
               B       EDTDATE2
EDTDATE5       DS      0H
               MVC     EDTCMM,2(15)
               UNPK    EDTCDDD,EDTDDDC
               OI      EDTCDDD+L'EDTCDDD-1,X'F0'
               SP      EDTDDDC,0(2,15)
               UNPK    EDTCDD,EDTDDDC
               OI      EDTCDD+L'EDTCDD-1,X'F0'
               UNPK    EDTCYY,EDTYYC
               OI      EDTCYY+L'EDTCYY-1,X'F0'
               LA      1,EDTCYY                C'YYDDDMMDD'
               LR      14,0
               BR      14
EDTCYY         DC      CL2'00'
EDTCDDD        DC      CL3'000'
EDTCMM         DC      CL2'00'
EDTCDD         DC      CL2'00'
EDTYYDDD       DC      PL3'0'
EDTYYC         DC      PL2'0'
EDTYYYC        DC      PL3'0'
EDTMMC         DC      PL2'0'
EDTDDDC        DC      PL2'0'
EDTP000        DC      P'0'
EDTP001        DC      P'1'
EDTP004        DC      P'4'
EDTMONTH       DS      0H
               DC      PL2'000',C'01'
               DC      PL2'031',C'02'
               DC      PL2'059',C'03'
               DC      PL2'090',C'04'
               DC      PL2'120',C'05'
               DC      PL2'151',C'06'
               DC      PL2'181',C'07'
               DC      PL2'212',C'08'
               DC      PL2'243',C'09'
               DC      PL2'273',C'10'
               DC      PL2'304',C'11'
               DC      PL2'334',C'12'
               DC      PL2'365',C' '
EDTMONT2       DS      0H
               DC      PL2'000',C'01'
               DC      PL2'031',C'02'
               DC      PL2'060',C'03'
               DC      PL2'091',C'04'
               DC      PL2'121',C'05'
               DC      PL2'152',C'06'
               DC      PL2'182',C'07'
               DC      PL2'213',C'08'
               DC      PL2'244',C'09'
               DC      PL2'274',C'10'
               DC      PL2'305',C'11'
               DC      PL2'335',C'12'
               DC      PL2'366',C' '
*
EDTDATEG       DS      0H
```

TABLE 1-continued

```
*              R1 POINTS TO GREGORIAN DATE, 'MMDDYY'
               PACK    EDTDDDC,2(2,1)
               PACK    EDTYYC,4(2,1)
               MVO     EDTYYDDD(2),EDTYYC        YYCDD <- 0YYC
               LA      15,EDTMONTH
               ZAP     EDTYYYC,EDTYYC
               DP      EDTYYYC,EDTP004
               CP      EDTYYYC+L'EDTYYYC-L'EDTP004(L'EDTP004),EDTP000
               BNE     EDTDATE6
               LA      15,EDTMONT2
EDTDATE6       DS      0H
               LA      14,12
EDTDATE7       DS      0H
               CLC     0(2,1),2(15)
               BE      EDTDATE8
               LA      15,4(15)
               BCT     14,EDTDATE7
EDTDATE8       DS      0H
               AP      EDTDDDC,0(2,15)
               ZAP     EDTYYDDD+1(2),EDTDDDC     YYDDDC <- DDDC
               LA      1,EDTYYDDD                P'YYDDDC'
               LR      14,0
               BR      14
*
               LTORG
*
*
               DROP    13
               DROP    12
               DROP    11
               DROP    10
               DROP    9
               DROP    8
*
*
*
               DS      0F
THEWORK        DS      XL32768
THEWORKL       EQU     32768
*
THEWORK2       DS      XL32768   MAXIMUM 2000 TEXT LIBRARY MEMBERS
               DS      XL32768
               DS      XL32768
               DS      XL32768
THEWORK3       DS      XL32768
               DS      XL32768
*
               END
```

The invention claimed is:

1. An apparatus implemented with processor and memory for distributing computer data, comprising:

sender having program logic for converting sender data to sender terminal file in sender terminal; and receiver having program logic for reverting receiver terminal file in receiver terminal into receiver data without losing integrity of said sender data in said converting or said reverting;

wherein each unit of said sender data is concatenated into said sender terminal file in said converting;

wherein each data unit of said receiver terminal file is separated in said reverting; and wherein said sender terminal file and said receiver terminal file are same terminal file or, for also sending and receiving said sender and receiver terminal file, different terminal files.

2. The apparatus according to claim 1, wherein said sender computer and said receiver computer are one of same or different computers.

3. The apparatus according to claim 1, wherein at least one of said sender terminal file or said receiver terminal file is part or whole of said sender data.

4. The apparatus according to claim 1, wherein said sender data and said receiver data are one of the same or different from each other.

5. The apparatus according to claim 1, wherein said receiver data has same form as said sender data.

6. An apparatus implemented with processor and memory for distributing device data, comprising:

sender having program logic for converting sender data to sender terminal file in sender terminal; and receiver having program logic for reverting receiver terminal file in receiver terminal into receiver data without losing integrity of said sender data in said converting or said reverting;

wherein each unit of said sender data is concatenated into said sender terminal file in said converting;

wherein each data unit of said receiver terminal file is separated in said reverting; and wherein said sender terminal file and said receiver terminal file are same terminal file or, for also sending and receiving said sender and receiver terminal file, different terminal files.

7. The apparatus according to claim 6, wherein said sender and said receiver are one of same or different devices.

8. The apparatus according to claim 6, wherein at least one of said sender terminal file or said receiver terminal file is part or whole of said sender data.

9. The apparatus according to claim 6, wherein said sender data and said receiver data are one of the same or different from each other.

10. The apparatus according to claim 6, wherein said receiver data has same form as said sender data.

11. An apparatus implemented with processor and memory for distributing computer data, comprising:
sender having program logic for converting sender data to sender terminal file in sender terminal; and
receiver having program logic for reverting receiver terminal file in receiver terminal into receiver data of original form without losing data integrity in said converting or said reverting;
wherein each unit of said sender data is concatenated into said sender terminal file in said converting;
wherein each data unit of said receiver terminal file is separated in said reverting; and
wherein said sender terminal file and said receiver terminal file are same terminal file or, for also sending and receiving said sender and receiver terminal file, different terminal files.

12. The apparatus according to claim 11, wherein said sender and said receiver are one of same or different computers.

13. The apparatus according to claim 11, wherein said sender data and said receiver data are one of the same or different from each other.

14. The apparatus according to claim 11, wherein at least one of said sender terminal file or said receiver terminal file is part or whole of said sender data.

* * * * *